US011749422B2

(12) United States Patent
Bertini et al.

(10) Patent No.: US 11,749,422 B2
(45) Date of Patent: Sep. 5, 2023

(54) SILANE FUNCTIONAL STABILIZERS FOR EXTENDING LONG-TERM ELECTRICAL POWER CABLE PERFORMANCE

(71) Applicant: Novinium, LLC, Kent, WA (US)

(72) Inventors: Glen J. Bertini, Fox Island, WA (US); David C. Busby, Midland, MI (US); Ramanathan Ravichandran, Suffern, NY (US); Miles J. Hutchings, Scarsdale, NY (US)

(73) Assignee: Novinium, LLC, Kent, WA (US)

( * ) Notice: Subject to any disclaimer, the term of this patent is extended or adjusted under 35 U.S.C. 154(b) by 265 days.

(21) Appl. No.: 16/930,138

(22) Filed: Jul. 15, 2020

(65) Prior Publication Data

US 2021/0017384 A1    Jan. 21, 2021

Related U.S. Application Data

(60) Provisional application No. 62/876,967, filed on Jul. 22, 2019, provisional application No. 62/874,155, filed on Jul. 15, 2019.

(51) Int. Cl.
*H01B 3/46* (2006.01)
*H01B 7/18* (2006.01)
*C08L 83/06* (2006.01)

(52) U.S. Cl.
CPC ............... *H01B 3/46* (2013.01); *C08L 83/06* (2013.01); *H01B 7/1805* (2013.01); *C08L 2201/08* (2013.01); *C08L 2203/206* (2013.01); *C08L 2314/08* (2013.01)

(58) Field of Classification Search
CPC .......... C08L 83/06; H01B 3/46; H01B 7/1805
See application file for complete search history.

(56) References Cited

U.S. PATENT DOCUMENTS

| | | | |
|---|---|---|---|
| 3,499,791 A | 3/1970 | Maloney | |
| 3,795,646 A | 3/1974 | MacKenzie, Jr. | |
| 3,956,420 A | 5/1976 | Kato et al. | |
| 4,206,260 A | 6/1980 | McMahon | |
| 4,766,011 A | 8/1988 | Vincent et al. | |
| 4,870,121 A | 9/1989 | Bamji et al. | |
| 4,895,885 A | 1/1990 | Foster et al. | |
| 4,921,962 A | 5/1990 | Galbo et al. | |
| 4,946,880 A | 8/1990 | Costanzi et al. | |
| 4,978,694 A | 12/1990 | Vincent et al. | |
| 5,021,481 A | 6/1991 | Galbo et al. | |
| 5,051,458 A | 9/1991 | Costanzi et al. | |
| 5,372,840 A | 12/1994 | Kleyer et al. | |
| 5,372,841 A | 12/1994 | Kleyer et al. | |
| 5,514,738 A * | 5/1996 | Borzatta ............... | C08G 77/26 546/14 |
| 5,719,218 A | 2/1998 | Sarma | |
| 6,162,491 A | 12/2000 | Bertini | |
| 6,383,634 B1 | 5/2002 | Komfeldt et al. | |
| 7,683,260 B2 | 3/2010 | Bertini et al. | |
| 7,700,871 B2 | 4/2010 | Bertini et al. | |
| 8,572,842 B2 | 11/2013 | Bertini et al. | |
| 2008/0173467 A1* | 7/2008 | Bertini ................. | H01B 3/46 174/25 C |
| 2008/0223498 A1* | 9/2008 | Bertini ................. | H01B 7/285 156/48 |
| 2009/0133799 A1 | 5/2009 | Bertini | |
| 2009/0176960 A1 | 7/2009 | Bertini et al. | |
| 2012/0209019 A1 | 8/2012 | Pradhan | |
| 2012/0245272 A1 | 9/2012 | Dent et al. | |
| 2014/0004359 A1 | 1/2014 | Marrot et al. | |
| 2018/0312640 A1 | 11/2018 | Fouet et al. | |
| 2018/0363940 A1 | 12/2018 | Bertini et al. | |
| 2021/0017384 A1* | 1/2021 | Bertini ................. | H01B 7/1805 |

FOREIGN PATENT DOCUMENTS

| | | |
|---|---|---|
| DE | 3017442 A1 | 11/1981 |
| EP | 388321 A1 | 9/1990 |

OTHER PUBLICATIONS

Bamji et al., "Annual Report of 1982 Conference on Electrical Insulation and Dielecliic Phenomena," IEEE Service Center, Piscataway, N.J., p. 592.
Bertini, "Accelerated Aging of Rejuvenated Cables—Part I," ICC, Subcommittee A, Apr. 19, 2005, 6 pages.
CAS # 104810-47-1.
CAS # 104810-48-2.
CAS # 110553-27-0.
CAS # 129757-67-1.
CAS # 153519-44.
CAS # 153519-44-9.
CAS # 1843-05-6.
CAS # 191743-75-6.
CAS # 204848-45-3.
CAS # 689-67-8.
CAS # 79720-19-7.
Ethanox 701.
Lewis et al., "The chemistry of fumarate and maleate inhibitors with platinum hydrosilylation catalysts," Journal of Organometallic Chemistry 521(1-2):221-7, Aug. 23, 1996.

(Continued)

*Primary Examiner* — Margaret G Moore
(74) *Attorney, Agent, or Firm* — Davis Wright Tremaine LLP; George C. Rondeau, Jr.

(57) ABSTRACT

Provided are methods for extending the life of in-service electrical cable having polymeric insulation, comprising injecting a dielectric enhancement fluid composition into the cable, wherein the composition comprises: (a) one or more organoalkoxysilane functional additives (voltage stabilizer-based, hindered amine light stabilizer (HALS)-based, and/or UV absorber-based); and (b) a catalyst suitable to catalyze hydrolysis and condensation of (a), the injected composition providing for rapid initial permeation of (a) into the insulation, and extended retention of subsequent condensation products of (a) in the insulation. Additionally provided are innovative silyl functional ferrocenes (e.g., containing a ferrocene moiety and a silyl function hydrolysable to silanol) having utility as functional voltage stabilizing additives in the methods.

19 Claims, 11 Drawing Sheets

(56) References Cited

OTHER PUBLICATIONS

Shimizu et al., "The space charge behavior and luminescence phenomena in polymers at 77 k," IEEE Transactions on Electrical Insulation, EI-14:256-63, 1979 . Oct. 5, 1979.
Van Deursen et al, "AC Induced Corrosion of Low Voltage Power Cables with Aluminum Conductors," NACE International Corrosion Conference & Expo, Apr. 15, 2018, 11 pages.
Novinium, "CableCURE Gel Part B". Apr. 29, 2019, pp. 1-9. Retrieved from the Internet <URL:https://www .knomentous.com/nov _inject_instrucVMSDS/CableCU RE_ Gel_Part_B.pdf.>; p. 2, Section 3.2.

\* cited by examiner

SILANE FUNCTIONAL STABILIZERS FOR EXTENDING LONG-TERM ELECTRICAL POWER CABLE PERFORMANCE

CROSS REFERENCE TO RELATED APPLICATIONS

This application claims the benefit of U.S. Provisional Application No. 62/874,155, filed on Jul. 15, 2019, and 62/876,967, filed on Jul. 22, 2019, which are incorporated herein by reference in their entireties.

BACKGROUND OF THE INVENTION

Field of the Invention

The present invention relates to the method of enhancing and extending the life of underground cable insulation through the injection of fluids and gels containing novel silane functional additives.

Description of the Related Art

Extensive networks of underground electrical cables are in place in many parts of the industrialized world. Such underground distribution offers great advantage over conventional overhead lines in that it is not subject to wind, ice or lightning damage and is thus viewed as a reliable means for delivering electrical power without obstructing the surrounding landscape, the latter feature being particularly appreciated in suburban and urban settings. Unfortunately, these cables (which generally comprise a stranded conductor surrounded by a semi-conducting conductor shield, a polymeric insulation jacket, and an insulation shield), particularly those installed prior to 1995, often suffer premature breakdown and do not attain their originally anticipated longevity of 30 to 40 years.

For medium and high voltage cables, dielectric breakdown is generally attributed to so-called "treeing" phenomena (i.e., formation of microscopic dendritic structures within the insulation material, from which the descriptive terminology derives), which lead to a progressive degradation of the cable's dielectric strength.

Contrary to medium or high voltage cables, damage in the insulation of a low voltage cable, such as a distribution cable supplying a private home, which can result from improper installation, dig-ins, or insulation degradation due to external factors (thermal, ultraviolet (UV), chemical exposure), does not necessarily lead to failure of the connection. In medium- and high-voltage cable the electric field strength within the insulation will cause an immediate breakdown, whereas in low-voltage cable the damaged cable can still withstand the relatively low field and the cable remains operational. However, at the damaged location the conductor is exposed. Depending on the surrounding ground properties, different degradation mechanisms, such as corrosion, can occur. These mechanisms can eventually result in failure of the connection. (van Deursen, A.; Wouters, P.; Kruizinga, B.; Steennis, F., "AC Induced Corrosion of Low Voltage Power Cables with Aluminum Conductors," NACE International Corrosion Conference & Expo, 2018). Since replacing a failed section of underground cable can be a very expensive and involved procedure, there is a strong motivation on the part of the electrical utility industry to extend the useful life of existing underground cables in a cost-effective manner.

In addition, underground electrical utilities also present fire and/or explosion hazards proximate to areas of human habitation. For example, while conduits provide passageways between vaults for interconnecting electrical cables, the conduits also allow air, gases, vapors, and water to enter the interiors of the vaults. It is not unusual for such underground vaults and conduits to fill with water depending on the surface topography, water table, and recent precipitation. Water also enters through the manhole cover. Water allows for electro-chemical breakdown of the insulation to occur through tracking of cables in ducts (i.e., electrical discharge along degraded insulation) and electrical equipment failures inside one or more of the vaults, which produce hazardous concentrations of explosive and flammable gases within one or more of the vaults. Because air can never be excluded entirely from a vault, manhole events may result. Manhole events include both minor incidents (such as smoke or small fires) and/or major events (such as sustained fires and explosions). At best, a minor incident is likely to cause an electrical power outage. At worst, a major event, such as an explosion, can occasionally propel a manhole cover skyward causing property damage, injuries, and even death (United States Patent Application Publication No. 20180363940, by Bertini, Glen J.; Songras, Donald R.). While the referenced patent application proposes methods to avoid manhole events, reducing the number of underground cable failures will reduce their frequency.

A typical method for rejuvenating in-service medium and high-voltage power cables operating at above about 5 kV comprises introducing a tree retardant fluid into the void space (interstitial void volume) associated with the strand conductor geometry. This fluid diffuses into the insulation and fills the microscopic trees thereby augmenting the service life of the cable. The fluid is generally selected from a specific class of alkoxysilanes which can oligomerize within the cable's interstitial void volume, as well as within the insulation (Vincent, et al., in U.S. Pat. No. 4,766,011). This method and variations thereof employing certain rapidly diffusing components U.S. Pat. Nos. 5,372,840 and 5,372,841) have enjoyed commercial success for more than two decades or so.

Alternatively, the problem of corrosion and tracking common in low-voltage power cable systems operating below about 1 kV has been attacked by excluding water from the cable's interior by filling the interstices of the cable conductor with a dielectric gel which effectively acts as a "water block." For example, see U.S. Pat. No. 4,978,694, issued to Vincent and Meyer and references therein. While gel filling of the cable prevents entry of water into the interstices and helps prevent corrosion of the conductors, it does not address degradation of the polymeric insulation of the cable.

However, all the current methods known to applicants still do not deliver the full potential of insulation longevity. For tree-retardant fluids, this is very likely due to the diffusion of these compounds out of the cable within 10 to 15 years after treatment, thereby again exposing the cable to the above-mentioned treeing phenomena (e.g., see Bertini, "Accelerated Aging of Rejuvenated Cables-Part I," ICC, Sub. A, Apr. 19, 2005). For dielectric gels, the low voltage cable insulation does not receive additional protection against oxidation brought on by thermal, chemical or UV exposure that serve as points of water ingress. Thus, there is a continued desire on the part of the utility industry to further extend the reliable performance of treated cable, thereby improving efficiency and reducing operating costs.

Electrical-treeing phenomena which occur in polymers such as low-density polyethylene (LDPE,) crosslinked polyethylene (XLPE), and ethylene-propylene rubber (EPR) have been under study for many years. Several mechanisms have been proposed to explain electrical treeing in insulation materials subjected to high electric fields. Among these are: (a) fatigue cracking due to Maxwell stress, (b) Joule heating that leads to thermal decomposition, (c) high field-induced impact ionization, (d) hot electrons that can break polymer bonds, (e) space charge recombinations that generate UV photons capable of severing polymer bonds, and (f) thermal cycling of polymer in the presence of water leading to supersaturation of water in the polymer during the cooling portion the cycle which, upon condensation, mechanically tears voids in the polymer and (d) hot electrons that can break polymer bonds. Mechanism (a) cannot be responsible for tree initiation because Maxwell induced mechanical stresses produced in polyethylene (PE) cables operating at working stresses are only a fraction of the tensile strength of the polymer. Mechanism (b) requires the preexistence of a cavity within which partial discharges (PD) can occur, but tests with needles in solids have shown that no initial void at the needle tip is required to start tree growth. Mechanisms (c) and (d) require that the charge carriers in the polymer gain large energies from the electric field. But since the mean free path of charges in PE is of the order of a few molecular radii (5-20 Å), it is almost impossible for them to become hot enough to cause impact ionization or break bonds of the polymer chain. Mechanism (e) occurs wherever water trees have formed. Mechanism (f) occurs wherever the load and thermal cycling is severe enough to induce supersaturation. However, in high-voltage cables, gradual degradation that leads to electrical-tree initiation occurs at electrical fields much lower than the breakdown strength of the polymeric insulation. Defects that are accidentally introduced into the polymer during cable manufacture become points of high local stress and reduce insulation performance. Such points of high electrical stress are usually simulated in the laboratory by molding needles into the polymer.

To overcome the problem of electrical treeing, several solutions have been proposed thus far. For instance, McMahon, U.S. Pat. No. 4,206,260, proposes using LDPE or XLPE insulation with an amount of an alcohol of 6 to 24 carbon atoms. Maloney, U.S. Pat. No. 3,499,791, discloses a polyethylene insulation containing an inorganic ionic salt of a strong acid and a strong zwitter-ion compound. Kato et al., U.S. Pat. No. 3,956,420, discloses insulation comprising a polyolefin, a ferrocene compound and a substituted quinoline compound. Additionally, a small amount of polyhydric alcohol, dispersant, surfactant or unsaturated polymer or mixture thereof is used. MacKenzie, Jr., U.S. Pat. No. 3,795,646, recommends the use of a silicone fluid in a crosslinked polyethylene composition.

Shimizu et al. (IEEE Trans. Electr. Insul. EI-14, 256 (1979) have reported that light is emitted at needle tips in LDPE subjected to highly divergent fields at a cryogenic temperature (liquid nitrogen). Bamji et al. (Annual Report of 1982 Conference on Electrical Insulation and Dielectric Phenomena. IEEE Service Center, Piscataway, N.J., p. 592), have discovered similar emissions at room temperatures. This light has been attributed to electroluminescence (EL) caused by charge injection into the polymer from the metallic point.

Ultraviolet (UV) radiation has been detected during tree initiation, the radiation occurring at needle tips embedded in low density polyethylene (LPDE). It is proposed that the UV radiation causes photo degradation of the polymer, i.e. the energy is dissipated as photons which break the polymer and eventually create a micro cavity in which partial discharges can occur and lead to tree propagation. It is important to note that the UV radiation detected in the conditions described herein has a range of 400 to 200 nm.

Polymer additives such as antioxidants, UV absorbers and free radical scavengers like HALS (Hindered Amine Light Stabilizers) have been used in such formulations to retard radical and UV induced degradation. Prior art patents teach the use of several such additives to improve the long-term efficacy of restorative fluids resulting in the following benefits:

a. Extended dwell time in the cable insulation,
b. Being at least five times more soluble than water in polymeric insulation, these materials preferentially "wet" the insulation, thereby greatly reducing the rewetting of the insulation by water permeation,
c. Additives augment the density of the dielectric enhancement fluid formulation in which they are incorporated, and this translates into an increased supply of total fluid mass to impart additional life-extension functionality into a given interstitial volume, and
d. Chemical functionality can further extend the performance of the insulation polymer.

Examples of such additives disclosed include:

Antioxidants such as hindered phenolic additives based on 2,6-di-tert-butyl phenol derived products. In addition to their function during the extrusion process, they also slow the growth of water trees. An example of antioxidants that are used include Irgastab Cable KV10 (4,6-bis(octylthiomethyl)-o-cresol), a sulfur containing product (CAS #110553-27-0) from BASF.

Metallocenes wherein a metallic atom such as Fe, Mn, Ni, Co, Ru or Os is "sandwiched" between two cyclopentadienyl rings. Specific examples include ferrocene and derivatives thereof, such as n-butylferrocene and octanoyl ferrocene. Such components act as voltage stabilizers and UV absorbers.

Voltage stabilizers, such as 1,3-diketones (e.g., avobenzone), esters of acetoacetic acid (e.g., the ethyl ester or n-propyl ester; see German Patent No. 3017442, Mar. 8, 1983), or geranyl acetone (CAS #689-67-8).

Hindered Amine Light Stabilizers (HALS), represented by such commercial products as TINUVIN® 123 (CAS #129757-67-1) and TINUVIN® 152 (CAS #191743-75-6) from BASF, and Sanduvor 3058 (CAS #79720-19-7) from Cytec. Such materials are well known in the art to scavenge free radicals and mitigate the damage caused by UV emissions within polymers. Additional examples of HALS may be found in, e.g., U.S. Pat. No. 5,719,218, hereby incorporated by reference.

UV absorbers and energy quenchers, including benzotriazoles and nickel chelates, such as those listed in U.S. Pat. No. 4,870,121, hereby incorporated by reference. Specific examples include TINUVIN® 1130 (mixture of CAS #104810-47-1 and CAS #104810-48-2 and polyethylene glycol) and TINUVIN® 479 (CAS #204848-45-3) from BASF. UV absorbing material, such as octocrylene and menthylanthranilatementhyl anthranilatementhylanthranilate, benzophenone (available under the trade name Uvinul®3008 from BASF), substituted benzophenones and TINUVIN® 400 (CAS #153519-44).

When a rejuvenation fluid, containing additives such as those described above, is utilized, it is highly desirable that the various protective components diffuse rapidly into the cable insulation to prevent further degradation or failure. At the same time, it is expected that the components of the rejuvenation fluid will prolong the useful life of the cable for literally decades. Conventional additives are discrete molecules or polymers whose natures do not change over time. Consequently, their diffusion rates also do not change over time. A conventional additive molecule which has a rapid diffusion rate that allows it to provide protection for the cable insulation shortly after injection of the rejuvenation fluid will not provide adequate long term protection because it will diffuse through the cable wall and be lost to the exterior. In contrast, a conventional additive which has a slow diffusion rate that allows it to provide long term protection will take months or years to reach an effective level in the cable insulation, risking cable failure in the interim.

The current state of the art compositions, utilizing the above functional additives suffer from either a significant lag time before an effective level is reached or a lack of permanence.

This is illustrated by two commercial antioxidants, 2,6-Di-tert-butylphenol (Ethanox 701) and 4,6-bis (octylthiomethyl)-o-cresol (IRGASTAB Cable KV-10). FIG. 1 illustrates the exudation of the two materials from polyethylene model cables. The procedural details for exudation experiments are given later. 2,6-Di-tert-butylphenol rapidly diffuses through the polyethylene wall and into the water in which the model cables are soaking. Over 95% of the material is lost in less than 4000 h at 55° C. In contrast, KV-10 diffuses much more slowly, and over 35% is still contained in the polyethylene after 40,000 h at 55° C. The faster diffusing 2,6-Di-tert-butylphenol would not provide comparable long-term antioxidant protection compared to KV-10 in an underground electrical cable.

FIG. 2 illustrates the permeation of the two materials into disks of polyethylene at 55° C. Procedural details of the permeation experiments are given later. More rapidly diffusing 2,6-Di-tert-butylphenol reaches saturation (12.9 wt %) in about 145 h, and it is at 90% of saturation in 73 h. In contrast, KV-10 which is slower diffusing and much less soluble (takes 193 h to reach saturation (3.3 wt %) and 116 h to reach 90% of saturation. The difference in time to reach 90% saturation at 55° C. could be equivalent to weeks or months of difference at normal underground cable temperatures, so the less rapidly diffusing KV-10 would not provide short term protection to a cable treated with it.

BRIEF DESCRIPTION OF THE SEVERAL VIEWS OF THE DRAWINGS

Various embodiments in accordance with the present disclosure will be described with reference to the following drawings.

DETAILED DESCRIPTION OF THE INVENTION

Figure 1:
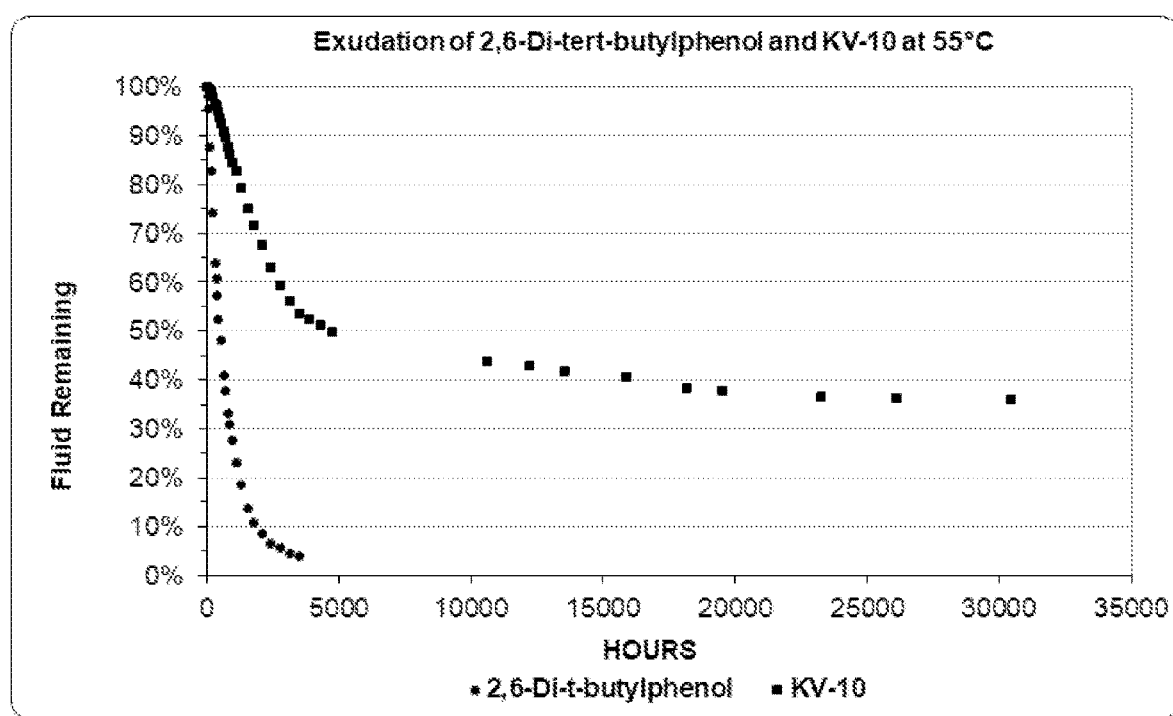
FIG. 1 is an illustration of the exudation of the two prior art materials from model cable.
Figure 2:
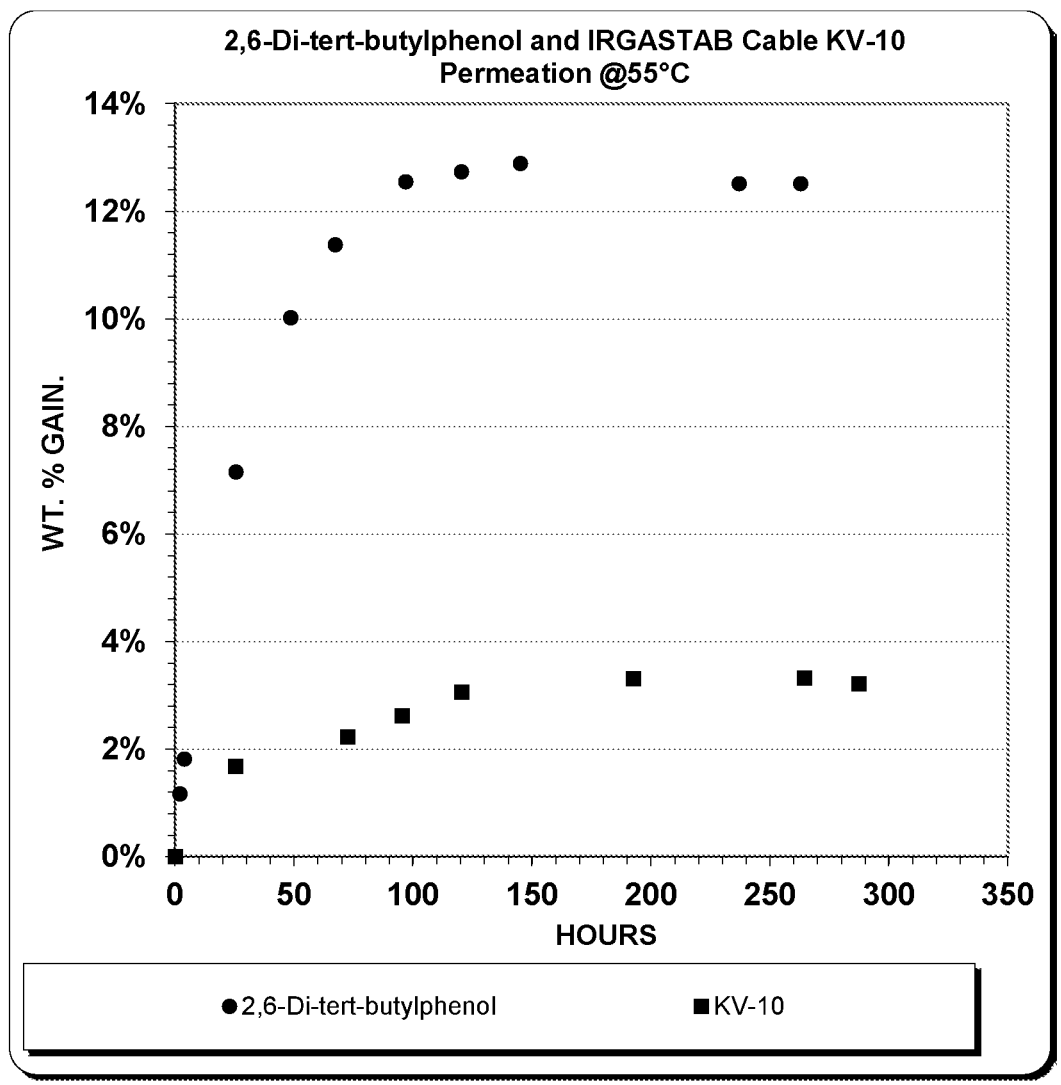
FIG. 2 is an illustration of the permeation of the two prior art materials into disks of polyethylene at 55° C.

Described herein are novel silane functional additives specifically for use with underground cable insulation rejuvenation fluids and gels to enhance and extend long term performance of underground cable insulation. By covalently binding to the oligomer formed upon hydrolysis of rejuvenation fluid or forming oligomers among themselves upon hydrolysis, these additives provide greater long-term stability by being immobilized in the matrix.

Tree-Retardant Fluid Embodiment

The instant method relates to a method for extending the useful life of at least one in-service electrical cable section having a stranded conductor surrounded by a conductor shield encased in a polymeric insulation jacket with an outer insulation shield, and having an interstitial void volume in the region of the conductor, with the cable section having an average operating temperature T.

One embodiment of the method comprises: injecting a dielectric enhancement fluid composition into the interstitial void volume, and/or into the space between the insulation jacket and outer insulation shield, said composition comprising at least one component selected from:

(1) a water-reactive material selected from:
 (i) a class 1 organosilane monomer, as described herein, having at least two water-reactive groups;
 (ii) the above organosilane monomer (i) wherein at least one of the water-reactive groups has been substituted with a condensable silanol group;
 (iii) an oligomer of the above organosilane monomer (i); or
 (iv) a co-oligomer of the above organosilane monomer (i) with a different organosilane monomer, said organosilane monomer (i) having a diffusion coefficient at least about 15 times greater than the diffusion coefficient of its corresponding tetramer, the diffusion coefficient being determined at temperature T.
(2) a water-reactive material selected from:
 (i) a class 2 organosilane monomer, as described herein, having at least two water-reactive groups;
 (ii) the above organosilane monomer (i) wherein at least one of the water-reactive groups has been substituted with a condensable silanol group; or
 (iii) an oligomer of the above organosilane monomer (i);
(3) a non-water-reactive organic material which has a diffusion coefficient of less than about $10^{-9}$ $cm^2$/sec and an equilibrium concentration of at least about 0.005 $gm/cm^3$ in said polymeric insulation, the diffusion coefficient and the equilibrium concentration being determined at temperature T; or
(4) an organic compound having an equilibrium concentration in the polymeric insulation at 55° C. which is less than 2.25 times the equilibrium concentration at 22° C.;
(5) silane functional additives derived from:
 (i) antioxidants such as hindered phenolic additives based on 2,6-di-tert-butyl phenol derived products.

(ii) voltage stabilizers based on metallocenes wherein a metallic atom such as Fe, Mn, Ni, Co, Ru or Os is "sandwiched" between two cyclopentadienyl rings.
(iii) free radical scavengers that mitigate the damage caused by UV emissions within polymers such as Hindered Amine Light Stabilizers, based on tetramethyl piperidine derivatives.
(iv) UV absorbers and energy quenchers, including benzotriazoles, triazines, benzophenones, nickel chelates; and/or
(6) at least one material which functions as a catalyst for the hydrolysis and condensation of the water reactive materials of (1), (2), and (5), including but not limited to strong acids and certain compounds of titanium and tin.

Further, the instant method uses a computer simulation method to determine a flux-weighted temperature of a cable section experiencing a fluctuating load, defined infra, which may be used to assess diffusion and solubility of components being used to treat the cable, the latter calculated temperature resulting in better prediction of ultimate cable performance than the above recited average operating temperature T.

The above method may also be practiced by injecting the fluid into the interstitial void volume of a cable and confining it therein at an elevated pressure.

The first component class (Class 1) according to the present method is selected from: a water-reactive organosilane monomer having at least two water-reactive groups (i.e., the organosilane can undergo hydrolysis and subsequent condensation), such an organosilane monomer wherein at least one of the water-reactive groups has been substituted with a condensable silanol group (i.e., it has been partially or completely hydrolyzed), an oligomer of the above described monomers, or a co-oligomer of the above monomers with a non-Class 1 organosilane, each oligomer or co-oligomer having either residual water-reactive and/or silanol functionality. Thus, for example, the organosilane can be an alkoxy-functional organosilane, a reaction product thereof which contains residual alkoxy, or an enoloxy-functional organosilane, such as those illustrated below. Additional water-reactive systems contemplated include ketoximino, amino, amido, acyloxy and hydrido groups bonded to silicon. For the purposes herein, the monomer (or the monomer parent of any above-mentioned oligomer or co-oligomer) of the Class 1 component exhibits a diffusion coefficient in the insulation polymer which is at least about 15 times greater than that of the corresponding tetramer, the latter being terminated with either the residual water-reactive group(s) or silanol group(s). This ratio of diffusion coefficients of monomer to tetramer is measured at the average operating temperature of the cable, or preferably at the above defined flux-weighted temperature and is preferably greater than about 20.

Examples of Class 1 Component include:
phenylmethyldimethoxysilane
(3-methylphenyl)methyldimethoxysilane
3-cyanopropylmethyl dimethoxysilane
di(p-tolyl)dimethoxysilane
(4-methylphenyl)methyldimethoxysilane
3-cyanobutylmethyldimethoxysilane
(4-methyphenethyl) methyldimethoxysilane
dimethyldi-n-butoxysilane When a Class 1 component is included in a dielectric enhancement fluid which also contains another condensable silane (i.e., not a Class 1 component but one which can condense with a Class 1 component), a co-oligomer can form between these species upon hydrolysis/condensation in addition to the respective homo-oligomers. Thus, since some units contain the larger and/or less flexible Class 1 group, the mass flux of the total oligomer is retarded. Put another way, judicious formulation with Class 1 components allows the tailoring of the total oligomer exudation flux to a value lower than for the alkoxysilanes used in the prior art cable restoration methods. Preferred Class 1 components include p-tolylethylmethyl-dimethoxysilane, cyanopropylmethyldimethoxysilanes (e.g., 3-cyanopropylmethyl-dimethoxysilane), and cyanobutylmethyldimethoxysilanes (e.g., 3-cyanobutylmethyl-dimethoxysilane). It is also preferred that the organoalkoxysilane components of any class described herein are used in conjunction with a condensation catalyst.

The second component class (Class 2) comprises water reactive organosilane monomers, condensable monomers, oligomers or co-oligomers similar to those described above which contain at least one group or sidechain (—R) attached to silicon having between 7 and about 20 saturated carbon atoms. This R group can have a linear, branched, or cyclic structure and can further comprise heteroatoms such as oxygen, nitrogen, and sulfur provided it also comprises at least 7 (—$CH_2$—) units, the latter not necessarily, but preferably, being sequential. Furthermore, R can be a substituted group if it meets the above criterion. Thus, for example, this group can have a skeleton such as $CH_3$—$CH_2$—$CH_2$—$CH_2$—$CH_2$—$CH_2$—$CH_2$—, $CH_3$—$CH_2$—$CH_2$—O—$CH_2$—$CH_2$—$CH_2$—$CH_2$—$CH_2$—, Ph-$CH_2$—$CH_2$—$CH_2$—$CH_2$—$CH_2$—N—$CH_2$—$CH_2$—, Hex-$CH_2$—$CH_2$—$CH_2$—$CH_2$—$CH_2$—O—$CH_2$—$CH_2$—, Hex-$CH_2$—$CH_2$—, $CH_2$=CH—$CH_2$—$CH_2$—$CH_2$—$CH_2$—$CH_2$—$CH_2$—$CH_2$—, and so on, wherein Ph and Hex represent phenyl group and cyclohexyl group, respectively.

Preferably, Class 2 comprises $C_7$ to $C_{20}$ alkyl-functional alkoxysilanes, such as:
Phenyloctyldialkoxysilane
Dodecylmethyldialkoxysilane
n-octadecyldimethylmethoxysilane
n-decyltriethoxysilane
dodecylmethyldiethoxysilane
dodecyltriethoxysilane
hexadecyltrimethoxysilane
1-docosenyltriethoxysilane
n-octyltrimethoxysilane
n-octadecyltrimethoxysilane
and partial hydrolyzates of the above alkoxysilanes The larger hydrocarbon groups will generally increase the equilibrium concentration of the Class 2 component as well as decrease its diffusivity in the insulation polymer. Furthermore, while some unsaturation on the side chains is permitted, these R groups are preferably saturated straight chain hydrocarbons, such as octyl, nonyl, decyl, undecyl, dodecyl, tetradecyl and hexadecyl. Less preferred are arylalkyl or substituted alkyl side chains provided the above criterion is met. It is believed that increasing the number of methylene units of the hydrocarbon group of the Class 2 component also retards diffusion due to steric hindrance. Although a perceived disadvantage of employing too many methylene units is that their bulk fills the limited treatment volume available, it is believed that the above recited chain lengths will provide the benefits of increased longevity without unduly sacrificing excess interstitial volume and without requiring too long a time for the material to diffuse into the cable insulation. These diffusion requirements vary, as described previously, depending on the expected operating temperature profile of the cable. As indicated in connection with the description of the Class 1 component, a co-oligomer would form when a Class 2 component is combined with another alkoxysilane to form the dielectric enhancement fluid, which co-oligomer would contain the relatively soluble hydrocarbon segment. While prior art alkoxysilane dielectric enhancement fluids such as phenylmethyldimethoxysilane trade off a large decrease in solubility to attain the desired decrease in diffusivity with increasing degree of polymerization, Class 2 materials enjoy a less severe decrease in equilibrium concentration as the degree of polymerization of the Class 2 component increases. Likewise, Class 2 components enjoy a lower reduction in equilibrium concentration (i.e., solubility in the insulation polymer) when employed in mixtures with other condensable materials as they co-oligomerize versus prior art alkoxysilane dielectric enhancement fluids, thereby mitigating the chemical condensation contribution to the supersaturation phenomenon described in U.S. Pat. No. 6,162,491. To illustrate this point, consider a polyethylene insulation jacket which is saturated with a catalyst-containing organoalkoxysilane monomer such as phenylmethyldimethoxysilane and is exposed to moisture. As the monomer hydrolyzes and condenses to form, e.g., a dimer, it immediately tends to supersaturate the polyethylene since this dimer has a lower solubility than one of the instant Class 2 materials. It should be appreciated that neither a Class 1 component nor a Class 2 component has to diffuse through the insulation polymer as rapidly as the oligomer of any other alkoxysilane present in the dielectric enhancement fluid with which it is to co-oligomerize. For example, if the other alkoxysilane were phenylmethyldimethoxysilane, this fluid could permeate into the insulation wherein a portion would dimerize (assuming water and an appropriate catalyst is also present). As long as some of the Class 1 or Class 2 component (i.e., the monomer thereof) can "catch up" with the dimer and higher oligomers of the phenylmethyldimethoxysilane, it will have an opportunity to co-oligomerize therewith, thereby creating a hetero-trimer or higher hetero-oligomer. Thus, while many of the Class 1 or 2 materials have lower diffusion rates than, e.g., phenylmethyldimethoxysilane, they would generally have higher diffusion rates than the tetramer, and preferably the dimer, of the latter compound.

The third component class (Class 3) comprises non-water-reactive materials which have a diffusion coefficient of less than about $10^{-9}$ cm$^2$/sec and have an equilibrium concentration of at least about 0.005 gm/cm$^3$ in the insulation polymer of the cable at the average operating temperature of the cable T or, preferably, at above defined flux-weighted temperature $T_{flux-avg}$. According to the instant method, the amount of Class 3 component is limited by the above described over saturation phenomenon and the amount supplied to a cable is controlled by proper formulation of the total dielectric enhancement fluid composition as well as the total quantity thereof that is injected. Thus, it is contemplated that the higher the equilibrium concentration, the better. It is further preferred that the equilibrium concentration of this component is at least 0.01 gm/cm$^3$ in the insulation polymer at the average operating temperature of the cable or, preferably, at above defined flux-weighted temperature.

Non-limiting examples of the Class 3 components include:
 1. Metallocenes wherein a metallic atom such as Fe, Mn, Ni, Co, Ru or Os is "sandwiched" between two cyclopentadienyl rings. Specific examples include ferrocene and derivatives thereof, such as n-butylferrocene and octanoyl ferrocene. Such components act as voltage stabilizers and UV absorbers.
 2. Hindered Amine Light Stabilizers (HALS), represented by such commercial products as TINUVIN® 123 (CAS #129757-67-1) and TINUVIN® 152 (CAS #191743-75-6) form Ciba® and Sanduvor 3058 (CAS #79720-19-7) from Cytec. Such materials are well known in the art to scavenge free radicals and mitigate the damage caused by UV emissions within polymers. Additional examples of HALS may be found in, e.g., U.S. Pat. No. 5,719,218, hereby incorporated by reference.
 3. Other light stabilizers, including triazoles and nickel chelates, such as those listed in U.S. Pat. No. 4,870,121, hereby incorporated by reference. Specific examples include TINUVIN® 1130 (mixture of CAS #104810-47-1 and CAS #104810-48-2 and polyethylene glycol) and TINUVIN® 479 (CAS #204848-45-3) from Ciba.
 4. UV absorbing material, such as octocrylene and menthylanthranilate, benzophenone (available under the trade name Uvinul®3008 from BASF), substituted benzophenones and TINUVIN® 400 (CAS #153519-44-9).
 5. Hydrolyzates of Class 1 or Class 2 components previously listed which meet the solubility and diffusivity criteria for class 3 components.

Those skilled in the art will readily recognize that many of the Class 3 components are solids at typical injection temperatures and, therefore, can be injected only as part of a dielectric enhancement formulation wherein the solid is either dissolved or suspended in a fluid. Of course, this restriction applies to any solid component according to the present method (e.g., ferrocene). An advantage of employing such a solid component is that it imparts an increased density to the injection formulation, which allows even more functional material to be supplied to the cable insulation.

The fourth component class (Class 4) comprises materials which have a ratio of equilibrium concentration (solubility) at 55° C. to equilibrium concentration at 22° C. in the cable insulation polymer of less than 2.25, and more preferably less than 2.0. Prior art materials (first two rows) suffer from values more than 2.25; this increases the risk of supersaturation when a cable goes through significant temperature fluctuations, as described by U.S. Pat. No. 6,162,491. Class 4 materials exhibit a surprisingly low change in equilibrium concentration in the insulation polymer as a function of temperature, thereby decreasing their contribution to the above cited supersaturation phenomenon. It is noted that ferrocene is representative of both class 3 and class 4 components and that cyanopropyl methyldimethoxysilanes and cyanobutyl methyldimethoxysilanes are representative of both class 1 and class 4 components. Non-limiting examples of Class 4 materials are ferrocene (this is both a class 3 and class 4 component), 3-cyanobutylmethyldimethoxysilane, 3-cyanopropylmethyldimethoxysilane and 2-cyano-butylmethyldimethoxysilane.

An additional advantage associated with the use of the above four described component classes is that the components according to the instant method generally exhibit relatively low vapor pressures and high flash points which decrease the fire and explosion hazard associated with injection of volatile materials.

The fifth component class comprises silane functional variants of class 3 components, including:
 (i) Antioxidants such as hindered phenolic additives based on 2,6-di-tert-butyl phenol derived products.
 (ii) Voltage stabilizers based on metallocenes wherein a metallic atom such as Fe, Mn, Ni, Co, Ru or Os is "sandwiched" between two cyclopentadienyl rings.

(iii) Free radical scavengers that mitigate the damage caused by UV emissions within polymers such as Hindered Amine Light Stabilizers, based on tetramethyl piperidine derivatives.

(iv) UV absorbers and energy quenchers, including benzotriazoles, triazines, benzophenones, nickel chelates.

The sixth component class comprises one or more hydrolysis/condensation catalysts. The catalysts contemplated herein are any of those known to promote the hydrolysis and condensation of organoalkoxysilanes. Typically, these are selected from organometallic compounds of tin, manganese, iron, cobalt, nickel, lead, titanium or zirconium. Examples of such catalysts include alkyl titanates, acyl titanates and the corresponding zirconates. Specific non-limiting examples of suitable catalysts include tetra-t-butyl titanate (TBT), dibutyltindiacetate (DBTDA), dibutyltindilaurate (DBTDL), dibutyltindioleate, tetraethylorthotitanate, tetraisopropyl titanate (TIPT), tetraoctadecylorthotitanate, dibutyltindioctoate, stannous octoate, dimethyltinneodeconoate, di-N-octyltin-S,S-isooctylmercaptoacetate, dibutyltin-S,S-dimethylmercaptoacetate, or diethyltin-S,S-dibutylmercaptoacetate. In general, the catalyst is added at a level of about 0.05 to about 5% based on the total weight of the organoalkoxysilane components. More typically, it is supplied at a level of about 0.1 to about 2% or at a level of about 0.2 to 1% by weight according to the above-mentioned basis.

Also preferred are condensation catalysts based on an acid having a pKa less than about 2.1 which have been well documented in U.S. Pat. No. 7,700,871. The acid catalyst to be included in the dielectric property-enhancing fluid composition of the instant method has a pKa less than about 2.1 and is added in an effective amount for promoting the hydrolysis reaction of the organoalkoxysilane with water and subsequent condensation of the resulting product of hydrolysis. For the purposes herein, pKa has its usual definition of the negative logarithm (base 10) of the equilibrium constant (Ka) for the dissociation of the acid. Preferably, the acid to be used in the instant method has a pKa value between about −14 and about 0. The optimum acid catalyst content may be determined experimentally using, e.g., the below described model cable tests. One skilled in the art will appreciate that it is desirable to employ an amount of acid catalyst which results in the retention of essentially all hydrolysis/condensation products in the model cable. However, this amount should be balanced by the cost of the catalyst. Moreover, the acid content should be kept as low as possible since it can contribute to the corrosion of the cable conductor, and this factor should be considered in the balance. Although it is recognized that the catalyst and the organoalkoxysilane interact on a molar basis, the acid catalyst (b) should generally be added at a level of about 0.02 to about 1% based on the weight of the organoalkoxysilane (a) component. More typically, it should be supplied at a level of from about 0.05 wt. % to about 0.6 wt. %, preferably from about 0.06 wt. % to about 0.5 wt. %. Preferably, the acid catalyst (b) is selected from strong acids which essentially dissociate completely in an aqueous solution. For the purposes herein, preferred acids include dodecylbenzenesulfonic acid (DDBSA), methanesulfonic acid, trifluoromethanesulfonic acid, benzenesulfonic acid, alkyl substituted benzenesulfonic acids and alkyl substituted naphthalene sulfonic acids, sulfuric acid, nitric acid, trifluoracetic acid, dichloroacetic acid and phosphoric acid.

Furthermore, these components may be included in a dielectric property-enhancing fluid composition to be used either in a conventional (low-pressure) restoration method or the previously mentioned high-pressure treatment method of U.S. Pat. No. 8,572,842 which employs special high-pressure connectors of the type described in U.S. Pat. No. 7,683,260. In brief, the high-pressure method comprises filling the interstitial void volume of the cable with at least one dielectric property-enhancing fluid composition at a pressure below the elastic limit of the polymeric insulation jacket, and confining the dielectric property-enhancing fluid within the interstitial void volume at a residual pressure greater than about 50 psig, the pressure being imposed along the entire length of the cable and being below the elastic limit, wherein the composition includes at least one component selected from Class 1, Class 2, Class 3 or Class 4. As used herein, the term "elastic limit" of the insulation jacket of a cable section is defined as the internal pressure in the interstitial void volume at which the outside diameter (OD) of the insulation jacket takes on a permanent set at 25° C. greater than 2% (i.e., the OD increases by a factor of 1.02 times its original value), excluding any expansion (swell) due to fluid dissolved in the cable components. This limit can, for example, be experimentally determined by pressurizing a sample of the cable section with a fluid having a solubility of less than 0.1% by weight in the conductor shield and in the insulation jacket (e.g., water), for a period of about 24 hours, after first removing any covering such as insulation shield and wire wrap. After the pressure is released, the final OD is compared with the initial OD in making the above determination. The actual pressure used to fill the interstitial void volume is not critical provided the above-defined elastic limit is not attained. After the desired amount of the fluid has been introduced, the fluid is confined within the interstitial void volume at a sustained residual pressure greater than about 50 psig. It is preferred that the residual pressure is between about 100 psig and about 1000 psig, most preferably between about 300 psig and 600 psig. Further, it is preferred that the injection pressure is at least as high as the residual pressure to provide an efficient fill of the cable section (e.g., 550 psig injection and 500 psig residual). In another embodiment of this method, the residual pressure is sufficient to expand the interstitial void volume along the entire length of the cable section by at least 5%, again staying below the elastic limit of the polymeric insulation jacket. It is also contemplated that the dielectric property-enhancing fluid composition may be supplied at a pressure greater than about 50 psig for more than about 2 hours before being contained in the interstitial void volume. It is further preferred that the dielectric property-enhancing fluid composition is selected such that the residual pressure decays to essentially zero psig due to diffusion into the conductor shield and into the insulation jacket of the cable. This pressure decay generally occurs over a period of greater than about 2 hours, preferably in more than about 24 hours, and in most instances within about two years of containing the fluid composition. It is to be understood that this pressure decay results from diffusion of the various components of the composition out of the interstitial volume and not by leaking past any connector.

The method for treating cables under sustained pressure to enhance the cable segment involves filling the interstitial void volume with at least one dielectric property-enhancing fluid at a pressure below the elastic limit of the polymeric insulation jacket, and subsequently confining the dielectric property-enhancing fluid within the interstitial void volume at a desirable sustained residual pressure imposed along the entire length of the cable segment and, again, below the elastic limit. The method for treating cables under sustained pressure exploits the discovery that, when the interstitial void volume of a cable segment is filled with a dielectric property-enhancing fluid and the fluid confined therein at a high residual pressure, the volume of fluid actually introduced significantly exceeds the volume predicted from a rigorous calculation of the cable's expansion at the imposed pressure. The difference between the observed and calculated volume change increases with pressure and is believed to be due mainly to the accelerated adsorption of the fluid in the conductor shield as well as transport thereof through the conductor shield and insulation of the cable. Thus, with sufficient residual sustained pressure, it is possible to expand the insulation jacket of an in-service cable segment in a manner that is so slight as to not cause any mechanical damage to the cable or to induce any untoward electrical effects, yet large enough to significantly increase the volume of dielectric property-enhancing fluid which can be introduced. As a result, and unlike the prior art, the integrated method does not require the soak period, and the associated external pressure reservoir, to introduce a sufficient amount of fluid to effectively treat the cable segment. As noted elsewhere herein, the term "elastic limit" of the insulation jacket of a cable segment is defined as the internal pressure in the interstitial void volume at which the outside diameter of the insulation jacket takes on a permanent set greater than 2% at 25° C. (i.e., the OD increases by a factor of 1.02 times its original value), excluding any expansion (swell) due to fluid dissolved in the cable components. For the purposes herein, it is preferred that the above-mentioned residual pressure is no more than about 80% of the above defined elastic limit.

The in-service cable segment to which the methods discussed are generally applied is the type used in underground residential distribution and typically comprises a central core of a stranded copper or aluminum conductor encased in a polymeric insulation jacket. The strand geometry of the conductor defines an interstitial void volume. As is well known in the art, there is usually also a semi-conducting polymeric conductor shield positioned between the conductor and insulation jacket. However, this shield can also be of a high permittivity material sometimes utilized in EPR cables. Further, low voltage (secondary) cables do not employ such a shield. In addition, the cables contemplated herein often further comprise a semi-conducting insulation shield covering the insulation jacket, the latter being ordinarily wrapped with a wire or metal foil grounding strip and, optionally, encased in an outer polymeric, metallic, or combination of metallic and polymeric, protective jacket. The insulation material is preferably a polyolefin polymer, such as high molecular weight polyethylene (HMWPE), cross-linked polyethylene (XLPE), a filled copolymer or rubber of ethylene and propylene (EPR), vinyl acetate or is a solid-liquid dielectric such as paper-oil. The base insulation may have compounded additives such as anti-oxidants, tree-retardants, plasticizers, and fillers to modify properties of the insulation. Medium voltage, low voltage and high voltage cables are contemplated herein. As noted elsewhere herein, the term "in-service" refers to a cable segment which has been under electrical load and exposed to the elements for an extended period. In such a cable, the electrical integrity of the cable insulation has generally deteriorated to some extent due to the formation of water trees, as described above. It is also contemplated, however, that the method discussed can be used to enhance the dielectric properties of a new cable as well as an in-service cable. For the purposes herein, "sustained pressure" indicates that the fluid is contained or trapped within a cable segment's interstitial void volume at the residual pressure after the pressurized fluid source is removed, whereupon the pressure decays only by subsequent permeation through the conductor shield and insulation, as described infra. The method for treating cables under sustained pressure teaches the relationship between pressure and the augmented injection volume under sustained residual pressure and demonstrates the feasibility of eliminating or reducing the soak phase on cables with small conductors.

Experiment 1—Exudation Test

This test demonstrates the rate of diffusion for silane variants and their retention rate in the insulation compared to conventional fluid additives.

Samples of the additives at about 20 wt % in toluene for the exudation experiments were prepared as indicated in Table 1 below. About 0.3 wt % DDBSA (dodecylbenzene sulfonic acid) was added as a hydrolysis/condensation catalyst to the three silane-bound additives. The ferrocene sample had to be heated to 55° C. to get all the solid to dissolve in toluene. During injection of this solution into model cable, a little of the ferrocene crystallized out. The silane-BZT is a solid at room temperature, so it was melted in a 55° C. oven before sample preparation. All other samples were prepared at room temperature. Except for the ferrocene solution, all the other samples remained homogeneous indefinitely at room temperature.

TABLE 1

| | Toluene | Additive | | DDBSA | | Total |
|---|---|---|---|---|---|---|
| Additive | Weight (g) | Weight (g) | Weight % | Weight (g) | Weight % | Weight (g) |
| Ferrocene | 5.3387 | 1.3350 | 20.00 | 0.0000 | 0.000 | 6.6737 |
| Tinuvin 1130 | 4.0118 | 1.0029 | 20.00 | 0.0000 | 0.000 | 5.0147 |
| Tinuvin 123 | 4.0613 | 1.0152 | 20.00 | 0.0000 | 0.000 | 5.0765 |
| HALS-DMS | 4.0562 | 1.0140 | 19.92 | 0.0192 | 0.377 | 5.0894 |
| Silane-BZT | 7.5473 | 1.8867 | 19.94 | 0.0283 | 0.299 | 9.4623 |
| Silane-AO | 4.0004 | 1.0004 | 19.94 | 0.0158 | 0.315 | 5.0166 |
| Toluene | 4.0004 | 0.0000 | 0.00 | 0.0000 | 0.000 | 4.0004 |

Model cable sample are prepared as follows:

Approximately 12" long pieces of ⅛" polyethylene tubing are cut from a roll (Freelin Wade 1C-109-10). The tubes are wiped with an acetone-wet paper towel to remove the ink markings.

An equal number of aluminum wires of approximately 11.5" length are cut from a roll and wiped with an acetone-wet paper towel to remove any grease and corrosion.

Sufficient numbered metal tags are cleaned with an acetone-wet paper towel and allowed to air dry.

For each sample, the polyethylene tube, the aluminum wire, and the metal tag are separately weighed to 0.1 mg, and the weights are recorded in the exudation spreadsheet. Liberal use of an anti-static gun and zeroing the balance after each measurement provide much more repeatable weights.

The aluminum wire is then carefully threaded through the PE tube leaving an approximately equal empty space on each end of the tube. A numbered metal tag is attached to each sample for identification.

The assembled sample is weighed to 4 decimal places, and the value is recorded in the exudation spreadsheet. If the difference between this weight and the sum of the weights of the individual components is greater than 0.5 mg, the sample should be disassembled and redone. Fluctuating weights are typically due to static electricity or failure to zero the balance.

The fluid to be tested is drawn up into a 1 mL Hamilton Gastight syringe fitted with a 16-gauge hypodermic needle. This size of needle fits snugly into the interior of the polyethylene tubing. Bubbles in the syringe should be removed before injection of the fluid into the sample.

The syringe is inserted into one end of the tubing, and gentle pressure on the piston is used to push fluid through the tubing until the fluid passes the far end of the aluminum wire but does not reach the far end of the polyethylene tubing. The needle is then withdrawn from the tube. With low viscosity fluids, care must be taken to keep the two ends of the tube level or fluid will flow out the lower end.

The far end of the tube, which is not contaminated with fluid, can be sealed by pushing it into a pit on the face of a soldering iron for a count of two and then gently pushing the top and sides of the bead of soft polyethylene to form a sealed ball on the end of the tubing. The end of the tubing through which the needle was inserted must be cleaned before sealing. A paper towel is first used to wipe any fluid from the exterior of the tube. Then, for low viscosity fluids, a piece of pipe cleaner, available in craft stores, is inserted into the space between the end of the aluminum wire and the end of the polyethylene tube to absorb fluid. This should be repeated at least once. The end should be wiped again with paper towel and can then be sealed in the manner already described. For viscous samples, it is usually necessary to clean the space between end of the aluminum wire and the end of the polyethylene tube with a dry pipe cleaner to remove most of the material, and then use an acetone-wet pipe cleaner to remove the rest. A clean pipe cleaner should then be used to make sure no significant residual acetone remains before sealing.

The sealed model cable sample is weighed to the nearest 0.1 mg, and the value is recorded in the exudation spreadsheet.

The set of model cable samples for one fluid is placed into a 16 oz. HDPE jar, the jar is filled with tap water approximating the desired aging temperature, and the jar is capped. The jar is placed in an oven to maintain the desired test temperature. The time at which the samples were placed into the oven is recorded in the exudation spreadsheet.

Samples are measured during the test following procedures below:
1. The 16 oz. jar is removed from the oven, and the water is poured out. The samples are placed in a paper towel and wiped to remove most of the water.
2. Each sample and tag combination is then separately wiped with a fresh paper towel to remove as much of the water as possible. The tag should be moved on the sample to make sure no water is left trapped under it.
3. Weight of each sample/tag is measured to the nearest 0.1 mg, and the results are entered into the exudation spreadsheet along with the time the measurement was made. Both the polyethylene and the metal of the tag should be in contact with the pan of the balance and an anti-static gun should be used to avoid static charge issues.
4. The samples are then put back into the 16 oz. HDPE jar, the jar is filled with tap water approximating the aging temperature, and the jar is replaced in the oven.

Samples are measured upon completion of exudation by the following procedures:
1. After the exudation curves level off, a final measurement is made on each sample. This can be done all at one time to get replicates or staggered over a period to look for ongoing changes.
2. After the sample is dried and weighed as described above, the seals at each end of the tube are removed and retained, and the aluminum wire is withdrawn.
3. The aluminum wire is wiped clean with an acetone-wet paper towel and dried by waving it in the air. Its weight is determined to 0.1 mg, and the weight is recorded in the exudation spreadsheet. Changes in the weight of the wire can give indications of corrosion by the test sample.
4. The exterior of the model cable is cleaned with an acetone-wet paper towel. The interior is cleaned by pulling air through it using a vacuum aspirator to remove as much residual fluid as possible. Then about 2×30 mL of acetone is pulled through it, and the sample is dried by pulling air through it again. The two seals cut off the ends of the sample are wiped with a paper towel, and their internal cavities are cleaned out with a pipe cleaner. The combined seals and polyethylene sample are weighed to the nearest 0.1 mg, and the weight is recorded in the exudation spreadsheet. The difference between this weight and the original weight of the polyethylene sample represents the minimum amount of material retained in the polyethylene. Since polyethylene is known to lose some weight during heat aging, the actual weight of retained material is usually slightly larger.

For the samples shown in Table 1, exudation experiments were conducted using five samples for each additive. Samples were analyzed for retention in approximately 250-hour increments between 500 and 1500 hours.

Figure 3:
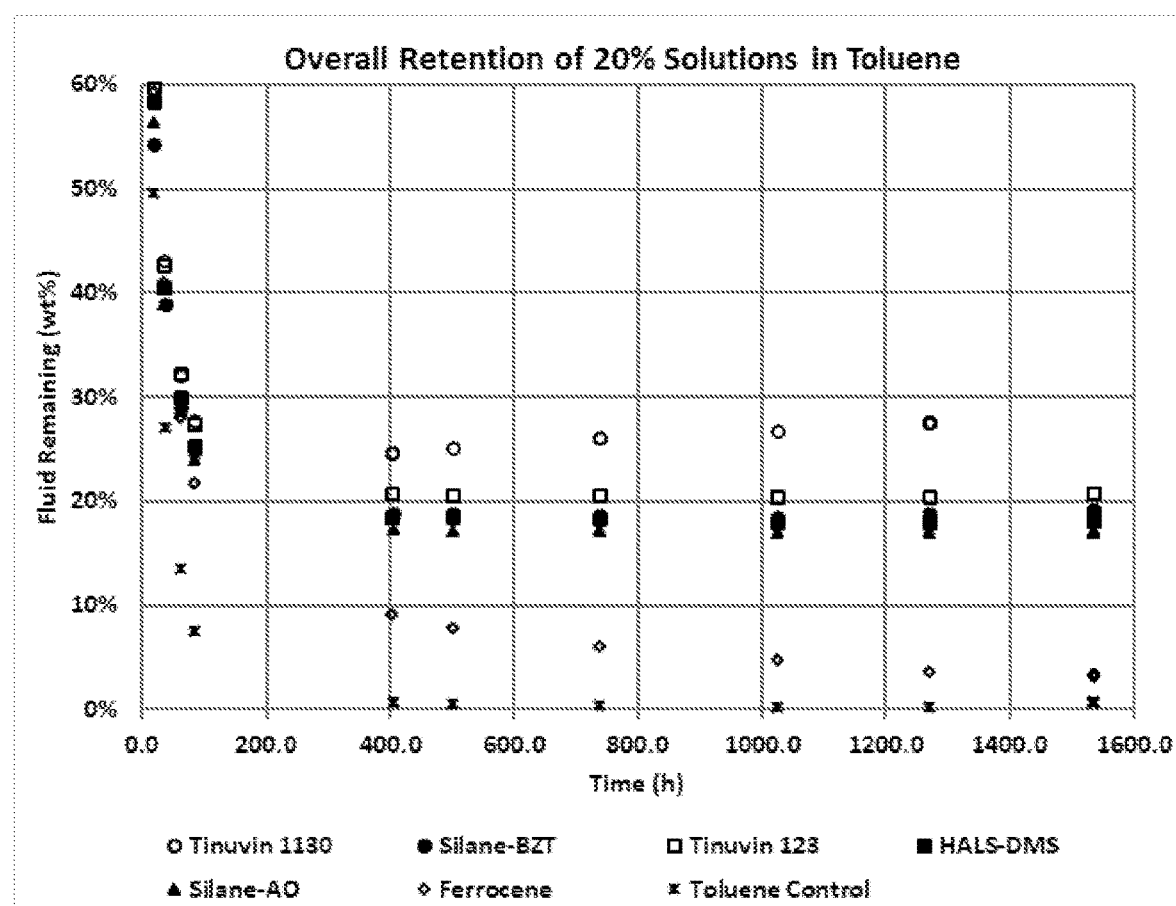
FIG. 3 is a graph displaying the average overall retention for the seven materials.

FIG. 3 is a graph displaying the average overall retention for the seven materials. Since at least 80% of each sample was toluene, weight loss is rapid down to about 20% fluid remaining. The pure toluene control sample continues to drop to slightly below zero, likely due to the removal of a small amount of plasticizer. The ferrocene sample continues to decline slowly with time from 20%. The three silane-bound additives, HALS-DMS, Silane-BZT, and Silane-AO, decline rapidly to the upper teens and level off there. This decline below 20% is expected due to loss of methanol as the silane-bound additives are hydrolyzed. Tinuvin 123 rapidly declines to 20% and levels out there, while Tinuvin 1130 declines to the low 20s and then starts to increase again. This has always been observed during exudation of Tinuvin 1130 and is ascribed to the polyethylene glycol backbone, which is hydrophilic, encouraging water to enter and remain in the cable interstices.

Figure 4:
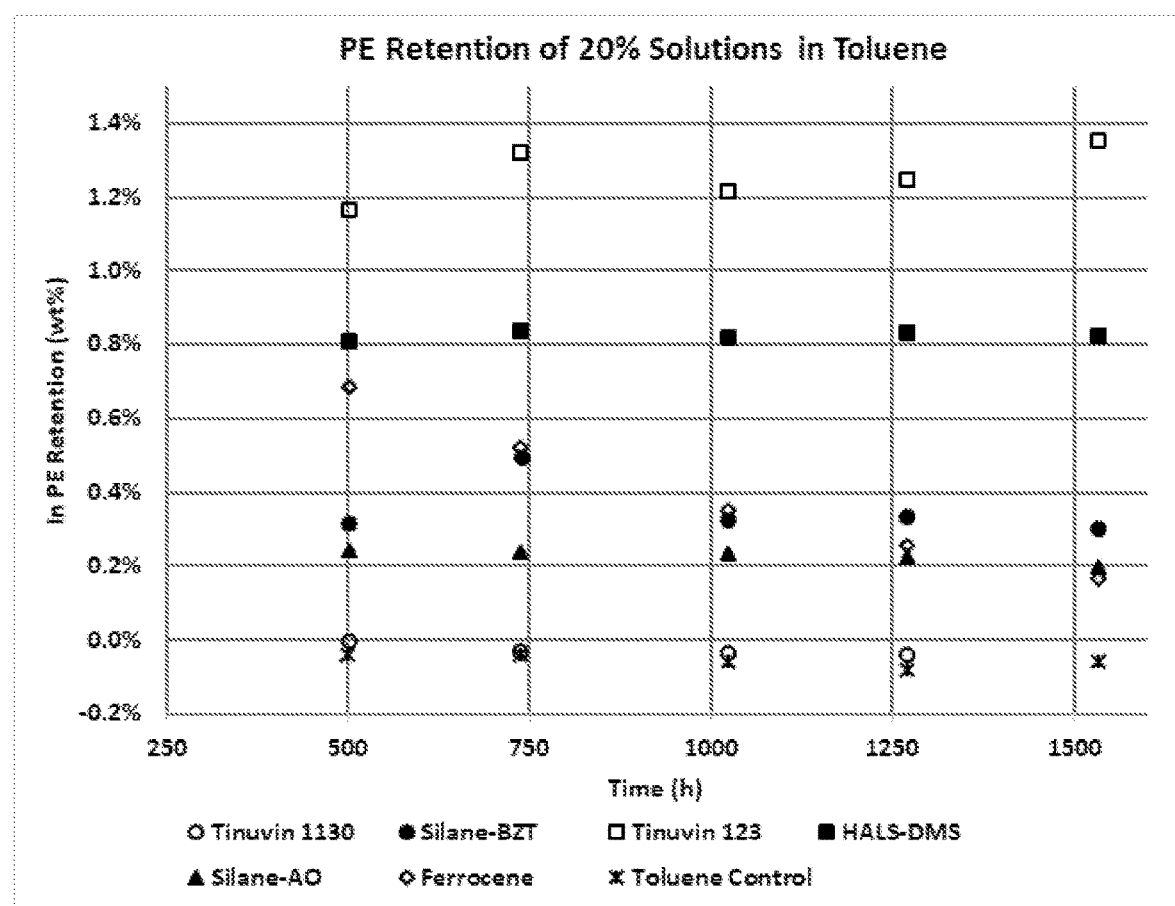
FIG. 4 is a graph of the PE retention measured for each model cable of Table 1.

PE retention refers to the material actually retained in the polyethylene of the sample expressed as weight % of the test material in the PE. It is calculated by dividing the change in weight of the polyethylene tube by the original weight of the polyethylene tube. It varies widely depending on the material being exuded and aging time. For each sample material, one of the five model cables were removed and analyzed after approximately 500, 750, 1000, 1250, and 1500 hours of aging time. The PE retention measured for each sample is shown in FIG. 4.

All five samples containing only toluene had slightly negative PE retentions, probably due to loss of a small amount of plasticizer. Likewise, Tinuvin 1130 had a slight negative PE retention. This is probably due to the polar nature of Tinuvin 1130 which severely limits its solubility in PE.

Silane-AO and Silane-BZT had PE retentions in the range of 0.2-0.3 wt %, and the values were generally constant over the time from 500 to 1500 h.

The values for Tinuvin 123 and HALS-DMS were also fairly constant over that time period but were at a significantly higher level. The Tinuvin 123 gave the highest concentration of the materials tested. Ferrocene was the only material which did not display a generally constant level of PE retention. At 500 h, ferrocene had a PE retention of 0.68 wt %, but that steadily declined to only 0.16 wt % for the 1500 h sample. This is due to the volatile nature of ferrocene which allows it to exude out of the model cable and be lost to the exterior in a relatively short time.

Experiment 1A—Pure Additive Exudation Test

In a similar exudation experiment to that described in Experiment 1, pure additives were injected into miniature cable. As indicated in Table 1A below, a small weight percent of DDBSA was added to the Silane-bound additives to promote the hydrolysis and condensation reactions.

TABLE 1A

| | Weight % | | |
|---|---|---|---|
| Sample | Additive | DDBSA | Total |
| Tinuvin 1130 | 100.000 | 0.000 | 100.000 |
| Tinuvin 123 | 100.000 | 0.000 | 100.000 |
| HALS-DMS | 99.633 | 0.377 | 100.000 |
| Silane-BZT | 99.701 | 0.299 | 100.000 |
| Silane-AO | 99.685 | 0.315 | 100.000 |

Figure 5:
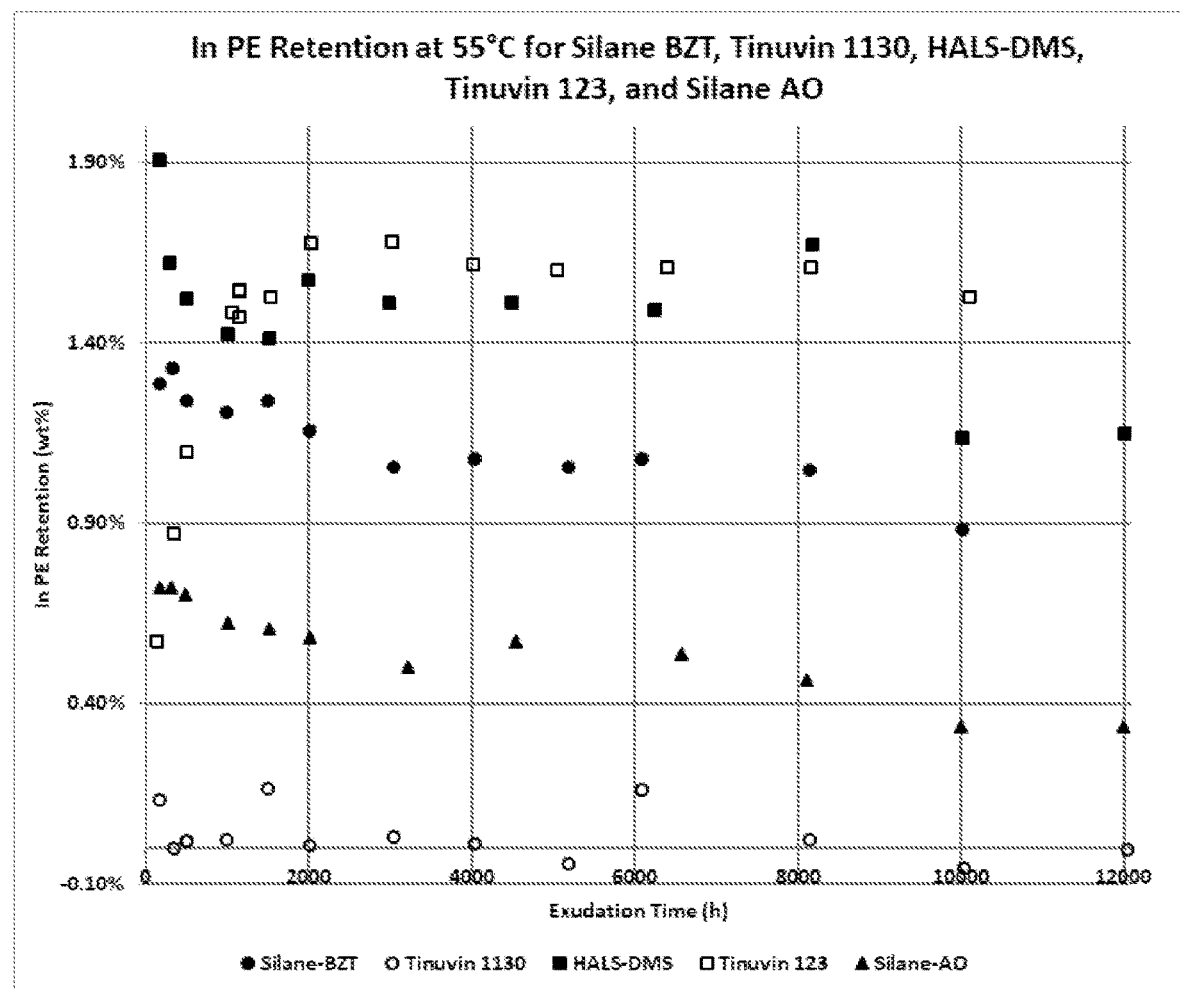
FIG. 5 is a graph showing the results of Experiment 1A.

The results are shown in the graph of FIG. 5 which covers up to 12,000 hours of exudation time and can be compared to the results from Experiment 1 with the toluene dilution.

Similar to Experiment 1, the PE retention for Tinuvin 1130 remained close to zero.

Pure Tinuvin 123 level in PE increased from 0.57 wt % at 141 hours to about 1.53 wt % at 1533 hours. This is slightly higher than the maximum level of 1.35 wt % achieved by the 20% Tinuvin 123 sample.

The HALS-DMS solution in toluene gave a virtually constant level of 0.8 wt % in PE from 500 hours to 1500 hours, but the pure HALS-DMS varied over the range 1.4 to 1.5 wt % during that time.

In general, the Silane-BZT solution gave a consistent PE level of just over 0.3 wt %, whereas pure Silane-BZT was just over 1.2 wt %.

The Silane-AO solution was just over 0.2 wt % in PE over the time from 500 hours to 1500 hours, but pure Silane-AO displayed PE levels declining from 0.7 to 0.6 wt % over the same period.

The dilutions of the Tinuvins gave fairly similar PE concentrations to the pure materials. In contrast, the dilutions of the silane-bound additives yielded significantly lower concentrations in PE than the pure materials.

Experiment 2—AC Breakdown Test

This test evaluates the performance of HALS-DMS as a dielectric enhancement fluid against the legacy Tinuvin 123 additive and a control group of untreated cables. Prior to treatment, the samples were aged through the application of high-voltage and high frequency to accelerate the growth of water trees to simulate cable nearing the end of life. Samples were treated with either HALS-DMS or Tinuvin 123 under accelerated conditions to either 500 or 1,500 hrs. All samples were subjected to a stepped AC-breakdown test described later to establish insulation strength. A set of untreated samples will be used to establish the baseline for comparison.

Figure 6:
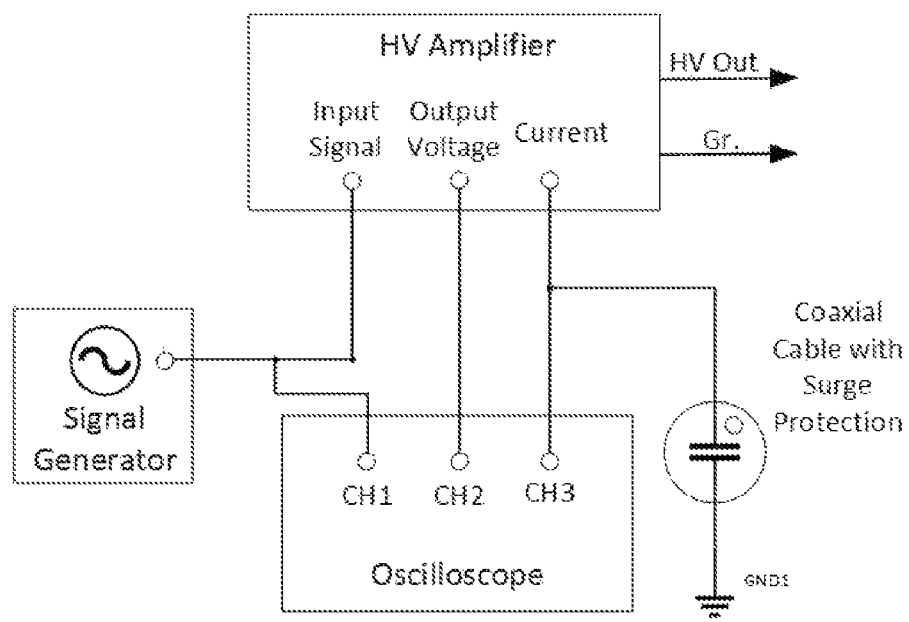
FIG. 6 is schematic view of a high-voltage high-frequency amplifier control.

Model cables where prepared and aged by following the procedure below:
1. Cut tubing to length of 52". Record spool identification in data table.
2. Visually inspect tube for defects and remove ink lettering by lightly rubbing with isopropyl alcohol.
3. Soak tubing in 30° C. saltwater (30,000 ppm) for 24 hrs. Record start time and date.
4. Prep tubing by using needle to create 20 water tree sites at mil depth. Water tree sites should be arranged in rows of 5 and 90 degrees apposed over a 2" test section at exactly midspan.
5. Cut 14-gauge aluminum conductor to an approximate length of 60".
6. Run lubricated conductor through "calibrated" mandrel to reduce diameter by about 0.010"
7. Remove oil by lightly rubbing with alcohol and allow to dry.
8. Rub surface of the conductor with HCl for ~2 min to increase surface wetting.
9. Rinse the conductor with water.
10. Assemble the wetted conductor into tubing using saltwater (30,000 ppm). Conductor is axially centered in tubing.
11. The function generator, digital oscilloscope, and amplifier are arranged as illustrated in FIG. 6 showing a high-voltage, high-frequency amplifier control.
12. Assemble 6 samples with a ground shield covering the test section and the conductors tied to the high-frequency/high-voltage amplifier.
13. Place samples in the saltwater bath and adjust saltwater (30,000 ppm) depth so peak current is 11.5 mA (11.7V/2*4 mA) and maintain water level throughout test.
14. Increase test voltage to 3,600 V (136 V/mil nominal). Record start date and time.
15. Maintain voltage until one sample breaks down (approximately 36 hrs). Record end date and time.
16. Remove samples from test and proceed directly to either AC breakdown step for non-treated samples or to the Injection step for treated samples.

Samples were injected following the procedures below:
1. Remove the conductor from each sample assembly used in the Aging protocol. Rinse the conductor with water, wipe dry and set aside for the AC Breakdown step.
2. Insert a new conductor into each sample to be injected leaving at least ¼" empty space at each end. For this step, an aluminum wire manufactured by Malin Co is used measuring 0.0508" in diameter. Overall length of new wire should be about 1" shorter than the tube.
3. Draw the injection fluid into a gas-tight syringe through the needle.
4. Insert the needle into one end of the tube and force fluid through the sample until it reaches the empty space on the other end. Remove the needle, and heat seal the empty end. Clean fluid out of the remaining open end using a pipe cleaner. For viscous fluids, an additional cleaning with an acetone-wet pipe cleaner may be necessary. The exterior of the sample end should be wiped with a paper towel to remove fluid. Heat seal the cleaned end. Record the date and time of injection.
5. Put an identification tag on the sealed sample and immerse it in a 55° C. tap-water bath. Record start date and time. (Note: buckets should be cleaned and rinsed prior to use).
6. Remove the sample from the oven when the accelerated diffusion is complete (after either 500 or 1,500 hrs). Record the end date and time.
7. Snip the ends of the tube to remove conductor and flush fluid with shop air. Rinse tubing with acetone and dry with air.
8. Proceed immediately to AC breakdown.

Prepare samples for AC breakdown test:
1. Cut the 14-gauge aluminum conductor to an approximate length of 60".
2. Run lubricated conductor through "calibrated" mandrel to reduce diameter by about 0.010".
3. Remove oil by lightly rubbing with alcohol and allow to dry.
4. Rub surface of the conductor with HCl for ~2 min to increase surface wetting.
5. Rinse the conductor with water.
6. Assemble the wetted conductor into tubing using saltwater (30,000 ppm). Conductor should be axially centered in tubing.
7. Place samples in ground braid and install water-style stress cones.
8. Place test sample in saltwater bath (30,000 ppm) so the terminations are elevated and fill stress cones with de-ionized water.
9. Begin stepped AC breakdown test at 3.1 kV (100V/mil nominal) and hold for 5 minutes. Record start date and time.
10. Increase voltage by 1.2 kV (40V/mil) per step every 5 minutes until breakdown. Record actual time and voltage for each step.
11. When breakdown occurs, record the voltage and the time duration into step when breakdown occurred.
12. Remove the sample from the test setup being careful not to disturb the breakdown site.
13. Within two hours post breakdown, slice through the breakdown channel using a microtome and record the following:

Maximum size of water tree observed (mils)
   Depth of needle at maximum sized water tree (mils)
   Actual insulation thickness at breakdown site (mils)

The results of the test are summarized in Table 2 below:

TABLE 2

| Batch | Sample | Injection Fluid | Nominal Diffusion Duration (hrs) | Breakdown Voltage (kV) | Largest Water Tree (mils) | Needle Depth @ largest WT (mils) | Insulation Thickness @ breakdown (mils) | Actual ACBD (V/mil) |
|---|---|---|---|---|---|---|---|---|
| 5 | A | Not Treated | — | 9.1 | 24 | 10 | 31 | 293.5 |
| 5 | B | HALS-DMS | 500 | 34.3 | 26 | 6 | 32 | 1071.9 |
| 5 | C | HALS-DMS | 1,500 | 29.3 | 28 | 10 | 32 | 915.6 |
| 5 | D | Tinuvin 123 | 500 | 17.5 | 27 | 9 | 32 | 546.9 |
| 5 | E | Tinuvin 123 | 1,500 | 14.0 | 26 | 9 | 31 | 451.6 |
| 6 | A | Not Treated | — | 12.6 | 23 | 9 | 31 | 406.5 |
| 6 | B | HALS-DMS | 500 | 12.8 | 25 | 10 | 32 | 400.0 |
| 6 | C | HALS-DMS | 1,500 | 29.5 | 28 | 9 | 31 | 951.6 |
| 6 | D | Tinuvin 123 | 500 | 11.7 | 27 | 9 | 32 | 365.6 |
| 6 | E | Tinuvin 123 | 1,500 | 21.2 | 29 | 9 | 31 | 683.9 |
| 7 | A | Not Treated | — | 8.0 | 24 | 9 | 31 | 258.1 |
| 7 | B | HALS-DMS | 500 | 28.4 | 29 | 7 | 31 | 916.1 |
| 7 | C | HALS-DMS | 1,500 | 28.3 | 28 | 9 | 31 | 912.9 |
| 7 | D | Tinuvin 123 | 500 | 8.9 | 27 | 10 | 31 | 287.1 |
| 7 | E | Tinuvin 123 | 1,500 | 15.3 | 28 | 8 | 32 | 478.1 |
| 8 | A | Not Treated | — | 11.7 | 24 | 9 | 31 | 377.4 |
| 8 | B | HALS-DMS | 500 | 27.1 | 30 | 10 | 32 | 846.9 |
| 8 | C | HALS-DMS | 1,500 | 24.8 | 23 | 8 | 32 | 775.0 |
| 8 | D | Tinuvin 123 | 500 | 22.1 | 25 | 9 | 32 | 690.6 |
| 8 | E | Tinuvin 123 | 1,500 | 13.8 | 23 | 9 | 32 | 431.3 |
| 9 | A | Not Treated | — | 8.9 | 21 | 9 | 32 | 278.1 |
| 9 | B | HALS-DMS | 500 | 33.2 | 23 | 10 | 32 | 1037.5 |
| 9 | C | HALS-DMS | 1,500 | 33.2 | 28 | 9 | 32 | 1037.5 |
| 9 | D | Tinuvin 123 | 500 | 21.2 | 23 | 9 | 32 | 662.5 |
| 9 | E | Tinuvin 123 | 1,500 | 18.9 | 25 | 9 | 32 | 590.6 |
| 10 | A | Not Treated | — | 8.0 | 23 | 9 | 31 | 258.1 |
| 10 | B | HALS-DMS | 500 | 28.5 | 26 | 10 | 31 | 919.4 |
| 10 | C | HALS-DMS | 1,500 | 28.2 | 26 | 9 | 31 | 909.7 |
| 10 | D | Tinuvin 123 | 500 | 23.4 | 24 | 10 | 32 | 731.3 |
| 10 | E | Tinuvin 123 | 1,500 | 15.2 | 24 | 8 | 31 | 490.3 |
| 11 | A | Not Treated | — | 4.3 | 25 | 10 | 31 | 138.7 |
| 11 | B | HALS-DMS | 500 | 21.2 | 26 | 8 | 32 | 662.5 |
| 11 | C | HALS-DMS | 1,500 | 32.0 | 24 | 9 | 32 | 1000.0 |
| 11 | D | Tinuvin 123 | 500 | 18.8 | 26 | 8 | 32 | 587.5 |
| 11 | E | Tinuvin 123 | 1,500 | 8.0 | 28 | 8 | 31 | 258.1 |

Figure 7:
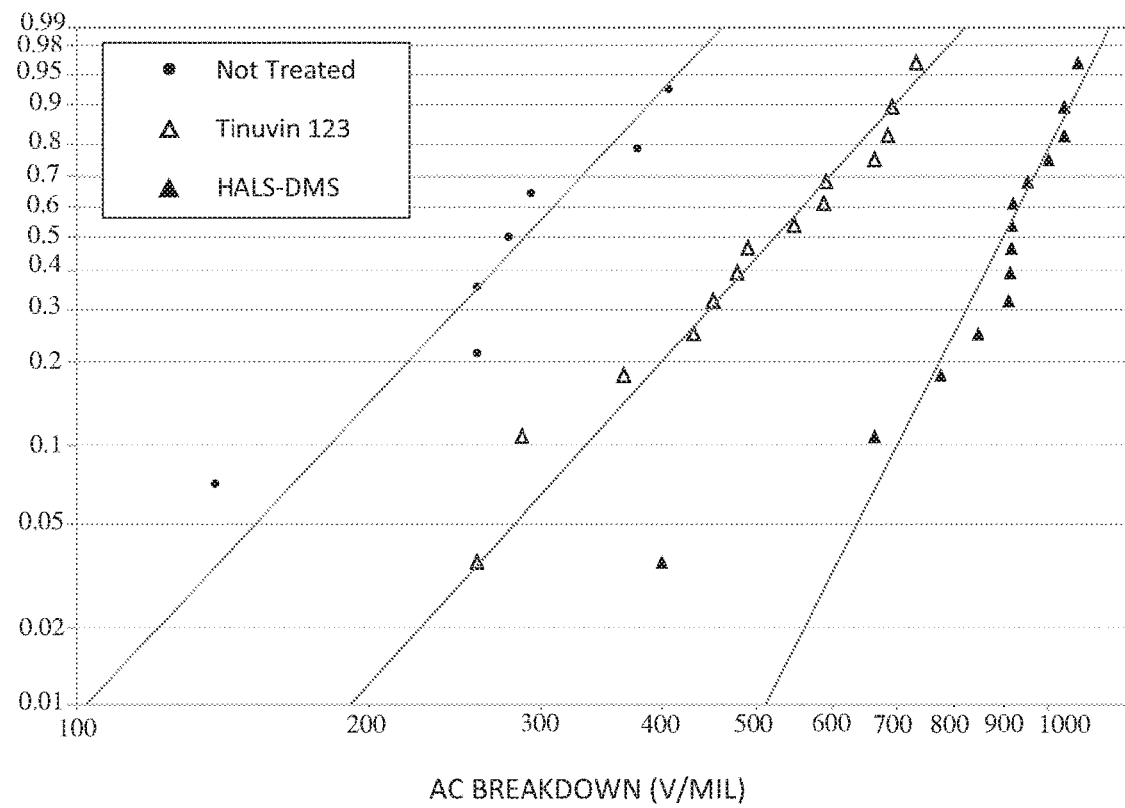
FIG. 7 is a Weibull plot illustrating AC-breakdown performance of 3 treatment groups.

The results for 3 cohorts are shown in the Weibull plot of FIG. 7 illustrating AC-breakdown performance of 2 treatment cohorts at 500/1500 hrs and a control cohort.

Figure 8:
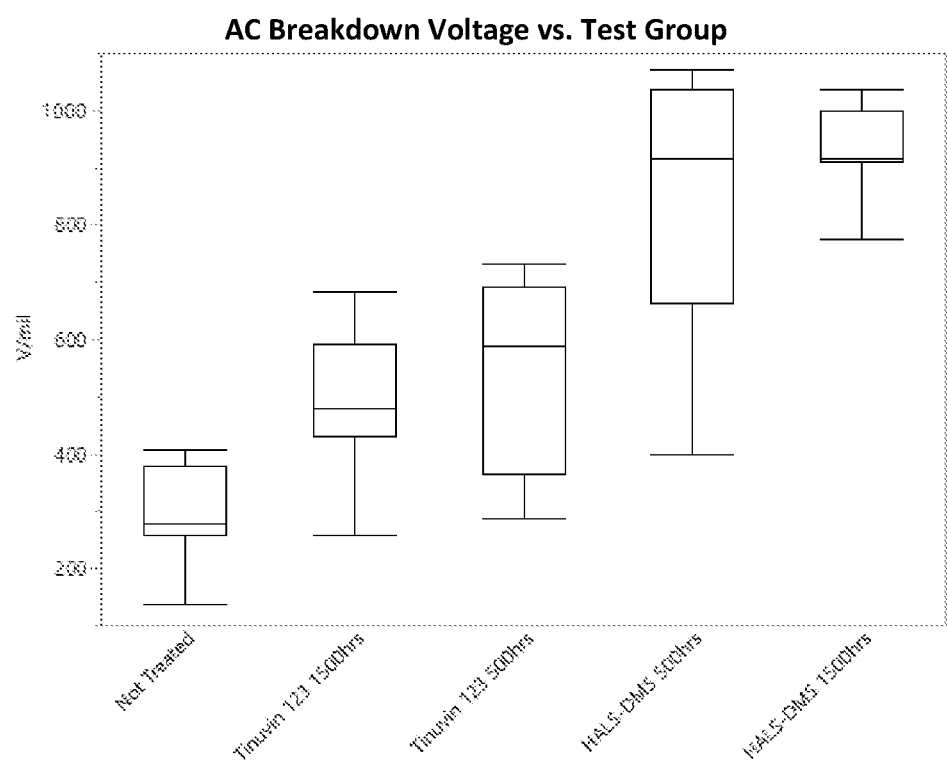
FIG. 8 is a whisker plot showing AC-breakdown performance for the test groups.

The AC-breakdown results for the 5 cohorts (the untreated control and two injection fluids, each with two treatment durations) are shown in the whisker plot of FIG. 8.

Experiment 2A—Pure Additive Saturation, Permeation & Diffusivity Test

Permeation experiments with the pure materials were also conducted wherein disks of diameter of 1.6 cm were cut from a 0.25 cm thick polyethylene sheet. The disks were weighed and then submerged in the pure additives at 55° C. Periodic removal, cleaning, and weighing of the sample provided the data summarized in Table 2A below. Using the time when the slab has reached ½ the saturated content of diffusant, the diffusion coefficient can be calculated by $D=0.049 \times thickness^2/time$. Permeability (P) is the product of the diffusion coefficient (D) and solubility (S), the diffusion coefficient is calculated by the expression $D=P/S$.

Figure 9:
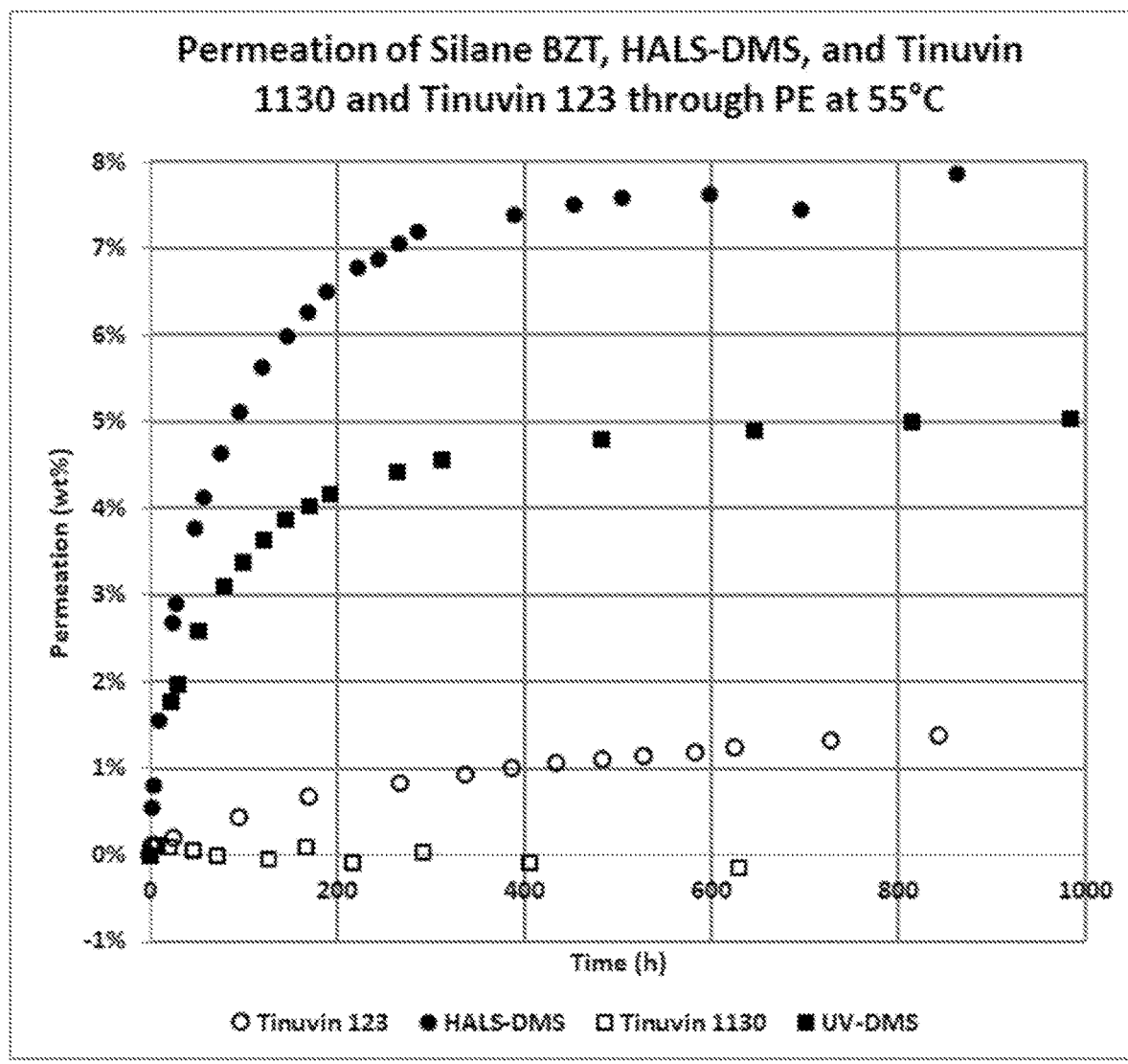
FIG. 9 is a graph displaying the permeation of four materials.

Silane-bound additives exhibit significantly higher solubility in the polyethylene than their Tinuvin counterparts with HALS-DMS reaching almost 8 wt % in the polyethylene compared to the eventual maximum level of 2 wt % for Tinuvin 123. Unexpectedly, not only does the HALS-DMS reach a much higher equilibrium solubility in polyethylene than Tinuvin 123, it also approaches that equilibrium much more quickly. At 500 hours of aging at 55° C., Tinuvin 123 has reached only slightly more than half its eventual equilibrium solubility, but HALS-DMS is over 90% of its equilibrium value at 500 hours. See graph of FIG. 9.

Because the silane-bound additives hydrolyze and oligomerize inside the polyethylene, it was hypothesized that they could provide longer term protection than conventional additives which will eventually diffuse out of the insulation as taught be Vincent in '011 and Bertini and Vincent in '808. Surprisingly, the above data also indicates that they provide effective protection of the insulation more quickly after injection than their non-silane counterparts. This was confirmed by the AC-breakdown experiment (Experiment 2). Table 2A below gives the equilibrium saturation levels and the levels at 500 hours aging at 55° C. in polyethylene for the silane functional additives and for Tinuvin 123 as a reference.

TABLE 2A

| Additive | Saturation Level Wt % @55° C. | Saturation Level at 500 h Wt % @55° C. | % of Saturation at 500 h | Diffusivity @ 55° C. $\times 10^{-8}$ cm$^2$/s |
|---|---|---|---|---|
| Tinuvin 123 | 1.78 | 1.12 | 63 | 0.18 |
| HALS-DMS | 7.69 | 7.59 | 99 | 1.15 |
| AO-DMS | 4.17 | 4.14 | 99 | 0.79 |
| UV-DMS | 3.92 | 3.80 | 97 | 0.92 |
| Ferrocene-DMS | 9.67 | 8.79 | 91 | — |

Particular Preferred Aspects of the Invention can be Understood by the Following Clauses:

1. Methods for extending the useful life of in-service electrical cable, comprising injecting a dielectric enhancement fluid composition into at least one section of an electrical cable having a stranded conductor encased in a polymeric insulation jacket, and having an average operating temperature T, the composition comprising: (a) at least one organosilane (e.g., organoalkoxysilane) functional additive selected from (i) a voltage stabilizer-based alkoxysilane (e.g., metallocene-based alkoxysilane, (ii) a hindered amine light stabilizer (HALS)-based alkoxylsilane (e.g., tetramethyl piperidine-based alkoxysilane), and/or (iii) a UV absorber-based alkoxysilane (e.g., benzotriazole-based, triazine-based, nickel chelate-based); and (b) at least one catalyst suitable to catalyze hydrolysis and condensation of the at least one functional additive of (a), and wherein the injected composition provides for both initial permeation of the at least one functional additive into the polymeric insulation, and extended retention of subsequent condensation products of the at least one functional additive in the cable insulation.

2. The method of clause 1, wherein in the methods, the cable section may have a stranded conductor surrounded by a conductor shield encased in a polymeric insulation jacket with an outer insulation shield, and may have an interstitial void volume in the region of the conductor, and wherein injecting may comprise injecting the dielectric enhancement fluid composition into the interstitial void volume, and/or into the space between the polymeric insulation jacket and the outer insulation shield.

3. The method of clauses 1 or 2, wherein in the methods, the dielectric enhancement fluid composition may further comprise (c) at least one water-reactive organosilane material selected from (i) an organosilane monomer having at least two water-reactive groups, (ii) the organosilane monomer (i) where at least one of the water-reactive groups is substituted with a condensable silanol group, (iii) an oligomer of the above organosilane monomer (i), and/or (iv) a co-oligomer of the above organosilane monomer (i) with a different organosilane monomer, and wherein the catalyst provides for covalent binding of the at least one functional additive of (a) to the at least one water-reactive material (c) upon hydrolysis and condensation thereof.

4. The method of clause 3, wherein in the methods, the organosilane monomer (i) may have a diffusion coefficient at least about 15 times greater than the diffusion coefficient of its corresponding tetramer, the diffusion coefficient being determined at the average operating temperature T of the at least one section of the in-service electrical cable.

5. The method of any one of clauses 1-4, wherein in the methods, the dielectric enhancement fluid composition may further comprise: (d) a non-water-reactive organic material which has a diffusion coefficient of less than about $10^{-9}$ cm$^2$/sec and an equilibrium concentration of at least about 0.005 gm/cm$^3$ in said polymeric insulation, the diffusion coefficient and the equilibrium concentration being determined at the average operating temperature T; and/or (e) an organic compound having an equilibrium concentration in the polymeric insulation at 55° C. which is less than 2.25 times the equilibrium concentration at 22° C.

6. The method of any one of clauses 1-6, wherein in the methods, the at least one water-reactive organosilane material may be an organoalkoxysilane.

7. The method according to clause 6, wherein in the methods, the organoalkoxysilanes may be selected from: (3-methylphenyl)methyldimethoxysilane, di(4-methylphenyl)dimethoxysilane, dimethyldi-n-butoxysilane (4-methylphenyl)methyldimethoxysilane, 3-cyanopropylmethyldimethoxysilane 3-cyanobutylmethyldimethoxysilane, phenethyltrimethoxysilane, p-tolylethyl)methyldimethoxysilane, (p-styrylethyl)trimethoxysilane, phenylmethyldimethoxysilane, 3-(2,4-dinitrophenylamino)propyltriethoxysilane, or 3-(triethoxysilylpropyl) p-nitrobenzamide.

8. The method of clause 7, wherein in the methods, the organoalkoxysilanes may be (p-tolylethyl)methyldimethoxysilane, 3-cyanopropylmethyldimethoxysilane, dimethyldi-n-butoxysilane, or 3-cyanobutylmethyldimethoxysilane.

9. The method of any one of clauses 1-7, wherein in the methods, the organoalkoxysilane functional additives may be derived from at least one of the following stabilizing functionalities; hydroxyphenyl benzotriazole chromophores, hydroxyphenyl triazine chromophores, N-Alkoxy 2,2,6,6-tetramethyl piperidine light stabilizers, and/or ferrocene backbones.

10. The method of any one of clauses 1-7, wherein in the methods, the composition may further comprise an organoalkoxysilane functional additive derived from a hindered phenolic antioxidant backbone.

11. The method of any one of clauses 1-7, wherein in the methods, the at least one organoalkoxysilane functional additive may have in PE retention of at least 0.2%.

12. The method of any one of clauses 1-7, wherein in the methods, the at least one organoalkoxysilane functional additive may permeate into the cable insulation reaching at least 90% of saturation in less than 500 hours at 55° C.

13. The method of any one of clauses 1-7, wherein in the methods, the at least one organoalkoxysilane functional additive may have a diffusivity in PE greater than $5.0 \times 10^{-9}$ cm$^2$/s at 55° C. and a PE retention of at least 0.40 wt % at 5,000 hours at 55° C.

14. The method of clause 9, wherein in the methods, the at least one functional additive may be a compound of Formula 1

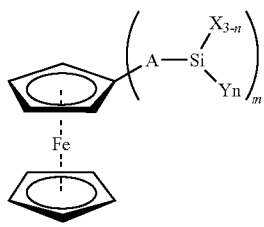

(1)

wherein, m is 1-4;

A is a linear or branched alkylene radical containing from 1 to 10 carbon atoms, or one of

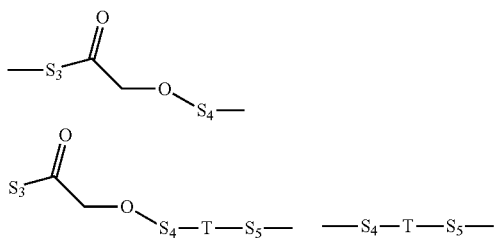

where $S_3$, $S_4$ and $S_5$ are linear or branched alkylene radicals containing a total of between 3 and 10 carbon atoms;

X is a linear or branched alkyl radical containing from 1 to 5 carbon atoms, and preferably the methyl radical;

Y is hydrogen, halogen and preferably chlorine, $C_1$-$C_4$ acyloxy, $C_1$-$C_4$ alkyloxy, amino, amino-oxy or silyloxy, and preferably $C_1$-$C_2$ alkyloxy; and n is one, two or three.

15. The method of clause 14, wherein the functional additive may be an organoalkoxysilane compound selected from

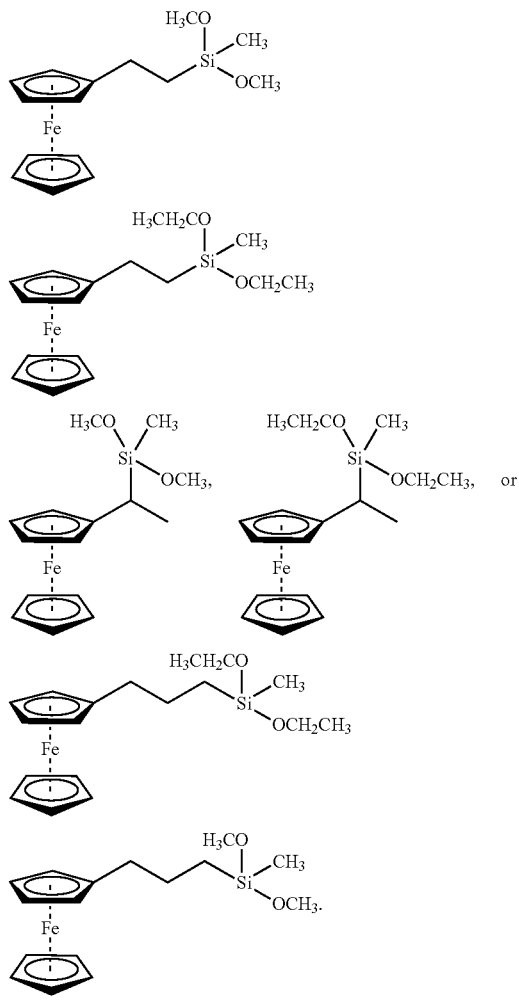

16. A method for extending the useful life of in-service electrical cable, comprising injecting a dielectric enhancement fluid composition into at least one section of an electrical cable having a stranded conductor encased in a polymeric insulation jacket, and having an average operating temperature T, the composition comprising: (a) at least one functional additive selected from a compound of Formula 1

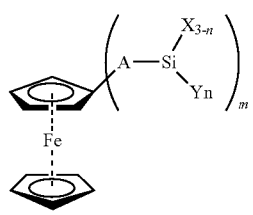

(1)

wherein, m is 1-4;

A is a linear or branched alkylene radical containing from 1 to 10 carbon atoms, or one of

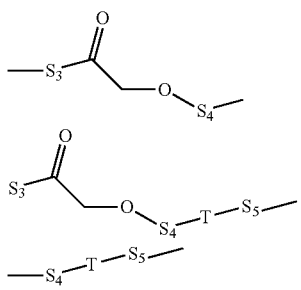

where $S_3$, $S_4$ and $S_5$ are linear or branched alkylene radicals containing a total of between 3 and 10 carbon atoms;

X is a linear or branched alkyl radical containing from 1 to 5 carbon atoms, and preferably the methyl radical;

Y is hydrogen, halogen and preferably chlorine, $C_1$-$C_4$ acyloxy, $C_1$-$C_4$ alkyloxy, amino, amino-oxy or silyloxy, and preferably $C_1$-$C_2$ alkyloxy; and n is one, two or three; and (b) at least one catalyst suitable to catalyze hydrolysis and condensation of the at least one functional additive of (a), and wherein the injected composition provides for both initial permeation of the at least one functional additive into the polymeric insulation, and extended retention of subsequent condensation products of the at least one functional additive in the cable insulation.

17. The method of clause 16, wherein in the methods, the functional additive may be an organoalkoxysialane compound selected from

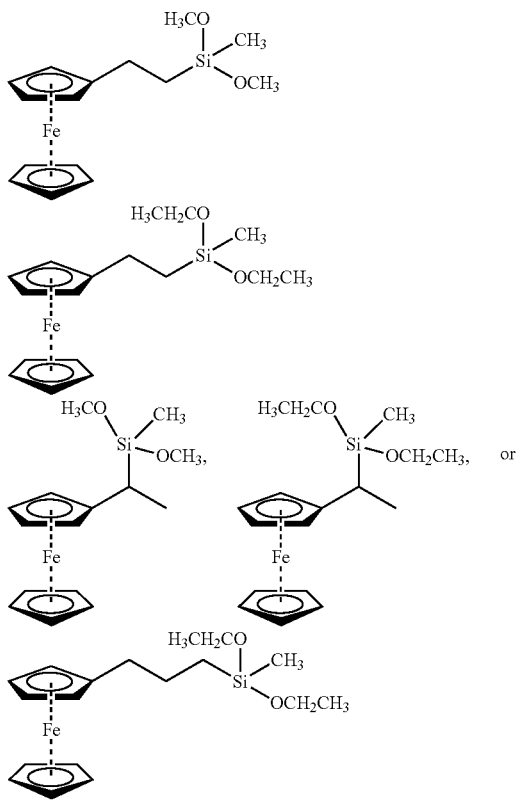

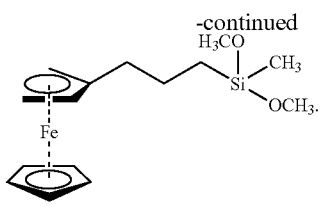

18. The method of clause 16 or 17, wherein in the methods, the cable section may have a stranded conductor surrounded by a conductor shield encased in a polymeric insulation jacket with an outer insulation shield, and may have an interstitial void volume in the region of the conductor, and wherein injecting may comprise injecting the dielectric enhancement fluid composition into the interstitial void volume, and/or into the space between the polymeric insulation jacket and the outer insulation shield.

19. The method of any one of clauses 16-18, wherein in the methods, the dielectric enhancement fluid composition may further comprise (c) at least one water-reactive organosilane material selected from (i) an organosilane monomer having at least two water-reactive groups, (ii) the organosilane monomer (i) where at least one of the water-reactive groups is substituted with a condensable silanol group, (iii) an oligomer of the above organosilane monomer (i), and/or (iv) a co-oligomer of the above organosilane monomer (i) with a different organosilane monomer, and wherein the catalyst provides for covalent binding of the at least one functional additive of (a) to the at least one water-reactive material (c) upon hydrolysis and condensation thereof.

20. A compound of Formula 1

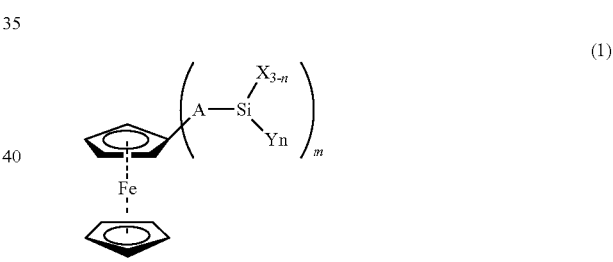

wherein, m is 1-4;

A is a linear or branched alkylene radical containing from 1 to 10 carbon atoms, or one of

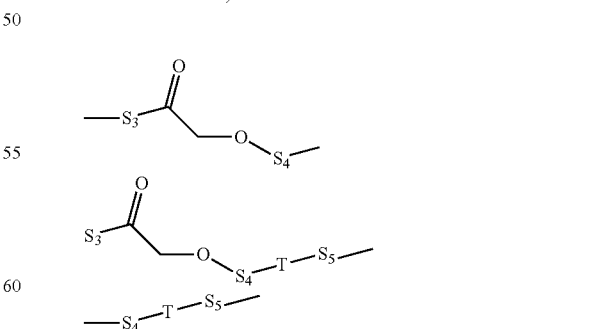

where $S_3$, $S_4$ and $S_5$ are linear or branched alkylene radicals containing a total of between 3 and 10 carbon atoms;

X is a linear or branched alkyl radical containing from 1 to 5 carbon atoms, and preferably the methyl radical;

Y is hydrogen, halogen and preferably chlorine, $C_1$-$C_4$ acyloxy, $C_1$-$C_4$ alkyloxy, amino, amino-oxy or silyloxy, and preferably $C_1$-$C_2$ alkyloxy; and n is one, two or three.

21. The compound of clause 20, wherein the compound may selected from

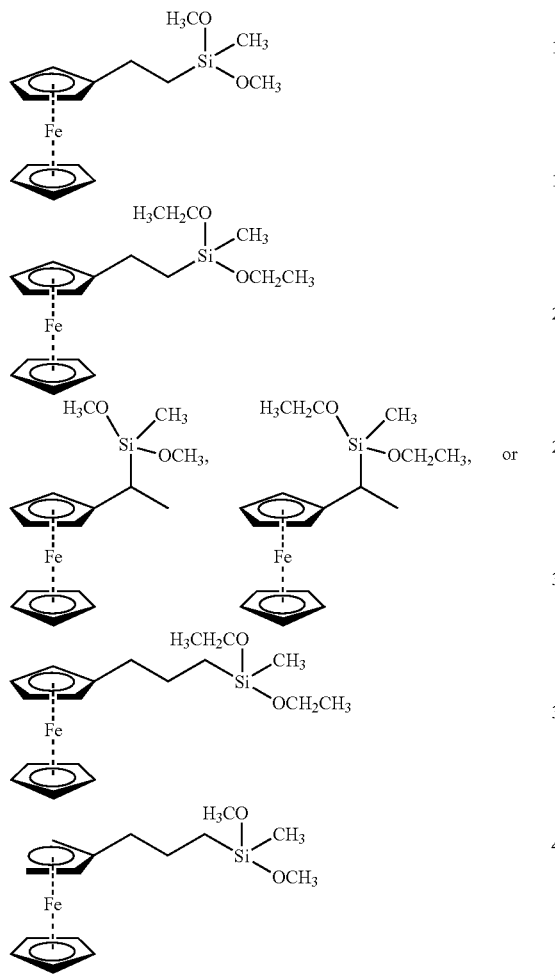

Dielectric Gel Embodiment

Another embodiment of the method comprises: injecting a dielectric enhancement gel composition into the interstitial void volume, and/or into the space between the insulation and outer jacket said composition comprising:

A. an Si—H endblocked polydiorganosiloxane fluid having a viscosity of 0.5 to about 100 centistokes at 25° C. and represented by the formula $H(R_2SiO)_x(R_2Si)H$ wherein R is independently selected from alkyl radicals having from 1 to 6 carbon atoms or the phenyl radical and the average value of x is 1 to 40;

B. a polydiorganosiloxane fluid having a viscosity of 0.5 to about 100 centistokes at 25° C. and represented by the formula

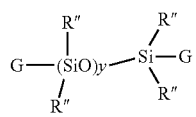

wherein G denotes unsaturated radicals independently selected from the vinyl group or higher alkenyl radicals represented by the formula —R'''$(CH_2)_m$CH=$CH_2$, in which R''' denotes —$(CH_2)_p$— or —$(CH_2)_q$CH=CH—, m is 1, 2 or 3, p is 3 or 6, and q is 3, 4 or 5, R'' is independently selected from an alkyl radical having 1 to 6 carbon atoms or a phenyl radical, and y is on the average from 1 to about 40;

C. sufficient hydrosilylation catalyst to cure the mixture of (A) and (B);

D. silane functional variants, including:
  i. Antioxidants such as hindered phenolic additives based on 2,6-di-tert-butyl phenol derived products.
  ii. Voltage stabilizers based on metallocenes wherein a metallic atom such as Fe, Mn, Ni, Co, Ru or Os is "sandwiched" between two cyclopentadienyl rings.
  iii. Free radical scavengers that mitigate the damage caused by UV emissions within polymers such as Hindered Amine Light Stabilizers, based on tetramethyl piperidine derivatives.
  iv. UV absorbers and energy quenchers, including benzotriazoles, triazines, benzophenones, nickel chelates.

E. And preferably, at least one material which functions as a catalyst for the hydrolysis and condensation of the silane functional variants (D) and does not significantly affect the cure of the mixture of (A) and (B) by the catalyst (C).

The hydrosilylation catalyst (component C) for the reaction between the polydiorganosiloxane fluid endblocked with unsaturated organic radicals and the Si—H endblocked polydiorganosiloxane fluid can include a variety of hydrosilylation catalysts known to promote the reaction of vinyl-functional radicals with silicon bonded hydrogen atoms. Active metal catalysts such as platinum or rhodium-containing metal compounds are included in this class of catalysts. Platinum catalysts such as platinum acetylacetonate or chloroplatinic acid are representative of these compounds and suitable for use as component C. A preferred catalyst mixture is a chloroplatinic acid complex of divinyl-tetramethyldisiloxane diluted in toluene, commonly known as Karstedt's catalyst.

To the formulation above including parts A, B, C, D, and E, an optional siloxane crosslinker selected from short chain linear or cyclic siloxanes containing SiH functionality or Si-G functionality, in which G has the above-defined meaning can be added.

Further, sufficient hydrosilylation inhibitor could be added to the formulation above to extend the time to viscosity doubling or the time to cure into a non-flowing state. The use of a-acetylenic compounds, especially acetylenic-α,α'-diols as inhibitors for hydrosilylation is described in United States Patent Application Publication No. 20140004359 A1 and references therein. The use of maleate and fumarate compounds is well known to those skilled in the art and is described in "The Chemistry of Fumarate and Maleate Inhibitors with Platinum Hydrosilylation Catalysts," J. Orgmetal. Chem., (1996) 521, 221-227. Examples of suitable fumarate and maleate inhibitors could include dimethylfumarate, diethylfumarate, dibutylfumarate, diphenylfumarate, fumaric acid, dimethylmaleate, diethylmaleate dibutylmaleate, diphenylmaleate, and maleic acid or other such inhibitors.

One or more hydrolysis/condensation catalysts (E) are included in the formulation of A, B, C, and D above. The catalysts contemplated herein are any of those known to promote the hydrolysis and condensation of organoalkoxysilanes provided that the hydrolysis/condensation catalysts do not interfere with the cure of the gel formulation containing (A), (B), (C), optional siloxane crosslinker, and optional hydrosilylation inhibitor.

For example, five gel formulations were prepared, each consisting of component (A), (CE-4 sold by AB Silicones), component (B), (VS-6 sold by AB Silicones), component (C), (Syl-off 4000 sold by Dow), component (D), (AO-DMS at 2.5 wt %), and optional crosslinker (XL-1340 sold by AB Silicones). Sample 1 with only these components cured in 10 h. TiPT, (titanium(IV) isopropoxide, at 0.3 wt %) was added to Samples 2 and 3 which cured in 12.2 h and 11.9 h respectively. Sample 1 contained 17% greater catalyst level, so samples 1, 2, and 3 had essentially the same cure time. In contrast, when DDBSA (dodecylbenzene sulfonic acid) was added at a level of 0.3 wt % to Samples 4 and 5, neither had cured after 215 h even though Samples 4 and 5 contained four times the catalyst level of Sample 3.

Therefore, hydrolysis/condensation catalysts of component (E) are preferred from organometallic compounds of tin, manganese, iron, cobalt, nickel, lead, titanium, or zirconium. Examples of such catalysts include alkyl titanates, acyl titanates and the corresponding zirconates. Specific non-limiting examples of suitable catalysts include tetra-t-butyl titanate (TBT), dibutyltindiacetate (DBTDA), dibutyltindilaurate (DBTDL), dibutyltindioleate, tetraethylorthotitanate, tetraisopropyl titanate (TIPT), tetraoctadecylorthotitanate, dibutyltindioctoate, stannous octoate, dimethyltinneodeconoate, di-N-octyltin-S,S-isooctylmercaptoacetate, dibutyltin-S,S-dimethylmercaptoacetate, or diethyltin-S,S-dibutylmercaptoacetate. In general, the catalyst is added at a level of about 0.05 to about 5% based on the total weight of the organoalkoxysilane components. More typically, it is supplied at a level of about 0.1 to about 2% or at a level of about 0.2 to 1% by weight according to the above-mentioned basis.

Example—Gel Formulation

In one embodiment, a gel formulation could be blended as indicated in Table 3 below:

TABLE 3

| Manufacturer | Component | Wt % | CAS # | Part A or B |
|---|---|---|---|---|
| AB Specialty Silicones | Andisil VS-6 | 45.79 | 68083-19-2 | A |
| AB Specialty Silicones | Andisil CE-4 | 50.01 | 70900-21-9 | A |
| AB Specialty Silicones | Andisil XL-1340 | 0.55 | 69013-23-6 | A |
| Sigma-Aldrich | Diethyl maleate | 0.08 | 141-05-9 | A |
| AB Specialty Silicones | Andisil VS-6 | 1.20 | 68083-19-2 | B |
| Johnson Matthey | Platinum(Tetramethyl-divinyldisiloxane) Solution in Xylenes | 0.06 | 68478-92-2 | B |
| Isle Chem | HALS-DMS | 2.00 | 2169926-47-8 | B |
| Sigma-Aldrich | Titanium(IV) Isopropoxide | 0.30 | 546-68-9 | B |

In this embodiment, Part A and Part B are packaged separately and field mixed just prior to injection. This process allows the technician to control the start time and ensure injection is completed within the worklife of the gel formulation. However, it is appreciated that other combinations herein are possible.

Experiment 3—Gel

A gel formulation consisting of vinyl-capped polydimethylsiloxane, hydride-capped polydimethylsiloxane, crosslinker which contained both terminal and internal Si—H moieties, and diethylmaleate as inhibitor was prepared and divided into four portions. One portion was kept as a control. Silane-bound antioxidant was added at 2.5 wt % to the second portion, silane-bound HALS was added at 2.5 wt % to the third portion, and both silane-bound HALS and tetraisopropyltitanate (TiPT) were added at 2.5 and 0.25 wt % respectively to the fourth portion. Sufficient Syl-off 4000 catalyst was added to each portion to provide about 10 ppm Pt.

For each portion, ten model cables were prepared as described for the exudation test above, and the samples were soaked in tap water at ambient temperature. The weights of the model cables were monitored over time, and periodically, one sample for each portion was evaluated as described in the exudation test to establish the sample retention in PE. The results are summarized in Table 4 below. The gel only samples averaged a weight loss of about 0.04% while all samples containing a silane-bound additive saw a weight gain.

TABLE 4

| Material | % Weight Gain (avg of 7) |
|---|---|
| Gel Only | −0.04 |
| Gel + Silane-bound AO | +0.07 |
| Gel + Silane-bound HALS | +0.08 |
| Gel + Silane-bound HALS + TiPT | +0.06 |

Figure 10:
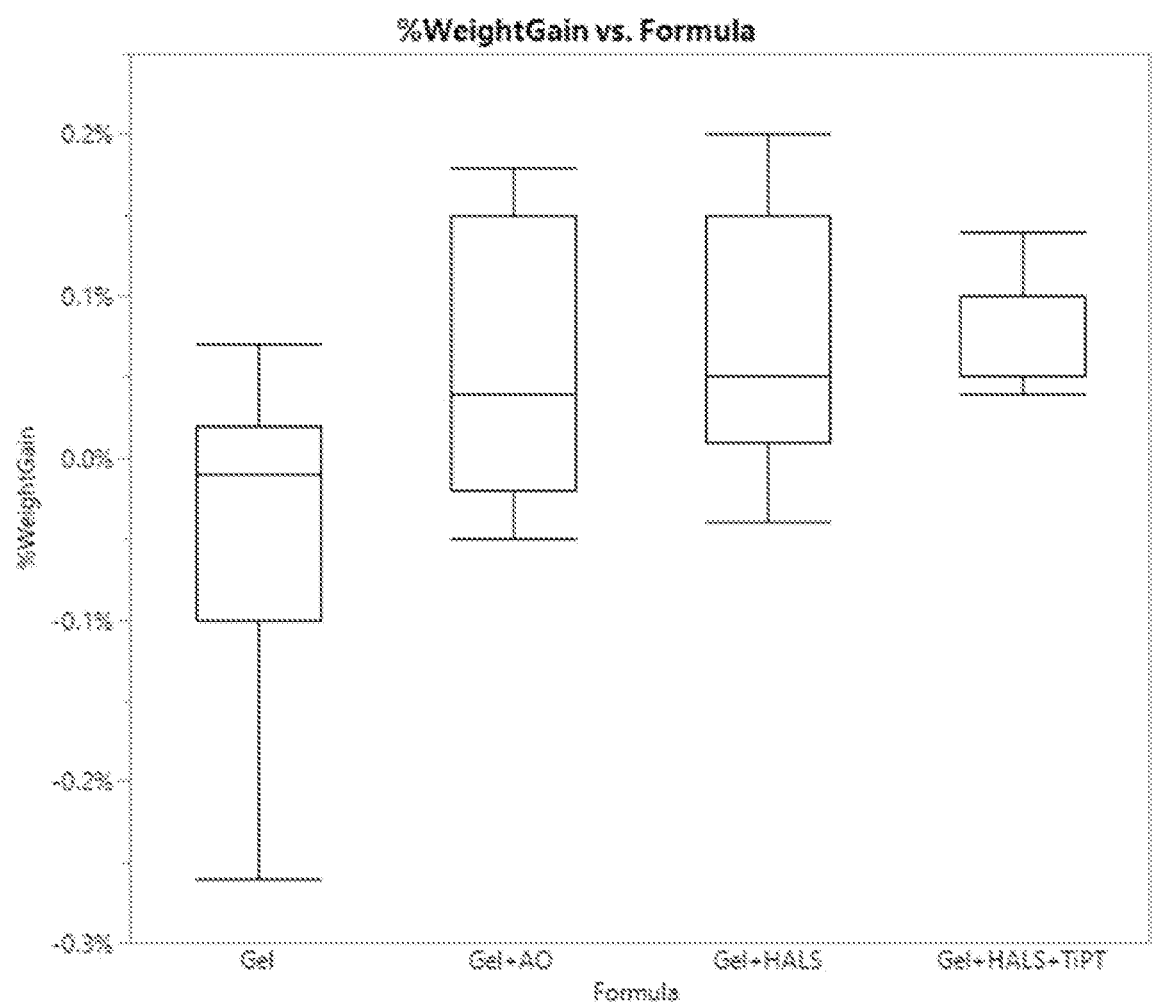
FIG. 10 is a whisker plot showing the weight gain versus gel formulation.

Full results are shown in Table 5 below and FIG. 10 showing percentage weight gain vs. gel formulation.

TABLE 5

| Time (h) | Gel Only | Time (h) | Gel + AO-DMS | Time (h) | Gel + HALS-DMS | Time (h) | Gel + HALS-DMS + TiPT |
|---|---|---|---|---|---|---|---|
| 125.9 | 0.02% | 126.2 | 0.18% | 52.0 | 0.03% | 48.0 | 0.05% |
| 313.0 | 0.02% | 313.2 | −0.02% | 316.6 | 0.01% | 315.5 | 0.07% |
| 610.5 | 0.07% | 610.7 | 0.04% | 610.9 | 0.13% | 719.5 | 0.05% |
| 1008.7 | −0.26% | 1008.9 | −0.05% | 1009.1 | −0.04% | 1006.4 | 0.05% |
| 2354.5 | −0.04% | 2354.7 | 0.15% | 2354.9 | 0.15% | 1539.4 | 0.10% |
| 3072.9 | −0.01% | 3073.2 | 0.14% | 3073.3 | 0.20% | 2186.3 | 0.14% |
| 4081.5 | −0.10% | 4081.7 | 0.04% | 4081.8 | 0.05% | 2904.7 | 0.04% |
| | | | | | | 3913.1 | 0.01% |

Experiment 4—Gel Time to Viscosity Doubling

Figure 11:
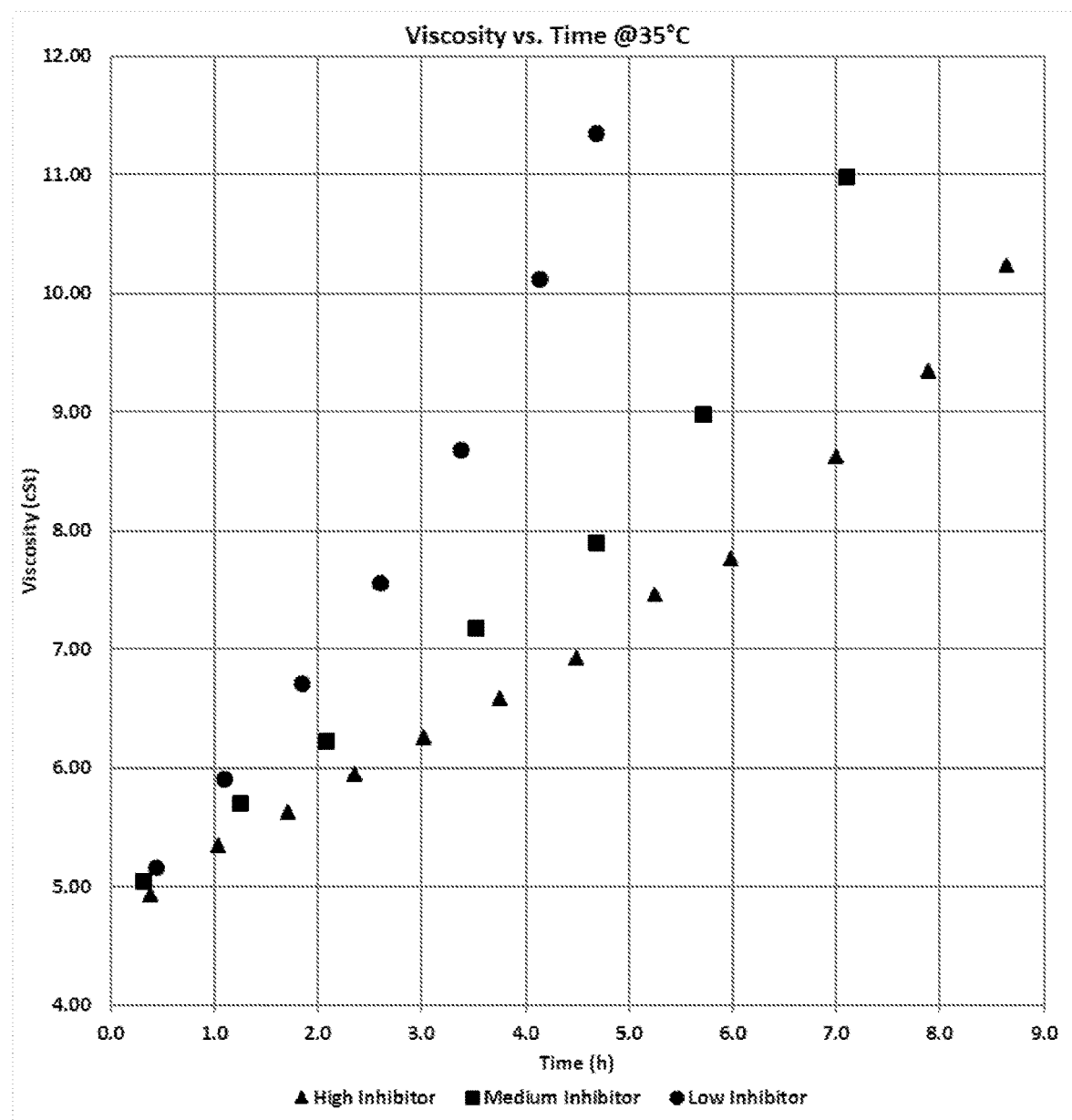
FIG. 11 is a graph displaying the viscosity versus gel time for 3 inhibitors.

Three batches of Gel Part "A" and Gel Part "B" were prepared according to the formulations given in Table 3 with the exception that the inhibitor level was varied. A complete gel sample was made by mixing 96.43 parts by weight Part "A" with 3.56 parts by weight Part "B." The resulting fluid was drawn into a size 100 Cannon Routine Viscometer, and the viscometer was immersed in a 35° C. temperature bath. The temperature of the viscometer was allowed to equilibrate for 20 min, and the viscosity of the fluid was measured. Viscosity was measured periodically until the observed viscosity was more than double the initial measurement. This roughly sets the work life duration for the gel formulation and is typically found to be about % A of the cure time required for the formulation to reach a non-flowable state. Time to viscosity doubling was found to be 8.3 h for the high inhibitor formulation, 6.5 h for the medium inhibitor, and 4.2 h for the low inhibitor. Time to gel formation was 15.4 h, 11.4 h, and 8.5 h for the high, medium, and low inhibitor samples. See FIG. 11 showing a graph for the viscosity vs. time at 35° C. Similarly, the concentration of catalyst could be varied to deliver a specific rate of cure.

Silyl Functional Benzotriazole UV Absorbers

The invention may pertain to benzotriazole compounds of formula (I) or (II) below:

Formulae (I) and (II):

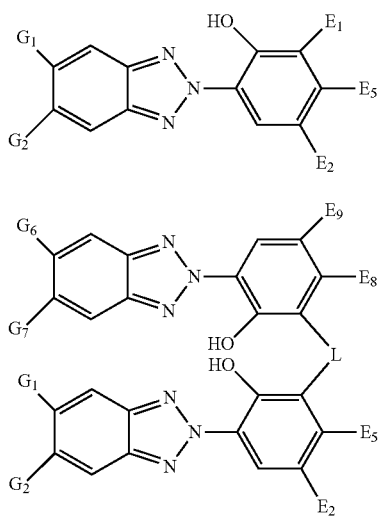

Where:

$G_1$ and $G_6$ are independently hydrogen or halogen.

$G_2$ and $G_7$ are independently H, cyano, perfluoroalkyl of 1 to 12 carbon atoms, fluoro, chloro, —CO-$G_3$, —COO$G_3$, —CONH$G_3$, —CON($G_3$)$_2$, $E_3$SO—, $E_3$SO$_2$—, —PO($C_6H_5$)$_2$,

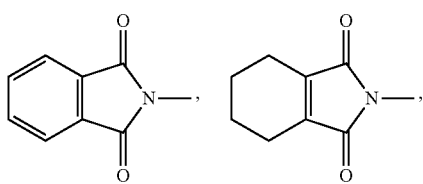

-continued

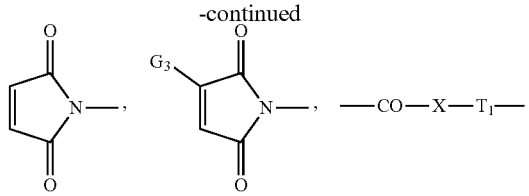

O—CO—NH-$T_2$-Si(O$R_2$)$_n$($R_1$)$_{3-n}$  or  —CO—X-$T_1$-Si(O$R_2$)$_n$ ($R_1$)$_{3-n}$;

or $G_7$ is also hydrogen.

or $G_2$ may also be hydrogen when $E_1$ is a group of formula (IV) or (V) (see below);

$T_1$ and $T_2$ are independently alkylene of 1 to 18 carbon atoms, preferably alkylene of 2 or 3 carbon atoms, or alkylene-phenylene-alkylene of 8 to 20 carbon atoms;

$R_1$ and $R_2$ are independently alkyl of 1 to 18 carbon atoms, cycloalkyl of 5 to 12 carbon atoms, aryl of 6 to 10 carbon atoms or phenylalkyl of 7 to 20 carbon atoms, preferably alkyl of 1 to 6 carbon atoms or phenyl.

n is 1, 2 or 3.

X is —O—, —N$E_4$- or —NH—.

$G_3$ is hydrogen, straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms;

$E_1$ is hydrogen, straight or branched chain alkyl of 1 to 24 carbon atoms, straight or branched chain alkenyl of 2 to 24 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms or by one or more of the following groups -$T_1$-Si(O$R_2$)$_n$($R_1$)$_{3-n}$, -$T_1$-X—CO—X-$T_2$-Si(O$R_2$)$_n$($R_1$)$_{3-n}$, -$T_1$-CO—X-$T_2$-Si(O$R_2$)$_n$($R_1$)$_{3-n}$, —X-$T_1$-Si(O$R_2$)$_n$($R_1$)$_{3-n}$, or —X-$T_1$-X—CO—X-$T_2$-Si(O$R_2$)$_n$($R_1$)$_{3-n}$;

or $E_1$ is alkyl of 1 to 24 carbon atoms substituted by one or two hydroxy groups.

or $E_1$ is a group of formula (IV) or (V) (see below).

Formulae (IV) and (V):

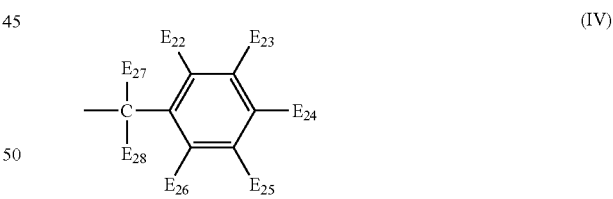

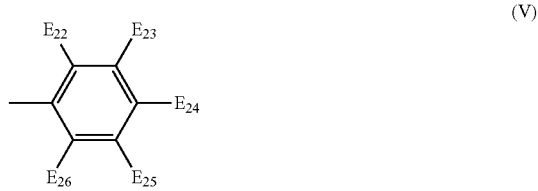

Where:

$E_{27}$ and $E_{28}$ are independently alkyl of 1 to 18 carbon atoms, or cycloalkyl of 5 to 12 carbon atoms.

$E_{22}$, $E_{23}$, $E_{24}$, $E_{25}$ and $E_{26}$ are independently hydrogen, halogen, straight or branched alkyl of 1 to 18 carbon atoms, alkenyl of 2 to 18 carbon atoms, said alkyl or said alkenyl substituted by one or more halogen, —OCO$E_{11}$, —O$E_4$, —NCO, —NHCOE$_{11}$, or —NE$_7$E$_8$, or mixtures thereof, where E$_4$ is straight or branched chain alkyl of 1 to 24 carbon atoms or straight or branched chain alkenyl of 2 to 18 carbon atoms; or said alkyl or said alkenyl interrupted by one or more —O—, —NH— or —NE$_4$- groups or mixtures thereof and which can be unsubstituted or substituted by one or more —OH, —OE$_4$ or —NH$_2$, or mixtures thereof; or E$_{22}$, E$_{23}$, E$_{24}$, E$_{25}$ and E$_{26}$ are independently phenyl, —OH, —OCOE$_{11}$, —OE$_{29}$, —NCO, —NHCOE$_{11}$, or —NE$_7$E$_8$, cyano, nitro, perfluoroalkyl of 1 to 12 carbon atoms, —COG$_3$, —COOG$_3$, —CON(G$_3$)$_2$, —CONHG$_3$, E$_3$S—, E$_3$SO—, E$_3$SO$_2$—, —P(O)(C$_6$H$_5$)$_2$, —P(O))OG$_3$)$_2$, —SO$_2$—X$_1$-E$_{29}$;

X$_1$ is —O—, —NH— or —NE$_4$-.

E$_{29}$ is straight or branched chain alkyl of 1 to 24 carbon atoms, straight or branched chain alkenyl of 2 to 18 carbon atoms, said alkyl or said alkenyl substituted by one or more —OH, —OCOE$_{11}$, —OE$_4$, —NCO, —NHCOE$_{11}$, —NE$_7$E$_8$, phthalimido,

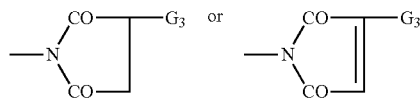

or mixtures thereof, where E$_4$ is straight or branched chain alkyl of 1 to 24 carbon atoms or alkenyl of 2 to 18 carbon atoms; or said alkyl or said alkenyl interrupted by one or more —O—, —NH— or —NE$_4$- groups or mixtures thereof and which can be unsubstituted or substituted by one or more —OH, —OE$_4$ or —NH$_2$, or mixtures thereof; or E$_{29}$ is phenyl or phenylalkyl of 7 to 15 carbon atoms, or said phenyl or said phenylalkyl substituted by one to three alkyl groups of 1 to 4 carbon atoms;

E$_2$ and E$_9$ are independently hydrogen, straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by one to three alkyl of 1 to 4 carbon atoms or by one or more of the following groups -T$_1$-Si(OR$_2$)$_n$(R$_1$)$_{3-n}$, -T$_1$-X—CO—X-T$_2$-Si(OR$_2$)$_n$(R$_1$)$_{3-n}$, -T$_1$-CO—X-T$_2$-Si(OR$_2$)$_n$(R$_1$)$_{3-n}$, —X-T$_1$-Si(OR$_2$)$_n$(R$_1$)$_{3-n}$ or —X-T$_1$-X—CO—X-T$_2$-Si(OR$_2$)$_n$(R$_1$)$_{3-n}$; or E$_2$ and E$_9$ are independently said alkyl of 1 to 24 carbon atoms or said alkenyl of 2 to 18 carbon atoms substituted by one or more —OH, —OCOE$_{11}$, —OE$_4$, —NCO, —NH$_2$, —NHCOE$_{11}$, —NHE$_4$ or —N(E$_4$)$_2$, or mixtures thereof, where E$_4$ is straight or branched chain alkyl of 1 to 24 carbon atoms; or said alkyl or said alkenyl interrupted by one or more —O—, —NH— or —NE$_4$- groups or mixtures thereof and which can be unsubstituted or substituted by one or more —OH, —OE$_4$ or —NH$_2$ groups or mixtures thereof; or E$_1$, E$_2$ and E$_9$ are also independently -T$_1$-Si(OR$_2$)$_n$(R$_1$)$_{3-n}$, -T$_1$-X—CO—X-T$_2$-Si(OR$_2$)$_n$(R$_1$)$_{3-n}$ or -T$_1$-CO—X-T$_2$-Si(OR$_2$)$_n$(R$_1$)$_{3-n}$;

E$_{11}$ is hydrogen, straight or branched chain alkyl of 1 to 18 carbon atoms, straight or branched chain alkenyl of 2 to 18 carbon atoms, cycloalkyl of 5 to 12 carbon atoms, aryl of 6 to 14 carbon atoms or phenylalkyl of 7 to 15 carbon atoms;

L is alkylene of 1 to 12 carbon atoms, alkylidene of 2 to 12 carbon atoms, benzylidene, p-xylylene, cycloalkylidene of 5 to 12 carbon atoms or α,α,α',α'-tetramethyl-m-xylylene.

E$_3$ is alkyl of 1 to 20 carbon atoms, said alkyl substituted by alkoxycarbonyl of 2 to 9 carbon atoms, hydroxyalkyl of 2 to 20 carbon atoms, alkenyl of 3 to 18 carbon atoms, cycloalkyl of 5 to 12 carbon atoms, phenylalkyl of 7 to 15 carbon atoms, aryl of 6 to 10 carbon atoms or said aryl substituted by one or two alkyl of 1 to 4 carbon atoms or 1,1,2,2-tetrahydroperfluoroalkyl where the perfluoroalkyl moiety is of 6 to 16 carbon atoms, E$_5$ and E$_8$ are independently the same as E$_2$; or E$_5$ and E$_8$ are independently hydrogen, —X-E$_1$, —X—CO-E$_2$, —X—CO—X$_1$, —X-T$_1$-Si(OR$_2$)$_n$(R$_1$)$_{3-n}$ or —X-T$_1$-X—CO—X-T$_2$-Si(OR$_2$)$_n$(R$_1$)$_{3-n}$;

X$_1$ is —NH-E$_4$ or —X-E$_2$;

with the proviso that at least one of G$_2$, G$_7$, E$_1$, E$_2$, E$_5$, E$_8$ and E$_9$ contains a group -T$_1$-Si(OR$_2$)$_n$(R$_1$)$_{3-n}$, -T$_1$-X—CO—X-T$_2$-Si(OR$_2$)$_n$(R$_1$)$_{3-n}$, -T$_1$-CO—X-T$_2$-Si(OR$_2$)$_n$(R$_1$)$_{3-n}$, —X-T$_1$-Si(OR$_2$)$_n$(R$_1$)$_{3-n}$ or —X-T$_1$-X—CO—X-T$_2$-Si(OR$_2$)$_n$(R$_1$)$_{3-n}$; where T$_1$ and T$_2$ are independently alkylene of 1 to 18 carbon atoms or alkylene-phenylene-alkylene of 8 to 20 carbon atoms, and R$_1$ and R$_2$ are independently alkyl of 1 to 18 carbon atoms, cycloalkyl of 5 to 12 carbon atoms, aryl of 6 to 10 carbon atoms or phenylalkyl of 7 to 20 carbon atoms, preferably alkyl of 1 to 3 carbon atoms or phenyl, and n is 1, 2 or 3.

Preferably, the new benzotriazole is a compound of formula (IA) or (IIA).

Formulae (IA) and (IIA):

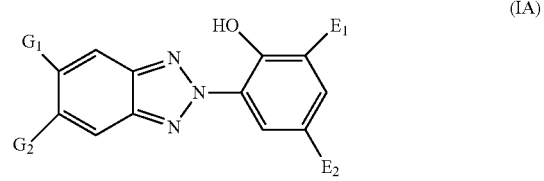

(IA)

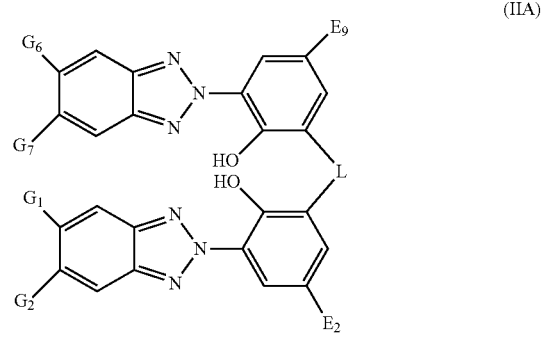

(IIA)

Where:
G$_1$ and G$_6$ are hydrogen,
G$_2$ and G$_7$ are independently H, cyano, CF$_3$—, fluoro, —CO-G$_3$, or E$_3$SO$_2$—, or G$_7$ is also hydrogen,
G$_3$ is straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms,
E$_1$ is phenylalkyl of 7 to 15 carbon atoms, phenyl, or said phenyl or said phenylalkyl substituted on the phenyl ring by 1 to 4 alkyl groups of 1 to 4 carbon atoms each,
E$_2$ and E$_9$ are independently straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; or $E_2$ is said alkyl of 1 to 24 carbon atoms or said alkenyl of 2 to 18 carbon atoms substituted by one or more —OH, —OCOE$_{11}$, —OE$_4$, —NCO, —NH$_2$, —NHCOE$_{11}$, —NHE$_4$ or —N(E$_4$)$_2$, or mixtures thereof, where $E_4$ is straight or branched chain alkyl of 1 to 24 carbon atoms; or said alkyl or said alkenyl interrupted by one or more —O—, —NH—, or —NE$_4$- groups or mixtures thereof and which can be unsubstituted or substituted by one or more —OH, —OE$_4$, or —NH$_2$ groups or mixtures thereof;

$E_{11}$ is hydrogen, straight or branched chain alkyl of 1 to 18 carbon atoms, straight or branched chain alkenyl of 2 to 18 carbon atoms, cycloalkyl of 5 to 12 carbon atoms, aryl of 6 to 14 carbon atoms or phenylalkyl of 7 to 15 carbon atoms.

$E_3$ is alkyl of 1 to 20 carbon atoms, hydroxyalkyl of 2 to 20 carbon atoms, alkenyl of 3 to 18 carbon atoms, cycloalkyl of 5 to 12 carbon atoms, phenylalkyl of 7 to 15 carbon atoms, aryl of 6 to 10 carbon atoms or said aryl substituted by one or two alkyls of 1 to 4 carbon atoms or 1,1,2,2-tetrahydroperfluoroalkyl where the perfluoroalkyl moiety is of 6 to 16 carbon atoms;

L is methylene; and with the proviso that at least one of $E_1$, $E_2$ and $E_9$ contains a group -T$_1$-Si(OR$_2$)$_n$(R$_1$)$_{3-n}$, -T$_1$-X—CO—X-T$_2$-Si(OR$_2$)$_n$(R$_1$)$_{3-n}$, -T$_1$-CO—X-T$_2$-Si(OR$_2$)$_n$(R$_1$)$_{3-n}$, —X-T$_1$-Si(OR$_2$)$_n$(R$_1$)$_{3-n}$ or —X-T$_1$-X—CO—X-T$_2$-Si(OR$_2$)$_n$(R$_1$)$_{3-n}$;

where T$_1$ and T$_2$ are independently alkylene of 2 or 3 carbon atoms, and R$_1$ and R$_2$ are independently alkyl of 1 to 6 carbon atoms or phenyl, and n is 1, 2, or 3.

Another preferred embodiment of the invention is a compound of formula (IA).

Compound of Formula (IA)

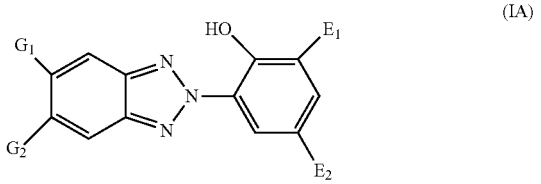

(IA)

Where:
G$_1$ is hydrogen,
G$_2$ is H, CF$_3$—, fluoro or E$_3$SO$_2$—,
E$_1$ is hydrogen or straight or branched alkyl of 2 to 24 carbon atoms,
E$_2$ is as defined above, and
E$_3$ is straight or branched chain alkyl of 1 to 7 carbon atoms, with the proviso that E$_2$ contains a group -T$_1$-Si(OR$_2$)$_n$(R$_1$)$_{3-n}$, -T$_1$-X—CO—X-T$_2$-Si(OR$_2$)$_n$(R$_1$)$_{3-n}$, -T$_1$-CO—X-T$_2$-Si(OR$_2$)$_n$(R$_1$)$_{3-n}$, —X-T$_1$-Si(OR$_2$)$_n$(R$_1$)$_{3-n}$ or —X-T$_1$-X—CO—X-T$_2$-Si(OR$_2$)$_n$(R)$_{3-n}$; where T$_1$ and T$_2$ are independently alkylene of 2 or 3 carbon atoms, and R$_1$ and R$_2$ are independently alkyl of 1 to 6 carbon atoms or phenyl, and n is 1, 2 or 3.

Preferably, the compound of formula (IAIIA) is
(a) 2-[2-hydroxy-3-(3-triethoxysilyl) propyl-5-tert-octylphenyl]-2H-benzo-triazole.
(b) 2-{2-hydroxy-3-tert-butyl-5-[3-(3-triethyoxysilyl) propylcarbamoyloxy)-propyl] phenyl}2H-benzotriazole.
(c) 2-{2-hydroxy-3-tert-butyl-5-[2-(3-triethyoxysilyl) propylcarbamoyl-oxy) ethyl]phenyl}-2H-benzotriazole.

(d) 2-{2-hydroxy-5-[2-(3-triethyoxysilyl) propyl-carbamoyloxy) ethyl]-phenyl}-2H-benzotriazole.
(e) 2-{2-hydroxy-3-α-cumyl-5-[2-(3-triethyoxysilyl) propylcarbamoyl-oxy) ethyl] phenyl}-2H-benzotriazole.
(f) 2-{2-hydroxy-3-tert-butyl-5-[3-(diethoxymethylsilyl) propylamino-carbonylethyl] phenyl}-2H-benzotriazole.
(g) 2-{2-hydroxy-3-tert-butyl-5-[3-(2-ethoxydimethylsilyl) ethylcarbonyl-oxy) propyl] phenyl}-2H-benzotriazole.
(h) 2-{2-hydroxy-3-tert-butyl-5-[2-(3-ethoxydimethylsilyl) propyl-oxycarbonyl) ethyl] phenyl}-2H-benzotriazole.
(i) 2-[2-hydroxy-3-(ethoxydimethylsilyl) propyl-5-tert-octylphenyl]-2H-benzotriazole.
(j) 5-[3-(diethoxyethylsilyl) propoxycarbonyl]-2-(2-hydroxy-3-α-cumyl-5-tert-octyl-phenyl)-2H-benzotriazole.
(k) 5-[3-(diethoxyethylsilyl) propylaminocarbonyl]-2-(2-hydroxy-3-α-cumyl-5-tert-octyl-phenyl)-2H-benzotriazole.

and the following structures:

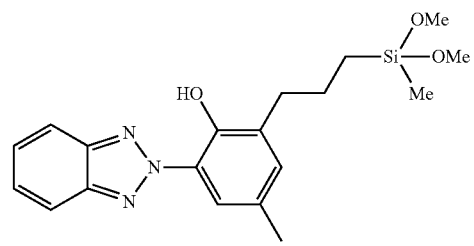

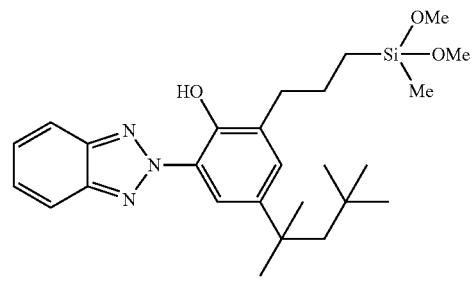

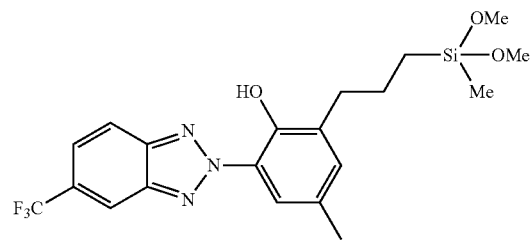

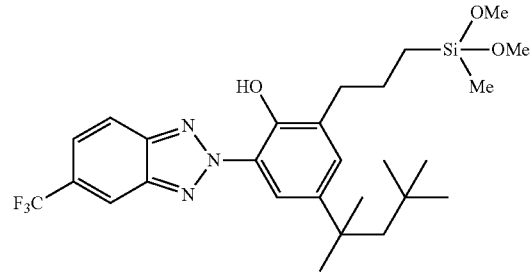

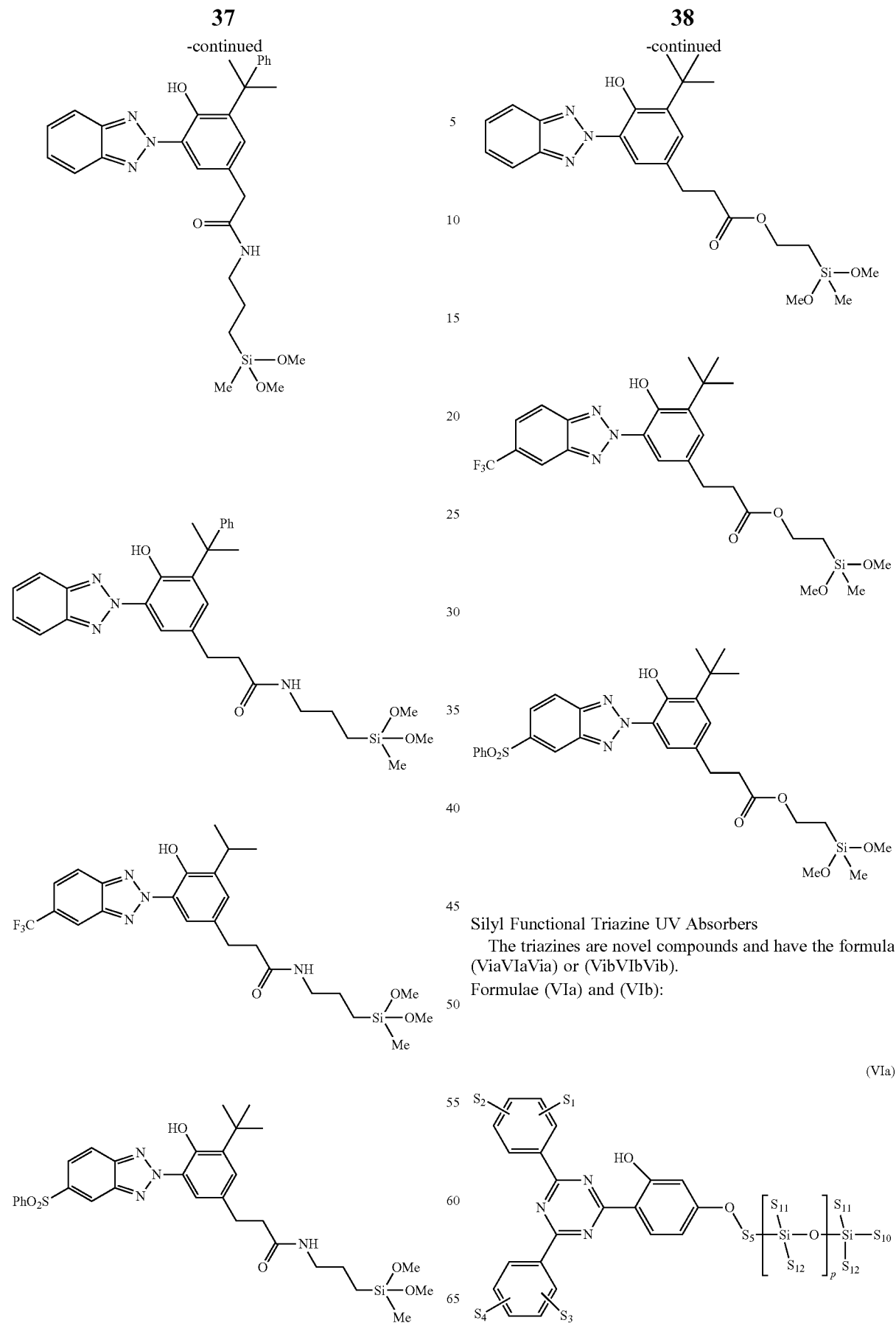
Silyl Functional Triazine UV Absorbers
The triazines are novel compounds and have the formula (ViaVIaVia) or (VibVIbVib).
Formulae (VIa) and (VIb):

-continued

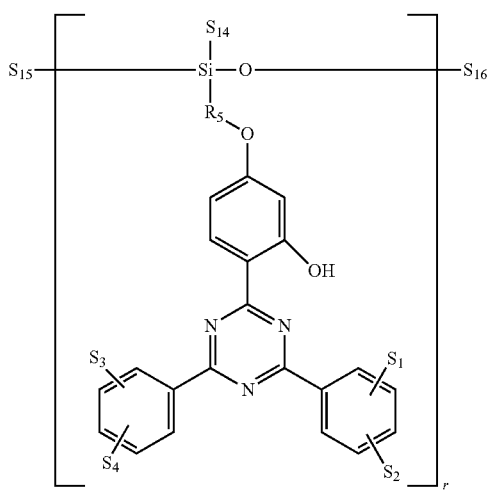

Where:

p is 0 or an integer from 1-50, r is an integer from 1-50, $S_1$ and $S_3$ are each independently of the other hydrogen, OH, $C_1$-$C_{12}$ alkyl or cyclohexyl, $S_2$ and $S_4$ are each independently of the other hydrogen, OH, $C_1$-$C_{12}$ alkyl, $C_1$-$C_{18}$ alkoxy, halogen or a group —O—IIVIIII,

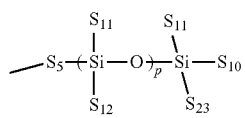

$S_5$ is a direct bond or a divalent group of one of the following formulae: —$C_mH_{2m}$—, —$(CH_2)_m$—O—, —$(CH_2)_m$—O—$S_6$—, —$(CH_2)_m$—CO—X—$(CH_2)_n$—, —$(CH_2)_m$—CO—X—$(CH_2)_n$—O—,

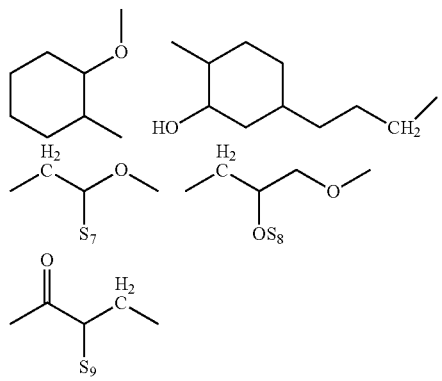

—$CH_2$—CH(OH)—$CH_2$—Y—$(CH_2)_m$—, wherein m and n are each independently of the other 1-4, $S_6$ is $C_1$-$C_{12}$ alkylene, cyclohexylene or phenylene, $S_7$ is $C_1$-$C_{12}$ alkyl, $C_5$-$C_8$ cycloalkyl, phenyl, $C_2$-$C_{13}$ alkoxymethyl, $C_6$-$C_9$ cycloalkoxymethyl or phenoxymethyl, $S_8$ is a group of formula II, $S_9$ is hydrogen or methyl, X is —O— or —$NS_{13}$—, wherein $S_{13}$ is hydrogen, $C_1$-$C_{12}$alkyl, phenyl or a group —$(CH_2)_3$—II or —$(CH_2)_3$—O—II, Y is —O— or —NH—, $S_{10}$, $S_{11}$ and $S_{12}$ are each independently of one another $C_1$-$C_{18}$ alkyl, cyclohexyl, phenyl or $C_1$-$C_{18}$ alkoxy, and, if $S_2$ and $S_4$ are not a group —O—II, $S_{10}$ and/or $S_{11}$ may also be a group of formula (VIII) below:

Formula (VIII):

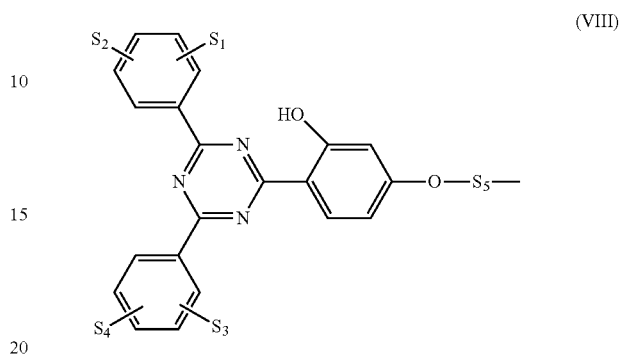

$S_{14}$ is $C_1$-$C_{12}$ alkyl, $C_5$-$C_8$ cycloalkyl or phenyl, and $S_{15}$ is hydroxy or $C_1$-$C_4$ alkoxy and $S_{16}$ is hydrogen or $C_1$-$C_4$ alkyl or, if r is greater than 2, $S_{15}$ and $S_{16}$ together may be a direct bond.

One of the substituents $S_1$, $S_2$, $S_3$, $S_4$, $S_7$, Sa, and $S_{14}$ in formula (IaVIaIa) or formula (IbVIbIb) as $C_1$-$C_{12}$ alkyl may be a linear or branched alkyl group. Typical examples of such groups are methyl, ethyl, n-propyl, isopropyl, n-butyl, tert-butyl, pentyl, hexyl, octyl, 2-ethylhexyl, nonyl, decyl or dodecyl. $S_{10}$, $S_{11}$, and $S_{12}$ as $C_1$-$C_{18}$alkyl may additionally be tetradecyl, hexadecyl or octadecyl.

$S_7$ and $S_{14}$ as $C_5$-$C_8$ cycloalkyl may be cyclopentyl, cyclohexyl or cyclooctyl, preferably cyclohexyl.

$S_2$, $S_4$, $S_{10}$, $S_{11}$, and $S_{12}$ as $C_1$-$C_{18}$ alkoxy may be linear or branched alkoxy groups. Exemplary of such groups are methoxy, ethoxy, isopropoxy, butoxy, hexoxy, octyloxy, decyloxy, dodecyloxy or octadecyloxy.

$S_{10}$, $S_{11}$, and $S_{12}$ are preferably $C_1$-$C_4$ alkyl or $C_1$-$C_4$ alkoxy, and $S_{14}$ is preferably $C_1$-$C_4$ alkyl.

$S_6$ as $C_1$-$C_{12}$ alkylene may be a linear or branched alkylene group. Such groups are typically methylene, dimethylene, 1,2-propylene, trimethylene, 2,2-dimethyltrimethylene, tetramethylene, hexamethylene, octamethylene, or dodecamethylene.

Preferred compounds of formula (Via) are those wherein $S_5$ is a direct bond or a divalent group of one of the following formulae: —$(CH_2)_m$—, —$(CH_2)_m$—O—, —$(CH_2)_m$—O—$R_6$—, —$(CH_2)_m$—CO—X—$(CH_2)_n$—, —$(CH_2)_m$—CO—X—$(CH_2)_n$—O—,

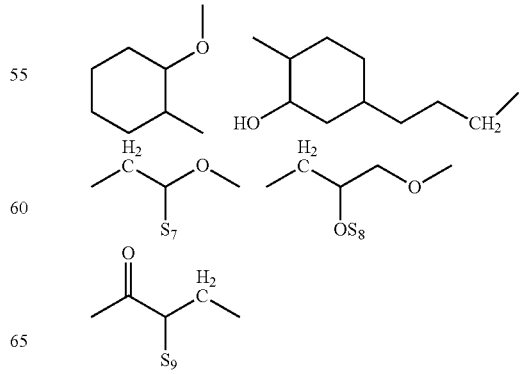

—CH$_2$—CH(OH)—CH$_2$—Y—(CH$_2$)$_m$—, wherein m and n are each independently of the other 1-4.

Also preferred are compounds of formula (VIa) or (VIb) wherein S$_1$, S$_2$, S$_3$ and S$_4$ are each independently of one another hydrogen or methyl. Especially preferred compounds are -(2-hydroxyphenyl)-s-triazines of formula (IaVIaIa) or formula (IbVIbIb) which are substituted in the 4- and 6-position by a phenyl, p-tolyl or 2,4-dimethylphenyl group.

The novel compounds preferably carry at the silicon atom C$_1$-C$_8$ alkyl, phenyl or C$_1$-C$_8$ alkoxy as substituents S$_{10}$, S$_{11}$ and S$_{12}$, and C$_1$-C$_8$ alkyl or phenyl as S$_{14}$, or S$_{10}$ and/or S$_{11}$ is a group of formula (VIII). Compounds wherein S$_{10}$, S$_{11}$ and S$_{12}$ are C$_1$-C$_4$ alkyl or C$_1$-C$_4$ alkoxy and S$_{14}$ is C$_1$-C$_4$ alkyl are especially preferred.

The hydroxyphenyltriazine group is linked to the silyl radical through the group S$_5$.

Preferably S$_5$ is a group —C$_m$H$_{2m}$—, —(CH$_2$)$_m$—O—, —(CH$_2$)$_m$—CO—X—(CH$_2$)$_n$—,

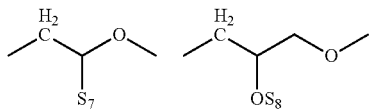

or —CH$_2$—CH(OH)—CH$_2$—Y—(CH$_2$)$_m$—, wherein m is 1, 2 or 3, S$_7$ is methyl, phenyl, C$_3$-C$_9$ alkoxymethyl or phenoxymethyl, S$_8$ is a group of formula VII and X and Y are each oxygen.

Particularly preferred compounds of formula VIa or VIb are those wherein S$_5$ is a group —C$_m$H$_{2m}$—, —(CH$_2$)$_2$—O—, —CH$_2$—CO—O—CH$_2$—, —CH$_2$—CH(O—C$_4$H$_9$)—O—,

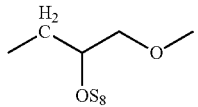

or —CH$_2$—CH(OH)—CH$_2$—O—(CH$_2$)$_3$—, m is an integer 1, 2 or 3, and S$_8$ is a radical

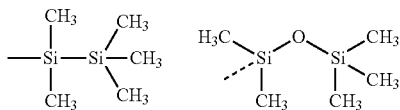

The compounds of formula (ViaVIaVia), wherein p is 0, are especially preferred.

Compounds of formula VIa or VIb, wherein S$_1$, S$_2$, S$_3$ and S$_4$ are each in o- and/or p-position, p is 0, S$_5$ is —(CH$_2$)$_3$—, S$_{10}$ is methyl or ethyl, S$_{11}$ and S$_{12}$ are ethyl or ethoxy, S$_{14}$ is methyl, S$_{15}$ is —OH, methoxy or ethoxy, S$_{16}$ is hydrogen, methyl or ethyl, and, if r is greater than 2, S$_{15}$ and S$_{16}$ together may be a direct bond, are also especially preferred.

The following compounds are representative examples of compounds of formula ViaVIaVia:

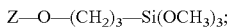

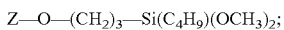

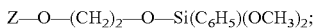

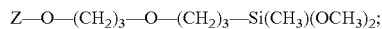

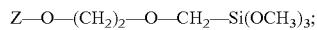

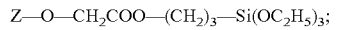

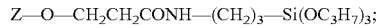

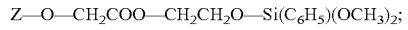

Z—O—CH$_2$—CH—CH$_2$OC$_4$H$_9$(O—Si(OCH$_3$)$_2$ (CH$_3$);

Z—O—CH$_2$—CH(OH)—CH$_2$—O—(CH$_2$)$_3$—Si (OCH$_3$)$_2$(CH$_3$)

Z—O—CH$_2$—CH(OH)—CH$_2$—NH—(CH$_2$)$_3$—Si (OCH$_3$)$_2$(CH$_3$)

Z—O—CH$_2$—CH(OH)—CH$_2$—N—[(CH$_2$)$_3$—Si (OCH$_3$)$_2$(CH$_3$)]$_2$

In the above formula, Z is a group.

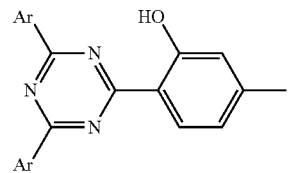

Where:
Ar is phenyl, p-tolyl or 2,4-dimethylphenyl.

The synthesis of the compounds of formula IaVIaIa depends on the respective linking group S$_5$ through which the triazinyl group and the silyl group are attached. Possible syntheses are set out below for each type of S$_5$.

1) If S$_5$ is a group —C$_m$H$_{2m}$—:

AH+Cl—C$_m$H$_{2m}$—B→IaVIaIa+HCl

Where:
A is a triazine group of formula

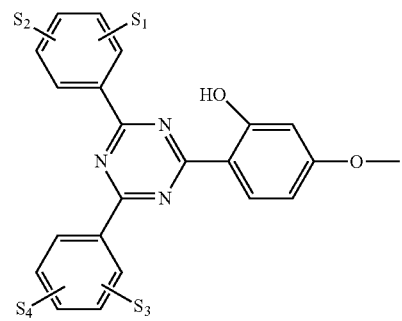

and B is a silyl group of formula

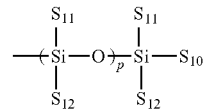

An alternative synthesis proceeds according to the scheme:

A-(CH$_2$)$_{m-2}$—CH=CH$_2$+HB→VIa

2) If S$_5$ is a group —(CH$_2$)$_m$—O—:

A-(CH$_2$)$_m$—OH+Cl—B→VIa+HCl

3) If S$_5$ is a group —(CH$_2$)$_m$—O—S$_6$—:

A-(CH$_2$)$_m$—OH+Cl—S$_6$—B→VIa+HCl

4) If S$_5$ is a group —(CH$_2$)$_m$—CO—X—(CH$_2$)$_n$—:

A-(CH$_2$)$_m$—COOR+HX—(CH$_2$)$_n$—B→VIa+ROH

R=C$_1$-C$_2$ alkyl

5) If S$_5$ is a group —(CH$_2$)$_m$—CO—X—(CH$_2$)$_n$—O—:

A—(CH$_2$)$_m$—COOR + HX—(CH$_2$)$_n$—OH ⟶

A—(CH$_2$)$_m$—CO—X—(CH$_2$)$_n$—OH $\xrightarrow{+ClB}$ VIa + HCl

6) If S$_5$ is a group

AH + [epoxycyclohexane] ⟶ [2-A-cyclohexanol with methoxy] $\xrightarrow{+ClB}$ VIa + HCl 7) If S$_5$ is a group —CH$_2$—CH(S$_7$)—O—:

AH + S$_7$-[epoxide] ⟶ A-[CH$_2$CH(S$_7$)OH] $\xrightarrow{BCl}$ VIa + HCl

8) If S$_5$ is a group —CH$_2$—CH(OR$_8$)—CH$_2$O—:

AH + ClCH$_2$CH(OH)CH$_2$OH ⟶

A—CH$_2$CH(OH)CH$_2$OH $\xrightarrow{+2ClB}$ VIa + 2HCl

9) If S$_5$ is a group

[ketone with S$_9$ substituent]

AH + RO-[acrylate with S$_9$] ⟶

[acyl compound with S$_9$] $\xrightarrow{HB}$ VIa or alternatively

HB + [acrylate with S$_9$, OR] ⟶

B-[propanoate with S$_9$, OR] $\xrightarrow{AH}$ VIa$^+$ ROH

10) If S$_5$ is a group —CH$_2$—CH(OH)—CH$_2$—Y—(CH$_2$)$_n$—:

AH + [epoxide]—CH$_2$- -Y- - -(CH$_2$)$_n$- - -B ⟶ VIa

Silyl Functional Hindered Amine Light Stabilizers

The invention may pertain to novel compounds of the formula (XI).

Formula (XI):

$$X_1 - \left[ \begin{array}{c} T_1 \\ | \\ Si - O \\ | \\ T_2 \\ | \\ A \\ | \\ \text{[2,2,6,6-tetramethylpiperidine-N-OT}_3\text{]} \end{array} \right]_m \left( \begin{array}{c} T_4 \\ | \\ Si - O \\ | \\ T_5 \end{array} \right)_n X_2$$ (XI)

Where:

m+n is a number from 1 to 100 and n varies from zero to 90% of the sum of m+n,

A is —O— or

T$_6$—N(CH$_3$)$_2$

Where:

$T_6$ is hydrogen, $C_1$-$C_{18}$ alkyl or a group of the formula (XII)

Formula (XII):

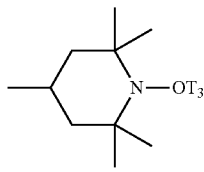

and $T_4$ which can be identical or different are $C_1$-$C_8$ alkyl, phenyl, $C_1$-$C_8$ alkoxy, OH, ONa or OK, $T_2$ is $C_2$-$C_{12}$ alkylene or also a direct bond if A is —O— and $T_1$ and $T_4$ are $C_1$-$C_8$ alkyl or phenyl, $T_3$ is $C_1$-$C_{18}$ alkyl, $C_5$-$C_{12}$ cycloalkyl, $C_2$-$C_{18}$ alkenyl, $C_5$-$C_{12}$ cycloalkenyl, $C_7$-$C_{12}$ aralkyl, a saturated or unsaturated radical of a bicyclic or tricyclic $C_7$-$C_{12}$ hydrocarbon or $C_6$-$C_{10}$ aryl which is unsubstituted or substituted by $C_1$-$C_8$ alkyl, $T_5$ is hydrogen, $C_1$-$C_{18}$ alkyl, $C_5$-$C_{12}$ cycloalkyl or phenyl, $X_1$ is as defined for $T_1$ or is a group $(T_7)_3$SiO— with $T_7$ being $C_1$-$C_8$ alkyl, $X_2$ is hydrogen, Na, K, $C_1$-$C_8$ alkyl, a group $(T_7)_3$—Si— or, if n is zero and $T_1$ and $X_1$ are $C_1$-$C_8$ alkyl or phenyl, $X_2$ is also a group of the formula (XIII)

Formula (XIII):

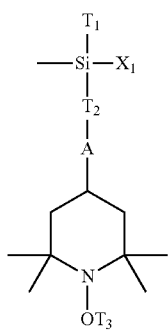

and, if m+n is a number from 3 to 10, $X_1$ and $X_2$ together can also be a direct bond.

Each of the groups A, $T_1$, $T_2$, $T_3$, $T_4$ and $T_5$ can, in the single recurring units of the formula (XI), have the same definition or different definitions and, if the compounds of the present invention are copolymeric, they may have a random distribution or a block distribution of the various recurring units.

Examples of alkyl having not more than 18 carbon atoms are methyl, ethyl, propyl, isopropyl, butyl, 2-butyl, isobutyl, t-butyl, pentyl, 2-pentyl, isopentyl, hexyl, heptyl, octyl, 2-ethylhexyl, t-octyl, nonyl, decyl, undecyl, dodecyl, tridecyl, tetradecyl, hexadecyl and octadecyl.

Examples of $C_1$-$C_8$ alkoxy are methoxy, ethoxy, propoxy, isopropoxy, butoxy, isobutoxy, t-butoxy, pentoxy, isopentoxy, hexoxy, heptoxy and octoxy.

Examples of $C_5$-$C_{12}$ cycloalkyl are cyclopentyl, cyclohexyl, methylcyclohexyl, cycloheptyl, cyclooctyl, cyclodecyl and cyclododecyl. $C_5$-$C_{12}$ cycloalkyl also covers a saturated cyclic hydrocarbon radical of 5 to 8 carbon atoms, which is substituted by $C_1$-$C_4$ alkyl.

Examples of $C_2$-$C_{18}$ alkenyl are vinyl, allyl, 2-methylallyl, butenyl, pentenyl, hexenyl, heptenyl, octenyl, decenyl, dodecenyl, tetradecenyl, hexadecenyl and octadecenyl.

Examples of $C_5$-$C_{12}$ cycloalkenyl are cyclopentenyl, cyclohexenyl, methylcyclohexenyl, cycloheptenyl, cyclooctenyl, cyclodecenyl and cyclododecenyl. $C_5$ $C_{12}$ cycloalkenyl also covers an unsaturated cyclic hydrocarbon radical of 5 to 8 carbon atoms, which is substituted by $C_1$-$C_4$ alkyl.

Examples of $C_7$-$C_{12}$ aralkyl are benzyl, α-methylbenzyl, α,α-dimethylbenzyl and phenylethyl. $C_7$-$C_9$ phenylalkyl is preferred.

Examples of saturated or unsaturated radicals of a bicyclic or tricyclic $C_7$-$C_{12}$ hydrocarbon are bicycloheptyl, bicycloheptenyl, decahydronaphthyl, tetrahydronaphthyl and tricyclodecyl.

Examples of $C_6$-$C_{10}$ aryl, which is unsubstituted or substituted by alkyl are phenyl, methylphenyl, dimethylphenyl, trimethylphenyl, isopropylphenyl, naphthyl and methylnaphthyl.

Examples of $C_2$-$C_{12}$ alkylene are ethylene, propylene, trimethylene, 2-methyltrimethylene, tetramethylene, pentamethylene, hexamethylene, octamethylene, decamethylene, undecamethylene and dodecamethylene. Trimethylene is preferred.

Those compounds of the formula (XI) are preferred in which m+n is a number from 1 to 80, n varies from zero to 90% of the sum m+n, A is —O— or

Where:

$T_6$ is hydrogen, $C_1$-$C_{12}$ alkyl or a group of the formula (XII), $T_1$ and $T_4$ which can be identical or different are $C_1$-$C_6$ alkyl, phenyl, $C_1$-$C_6$ alkoxy, OH, ONa or OK, $T_2$ is $C_2$-$C_8$ alkylene or also a direct bond if A is —O— and $T_1$ and $T_4$ are $C_1$-$C_6$ alkyl or phenyl, $T_3$ is $C_1$-$C_{18}$ alkyl, $C_5$-$C_8$ cycloalkyl, $C_3$-$C_{12}$ alkenyl, $C_5$-$C_8$ cycloalkenyl, $C_7$-$C_9$ aralkyl, a saturated or unsaturated radical of a bicyclic or tricyclic $C_7$-$C_{10}$ hydrocarbon or $C_6$-$C_{10}$ aryl which is unsubstituted or substituted by $C_1$-$C_4$ alkyl, $T_5$ is hydrogen, $C_1$-$C_{18}$ alkyl, $C_5$-$C_8$ cycloalkyl or phenyl, $X_1$ is as defined for $R_1$ or is a group $(T_7)_3$SiO— with $T_7$ being $C_1$-$C_6$ alkyl, $X_2$ is hydrogen, Na, K, $C_1$-$C_6$ alkyl, a group $(T_7)_3$Si— or, if n is zero and $T_1$ and $X_1$ are $C_1$-$C_6$ alkyl or phenyl, $X_2$ is also a group of the formula (XIII) and, if m+n is a number from 3 to 10, $X_1$ and $X_2$ together can also be a direct bond.

Those compounds of the formula (I) are particularly preferred in which m+n is a number from 1 to 60, n varies from zero to 90% of the sum of m+n, A is —O— or

Where:

$T_6$ is hydrogen or $C_1$-$C_8$ alkyl, $T_1$ and $T_4$ which can be identical or different are $C_1$-$C_4$ alkyl, phenyl, $C_1$-$C_4$ alkoxy, OH, ONa or OK, $T_2$ is $C_2$-$C_6$ alkylene or also a direct bond if A is —O— and $T_1$ and $T_4$ are $C_1$-$C_4$ alkyl or phenyl, $T_3$ is $C_1$-$C_{16}$ alkyl, $C_5$-$C_7$ cycloalkyl, $C_3$-$C_6$ alkenyl, $C_5$-$C_7$ cycloalkenyl, benzyl, α-methylbenzyl, α,α-dimethylbenzyl, bicycloheptyl, bicycloheptenyl, decahydronaphthyl or tetrahydronaphthyl, $T_5$ is hydrogen, $C_1$-$C_{16}$ alkyl, cyclohexyl or phenyl, $X_1$ is as defined for $R_1$ or a group $(T_7)_3SiO—$ with $T_7$ being $C_1$-$C_4$ alkyl, $X_2$ is hydrogen, Na, K, $C_1$-$C_4$ alkyl, a group $(T_7)_3Si—$ or, if n is zero and $T_1$ and $X_1$ are $C_1$-$C_4$ alkyl or phenyl, $X_2$ is also a group of the formula (XIII) and, if m+n is a number from 3 to 10, $X_1$ and $X_2$ together can also be a direct bond.

Those compounds of the formula (I) are of special interest in which m+n is a number from 1 to 50, n varies from zero to 75% of the sum m+n, A is —O— or

Where:

$T_6$ is hydrogen or $C_1$-$C_4$ alkyl, $T_1$ and $T_4$ which can be identical or different are $C_1$-$C_3$ alkyl, $C_1$-$C_3$ alkoxy or OH, $T_2$ is $C_2$-$C_4$ alkylene or is also a direct bond if A is —O— and $T_1$ and $T_4$ are $C_1$-$C_3$ alkyl, $T_3$ is methyl, $C_6$-$C_{12}$ alkyl, cyclopentyl, cyclohexyl, methylcyclohexyl or α-methylbenzyl, $T_5$ is hydrogen, $C_1$-$C_{14}$ alkyl or cyclohexyl, $X_1$ is as defined for $R_1$ or is a group $(R_7)_3SiO—$ with $T_7$ being $C_1$-$C_3$ alkyl, $X_2$ is hydrogen, $C_1$-$C_3$ alkyl, a group $(R_7)_3Si—$ or, if n is zero and $T_1$ and $X_1$ are $C_1$-$C_3$ alkyl, $X_2$ is also a group of the formula (XIII) and, if m+n is a number from 3 to 10, $X_1$ and $X_2$ together can also be a direct bond.

Those compounds of the formula (I) are of particular interest in which m+n is a number from 1 to 40, n varies from zero to 50% of the sum m+n, A is —O—, $T_1$ and $T_4$ which can be identical or different are methyl, methoxy, ethoxy or OH, $T_2$ is trimethylene or is also a direct bond if A is —O— and $T_1$ and $T_4$ are methyl, $T_3$ is methyl, $C_7$-$C_9$ alkyl or cyclohexyl, $T_5$ is $C_1$-$C_{12}$ alkyl, $X_1$ is as defined for $T_1$ or is a group $(CH_3)_3SiO—$ and $X_2$ is hydrogen, methyl, ethyl, a group $(CH_3)_3Si—$ or, if n is zero and $T_1$ and $X_1$ are methyl, $X_2$ is also a group of the formula (XIII) and, if m+n is a number from 3 to 10, $X_1$ and $X_2$ together can also be a direct bond.

The compounds of the present invention may be prepared by various processes known per se.

If $T_2$ is $C_2$-$C_{12}$ alkylene, the compounds of the formula (I) can be prepared, for example, by hydrolytic polycondensation of compounds of the formulae (XIVa) and (XIVb).

Formulae (XIVa) and (XIVb):

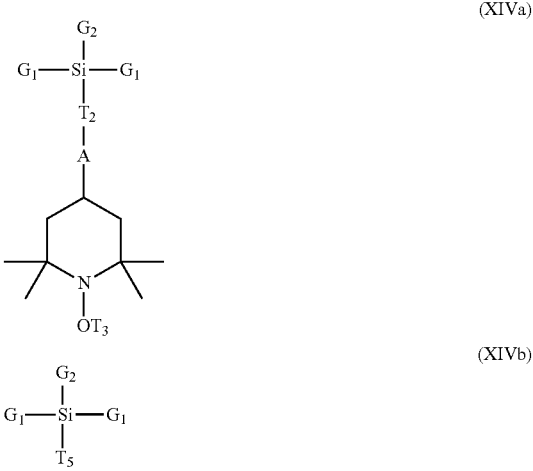

Where:

$G_1$ is Cl or $C_1$-$C_8$ alkoxy and $G_2$ is Cl, $C_1$-$C_8$ alkoxy or phenyl, as reported, for example, in U.S. Pat. No. 4,946,880, or, if $T_1$ and $T_4$ are $C_1$-$C_8$ alkyl or phenyl, by reaction of a compound of the formula (XV):

Formula (XV):

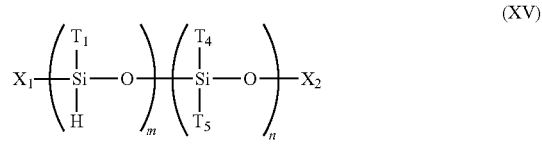

with a compound of the formula (XVI)

Formula (XVI):

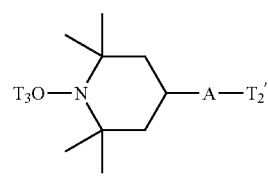

with $T_2'$ being $C_2$-$C_{12}$ alkenyl, in the presence of catalytic quantities of the Pt or Rh complex as described, for example, in U.S. Pat. No. 5,051,458 and EP Patent 388 321.

If $T_2$ is a direct bond, the compounds of the formula (I) can be prepared, for example, by reacting a compound of the formula (V) with a piperidinol of the formula (XVII):

Formula (XVII):

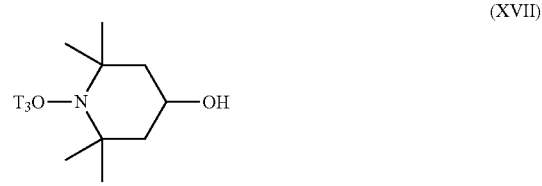

in the presence of catalytic quantifies of a complex of Pt, Rh, or Pd, as described, for example, in U.S. Pat. No. 4,895,885.

The compounds of the formula (XV) are commercially available or can be prepared by known processes. The compounds of the formula (XVI) are prepared, for example, as indicated in U.S. Pat. No. 4,946,880, the group $T_3O$— in the 1-position of the piperidyl group being introduced according to the processes disclosed in U.S. Pat. No. 4,921,962.

The compounds of the formula (XVII) are prepared, for example, as reported in U.S. Pat. No. 5,021,481.

Silyl Functional Antioxidants

Silyl functional antioxidant compounds of the present invention may be compounds containing the sterically hindered phenolic group:

Phenolic Groups (XVIII) and (XVIIIa):

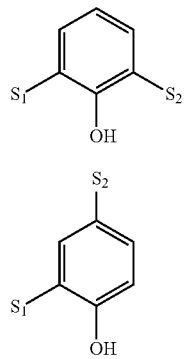

Where:

$S_1$ and $S_2$, which can be equal or different, are preferably branched alkyl radicals containing from 1 to 10 carbon atoms, and in their most preferred form are tert-butyl radicals; said phenolic groups (XVIII) and (XVIIIa) carrying a silyl functionality hydrolysable to silanol. More particularly, the reactive antioxidant compounds of the present invention may pertain to the following class of compounds:

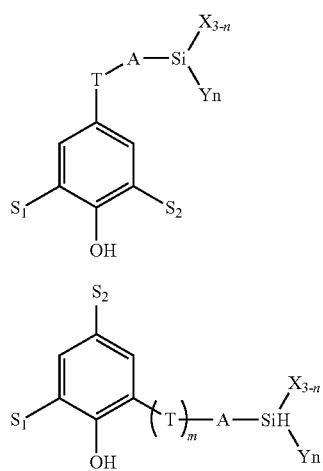

Where:

$S_1$ and $S_2$ are as heretofore defined; m is zero or one.

T is oxygen or sulfur

A is a linear or branched alkylene radical containing from 1 to 10 carbon atoms, or can be defined by means of

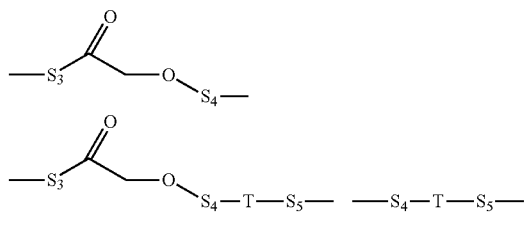

(where $S_3$, $S_4$ and $S_5$ are linear or branched alkylene radicals containing a total of between 3 and 10 carbon atoms);

X is a linear or branched alkyl radical containing from 1 to 5 carbon atoms, and preferably the methyl radical.

Y is hydrogen, halogen and preferably chlorine, $C_1$-$C_4$ acyloxy, $C_1$-$C_4$ alkyloxy, amino, amino-oxy or silyloxy, and preferably $C_1$-$C_2$ alkyloxy. n is one, two or three.

Specific examples of reactive antioxidant compounds which fall within formula (XIX) are the following:

Formulae (XX) and (XXI):

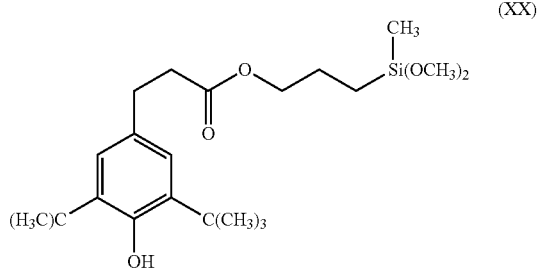

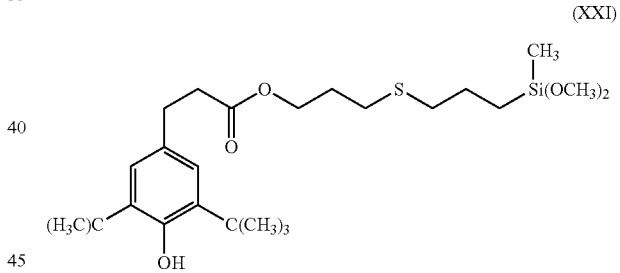

The reactive antioxidant compounds (XX) and (XXI) and can be obtained from the compound (XXII):

Compound (XXII):

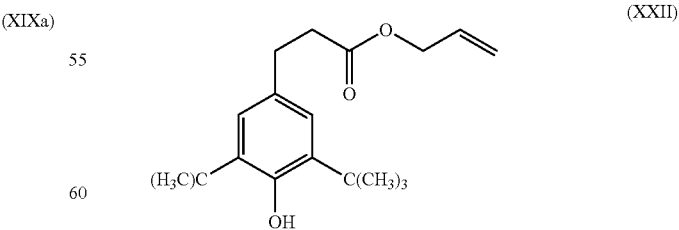

by hydrosilylation with methyldimethoxysilane, and g-mercaptopropyltrimethoxysilane respectively. A further specific example of a reactive antioxidant compound falling within formula (XIX) is the following:

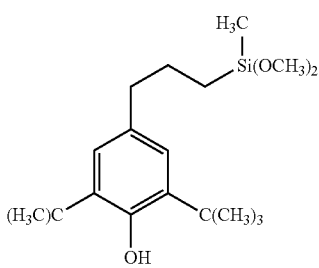

The reactive antioxidant compound above can be obtained by hydrosilylation of the compound:

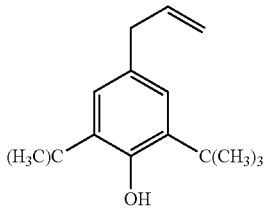

with methyldimethoxysilane.

A further example of a reactive antioxidant compound falling within general formula (XIX) is the following:

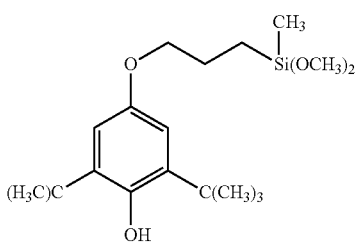

The reactive antioxidant compound above can be obtained by hydrosilylation with methyldimethoxy silane of the compound:

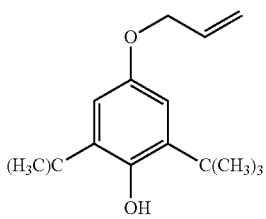

In general, the reactive antioxidant compounds of the present invention may be prepared by silylating a sterically hindered phenol carrying on its ring a preferably terminal ethylenically unsaturated group or by subjecting said ethylenically unsaturated group to alkene hydrothiolation.

One class of hydrosilylation agents suitable for this purpose is definable by the formula (XXIII):

Formula (XXIII):

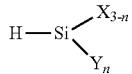
(XXIII)

A class of hydrothiolation agents suitable for the purpose is definable by the general formula (XXIV):

Formula (XXIV):

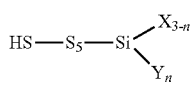
(XXIV)

Where:

$S_5$, X, Y and n have the aforesaid meanings.

Specific examples of hydrosilylation agents falling within general formula (XXIII) are:

$HSi(OCH_3)_2Cl$; $HSi(OCH_3)Cl_2$; $HSiCl_3$;

$HSi(OCH_3)_2(CH_3)$; $HSi(CH_3)(OC_2H_5)_2$;

$HSi(OC_2H_5)_3$; $H_2Si(C_2H_5)_2$;

$HSi(OCH_3)_3$; $HSi(CH_3)_2$—O—$Si(CH_3)_2H$;

$HSi(CH_3)_2$—O—$Si(CH_3)(OCH_3)_2$;

$HSi(CH_3)_2ONC(CH_3)_2$;

$HSi(CH_3)[ONC(CH_3)_2]_2$

Specific examples of hydrothiolation agents which fall within general formula (XXIV) are γ-mercaptopropyltrialkoxysilanes and in particular g-mercaptopropyltrimethoxysilane.

The hydrosilylation reaction is conveniently conducted at a temperature of between 0° and 200° C., and preferably between ambient temperature (20°-25° C.) and 120° C., with a reagent quantity varying from stoichiometric to an excess of the hydrosilylation reagent. Said excess usually reaches up to 20% on a molar basis. However, if disilanes are used it is convenient to use a large excess of the hydrosilylation agent, for example up to about 10 times the stoichiometric quantity. The hydrosilylation reaction is catalyzed by metal catalysts, by ultraviolet radiation and by radical initiators. The preferred catalysts are platinum compounds and complexes of platinum with olefins, preferably chloroplatinic acid. In the case of platinum catalysts, the catalyst concentration, evaluated as metal, can vary from 1 to 200 parts per million and preferably from 5 to 50 parts per million in the reaction medium.

The hydrosilylation reaction can be conducted in an inert (unreactive) organic solvent, normally chosen from aliphatic, cycloaliphatic, and aromatic hydrocarbons and ethers, which are liquid under the operating conditions. Specific examples of solvents suitable for this purpose are heptane, cyclohexane, toluene, tetrahydrofuran, dioxane and dimethoxyethane. The reaction times depend on the reagents used and the reaction temperature and vary normally from 0.5 to 10 hours. On termination of the hydrosilylation reaction, any solvent used, and any excess hydrosilylation agent are removed by stripping, and the reactive stabilizing compound is recovered from the residue of said stripping by normal methods such as crystallization and distillation under vacuum. However, generally the high yield and selectivity of the hydrosilylation reaction make any separation or purification of the final required product unnecessary. If hydrosilylation compounds falling within formula (XXIV) are used, the reaction is conveniently conducted under the aforesaid general hydrosilylation conditions with catalysts in the form of azo compounds such as azobisisobutyronitrile, which are used in a quantity of between 0.1% and 10% and preferably between 0.5% and 2% in the reaction environment. The reactive antioxidant compounds of the present invention may hydrolyze at the silyl function under mild conditions, to generate silanol groups which can be condensed together to form complex resinous stabilizing structures. These resinous structures, of silicone resin type, preserve the inherent stabilizing characteristics of sterically hindered phenols, and have a high level of compatibility with organic polymers, and practically no extractability from said polymers. Hydrolysis at the silyl function takes place simply by contact with water or with environmental moisture at ambient temperature (20°-25° C.) or lower than ambient. Condensation between the silanol groups to give the complex resinous structures can be facilitated by acid or basic agents, soaps, or metal esters, and organometal compounds, especially of lead and tin. Preferred catalysts for this purpose are tin dibutyl tin dilaurate, and strong sulfonic acids such as dodecyl benzenesulfonic acid. Conveniently, the catalyst quantity can vary from 0.1% to 10% by weight and preferably from 0.2% to 3% by weight with respect to the reactive antioxidant compound subjected to resinification. Said resinification reaction can be conducted at ambient temperature (20°-25° C.) or at higher or lower than ambient. The complex resinous structures thus obtained can be introduced into the organic polymer to be stabilized by the usual methods used for this purpose. According to a further embodiment of the present invention, the reactive antioxidant compounds may be introduced directly into the organic polymer, within which the hydrolysis reaction at the silyl function and the interaction between the silanol groups take place spontaneously, to thus give the stabilized polymer composition. According to a further embodiment, hydrolysis at the silyl function of the reactive antioxidant compounds takes place externally to the polymer, together with partial resinification of the hydrolysis products thus obtained. The product of the partial resinification is then introduced into the organic polymer to be stabilized, within which complete resinification takes place.

Silyl Functional Ferrocene Derivatives

Silyl functional ferrocenes of the present invention are novel compounds containing the ferrocene moiety

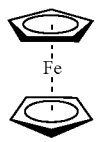

carrying a silyl function hydrolysable to silanol. More particularly, the reactive ferrocene compounds of the present invention may pertain to the following class of compounds:

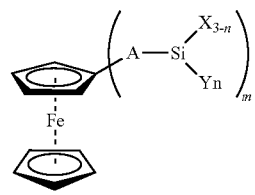

m is 1-4, with up to four functional silane groups attached to every ferrocene moiety.

A is a linear or branched alkylene radical containing from 1 to 10 carbon atoms, or can be defined by means of

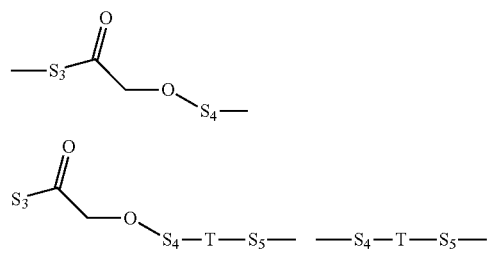

(where $S_3$, $S_4$ and $S_5$ are linear or branched alkylene radicals containing a total of between 3 and 10 carbon atoms);

X is a linear or branched alkyl radical containing from 1 to 5 carbon atoms, and preferably the methyl radical.

Y is hydrogen, halogen and preferably chlorine, $C_1$-$C_4$ acyloxy, $C_1$-$C_4$ alkyloxy, amino, amino-oxy or silyloxy, and preferably $C_1$-$C_2$ alkyloxy.

n is one, two or three.

Specific examples of reactive ferrocene compounds are the following:

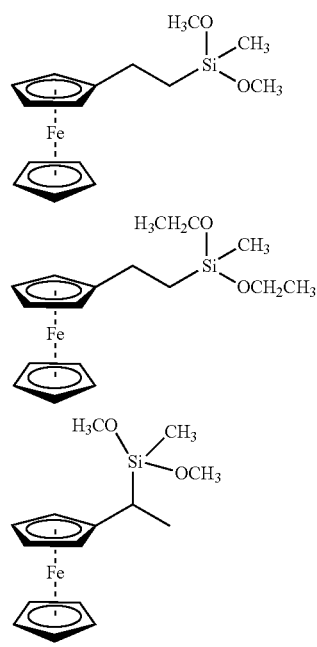

-continued

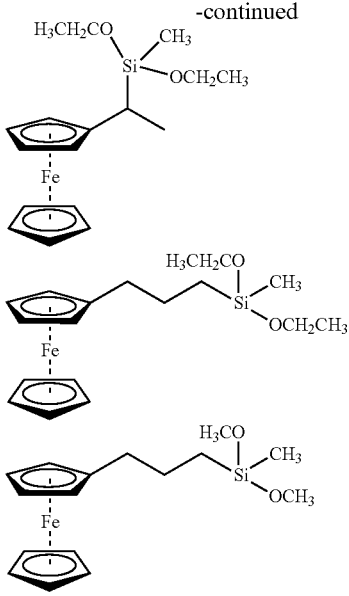

The ferrocene compounds of the current invention may be prepared by the hydrosilylation of the corresponding vinyl or allyl ferrocene. One class of hydrosilylation agents suitable for this purpose is definable by the formula:

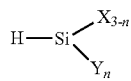

Specific examples of hydrosilylation agents falling within this general formula include:

$HSi(CH_3)_2Cl$; $HSi(CH_3)Cl_2$; $HSiCl_3$;

$HSi(OCH_3)_2(CH_3)$; $HSi(CH_3)(OC_2H_5)_2$;

$HSi(OC_2H_5)_3$; $H_2Si(C_2H_5)_2$;

$HSi(OCH_3)_3$; $HSi(CH_3)_2$—O—$Si(CH_3)_2H$;

$HSi(CH_3)_2$—O—$Si(CH_3)(OCH_3)_2$;

$HSi(CH_3)_2ONC(CH_3)_2$;

$HSi(CH_3)[ONC(CH_3)_2]_2$

Particular Preferred Aspects of the Invention can be Understood by the Following Clauses:

1. A method for extending the useful life of an insulated cable, comprising injecting, into a cable having a stranded conductor encased in a polymeric insulation jacket, a dielectric gel formulation containing: (a) an Si—H endblocked polydiorganosiloxane fluid with the formula $H(R_2SiO)_x(R_2Si)H$ and having a viscosity of 0.5 to about 100 centistokes at 25° C.; (b) a polydiorganosiloxane fluid endblocked with groups containing unsaturated carbon-carbon functionality and having a viscosity of 0.5 to about 100 centistokes at 25° C.; (c) hydrosilylation catalyst suitable to cure the mixture of parts (a) and (b); and (d) at least one organoalkoxysilane functional additive selected from (i) an antioxidant-based alkoxysilane (e.g., hindered phenolic additives based on 2,6-di-tert-butyl phenol derived products), (ii) a voltage stabilizer-based alkoxysilane (e.g., metallocene-based alkoxysilane, (iii) a hindered amine light stabilizer (HALS)-based alkoxylsilane (e.g., tetramethyl piperidine-based alkoxysilane), and/or (iv) a UV absorber-based alkoxysilane (e.g., benzotriazole-based, triazine-based, nickel chelate-based), and wherein, after injection, the mixture of parts (a) and (b) is cured into a non-flowable gel in the cable, and wherein the at least one functional additive diffuses into the polymeric insulation.

2. The method of clause 1, wherein in the methods, the formulation may further comprise one or more siloxane crosslinkers.

3. The method of clauses 1 or 2, wherein in the methods, the formulation may further comprise one or more hydrolysis/condensation catalyst suitable to catalyze hydrolysis and condensation of the at least one functional additive of (d).

4. The method of clause 3, wherein in the methods, the hydrolysis/condensation catalyst may be compatible with the hydrosilylation catalyst so as not to interfere with the cure of the gel formulation containing (a), (b) and (c), and/or may be compatible with optional siloxane crosslinker, and optional hydrosilylation inhibitor.

5. The method of clause 4, wherein in the methods, the hydrolysis/condensation catalyst is one or more selected from organometallic compounds of tin, manganese, iron, cobalt, nickel, lead, titanium, or zirconium, including but not limited to alkyl titanates, acyl titanates and the corresponding zirconates, tetra-t-butyl titanate (TBT), dibutyltindiacetate (DBTDA), dibutyltindilaurate (DBTDL), dibutyltindioleate, tetraethylorthotitanate, tetraisopropyl titanate (TIPT), tetraoctadecylorthotitanate, dibutyltindioctoate, stannous octoate, dimethyltinneodeconoate, di-N-octyltin-S,S-isooctylmercaptoacetate, dibutyltin-S,S-dimethylmercaptoacetate, and/or diethyltin-S,S-dibutylmercaptoacetate.

6. The method of clause 5, wherein in the methods, the hydrolysis/condensation catalyst may be added at a level of about 0.05 to about 5% based on the total weight of the organoalkoxysilane components, or supplied at a level of about 0.1 to about 2% or at a level of about 0.2 to 1% by weight according to the above-mentioned basis.

7. The method of any one of clauses 1-6, wherein in the methods, the formulation may further comprise a hydrosilylation inhibitor.

8. The method of any one of clauses 1-6, wherein in the methods, the formulation may further comprise at least two components selected from siloxane crosslinker components, hydrolysis/condensation catalyst components, and hydrosilylation inhibitor components.

9. The method of any one of clauses 2-8, wherein in the methods, the crosslinker may be a siloxane polymer containing both terminal and pendant Si—H groups.

10. The method of any one of clauses 3-9, wherein in the methods, the hydrolysis/condensation catalyst may be titanium(IV) isopropoxide.

11. The method of any one of clauses 7-10, wherein in the methods, the hydrosilylation inhibitor may be a dialkyl maleate.

12. The method of any one of clauses 1-11, wherein in the methods, the formulation may cure to a non-flowable gel in less than 48 hrs at 35 C.

13. The method of any one of clauses 1-12, wherein in the methods, the formulation may have a time to viscosity doubling of at least 4 hours at 35 C.

14. The method of any one of clauses 1-13, wherein in the methods, the formulation may cure after injection to a non-flowable gel in less than 48 hrs at 35 C.

15. The method of any one of clauses 1-14, wherein in the methods, the formulation may have a time to viscosity doubling after injection of at least 4 hours at 35 C.

16. The method of any one of clauses 1-15, wherein in the methods, the formulation may have an initial viscosity after injection of <10 cP.

17. The method of any one of clauses 1-16, wherein in the methods, the formulation may have an initial viscosity after injection of <10 cP.

18. The method of any one of clauses 1-17, wherein in the methods, for the Si—H endblocked polydiorganosiloxane of formula $H(R_2SiO)_x(R_2Si)H$, R may be selected from alkyl radicals having 1 to 6 carbon atoms or the phenyl radical; preferably a methyl radical.

19. The method of any one of clauses 1-18, wherein in the methods, the Si—H endblocked polydiorganosiloxane may have an average x value selected from 1 to 40, 1 to 20, or 1 to 10.

20. The method of any one of clauses 1-19, wherein the polydiorganosiloxane may be represented by the formula $$\begin{array}{c} R'''R'' \\ | \\ G\text{-}(SiO)_y\text{—Si-G} \\ | \\ R'''R'' \end{array}$$

wherein G denotes unsaturated radicals independently selected from the vinyl group or higher alkenyl radicals represented by the formula-$R'''(CH_2)_mCH=CH_2$, in which R''' denotes —$(CH_2CH_2CH_2)$— or —$(CH_2CH_2CH_2)_q$CH=CH—, m is 1, 2, or 3. p is 3 or 6 and q is 3, 4 or 5, R'' is independently selected from an alkyl radical having 1 to 6 carbon atoms or a phenyl radical; preferably a methyl radical, and y has an average value selected from 1 to about 40, 1 to 20, or 1 to 10.

21. The method of any one of clauses 1-20, wherein in the methods, the hydrosilylation catalyst may comprise a platinum compound.

22. The method of clause 21, wherein in the methods, the platinum compound may comprise platinum(tetramethyldivinylsiloxane).

23. The method of any one of clauses 1-22, wherein components (a) and (b) may be contained in a first part of the formulation and then may be mixed with a second part of the formulation containing components (c) and (d).

24. The method of any one of clauses 8-22, wherein components (a), (b), the optional crosslinker, and the optional inhibitor are contained in a first part of the formulation and components (c), (d), and the optional hydrolysis/condensation catalyst are contained in a second part of the formulation, and wherein the first and second parts are mixed together immediately prior to injection.

25. The method of any one of clauses 1-24, wherein in the methods, the silane functional additives may have a PE retention of at least 0.2%.

26. The method of any one of clauses 1-25, wherein in the methods, the at least one silane functional additive may permeate into the cable insulation reaching at least 90% of saturation in less than 500 hours at 55° C.

27. The method of any one of clauses 1-26, wherein in the methods, the at least one silane-functional additive may have a diffusivity in PE greater than $5.0 \times 10^{-9}$ cm$^2$/s at 55° C. and a PE retention of at least 0.40 wt % at 5,000 hours at 55° C.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B, and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

Accordingly, the invention is not limited except as by the appended claims.

The invention claimed is:

1. A method for extending the useful life of in-service electrical cable, comprising injecting a dielectric enhancement fluid composition into at least one section of an electrical cable having a stranded conductor encased in a polymeric insulation jacket, and having an average operating temperature T, the composition comprising:

(a) at least one organoalkoxysilane functional additive selected from the group consisting of (i) a voltage stabilizer-based alkoxysilane compound of Formula 1

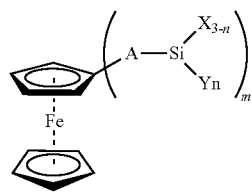

(1)

wherein:
m is 1-4;
A is a linear or branched alkylene radical containing from 1 to 10 carbon atoms, or one of

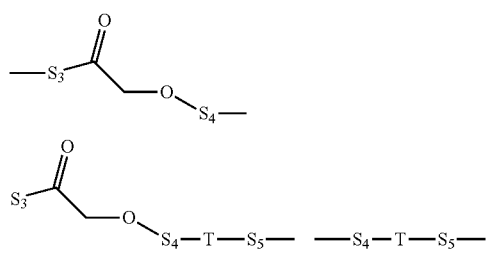

where $S_3$, $S_4$ and $S_5$ are linear or branched alkylene radicals containing a total of between 3 and 10 carbon atoms, and T is oxygen or sulfur;

X is a linear or branched alkyl radical containing from 1 to 5 carbon atoms;

Y is $C_1$-$C_4$ acyloxy, $C_1$-$C_4$ alkyloxy, amino, amino-oxy or silyloxy; and n is one, two or three, (ii) a hindered amine light stabilizer (HALS)-based alkoxysilane of formula (XI)

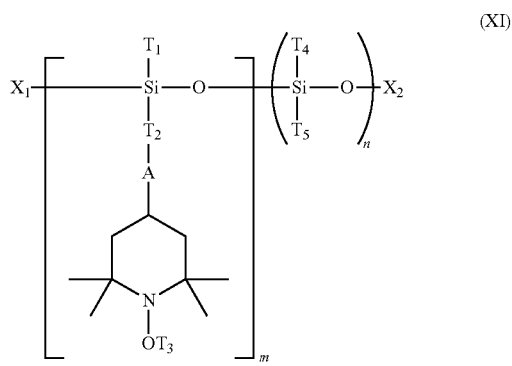

(XI)

wherein:
m+n is a number from 1 to 40, n varies from zero to 50% of the sum m+n;

A is —O—;

$T_1$ and $T_4$ which can be identical or different are methyl, methoxy, ethoxy or OH;

$T_2$ is trimethylene or is also a direct bond if A is —O— and $T_1$ and $T_4$ are methyl;

$T_3$ is methyl, $C_7$-$C_9$ alkyl or cyclohexyl;

$T_5$ is $C_1$-$C_{12}$ alkyl;

$X_1$ is as defined for $T_1$ or is a group $(CH_3)_3$ SiO—; and $X_2$ is hydrogen, methyl, ethyl, a group $(CH_3)_3$ Si— or, if n is zero and $T_1$ and $X_1$ are methyl, $X_2$ is also a group of the formula (XIII)

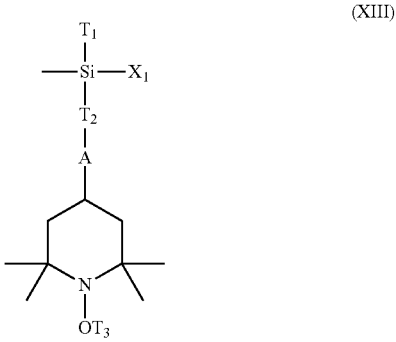

(XIII)

and, if m+n is a number from 3 to 10, $X_1$ and $X_2$ together can also be a direct bond, and (iii) a UV absorber-based alkoxysilane compound of formula (IA) or (IIA)

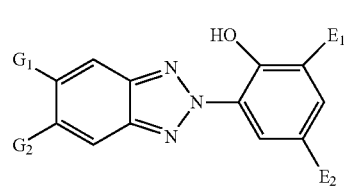

(IA)

-continued

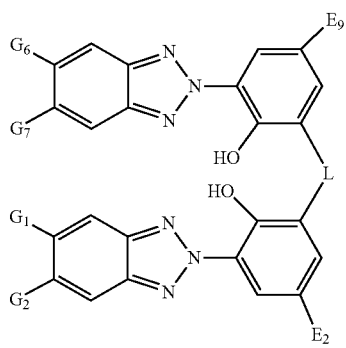

(IIA)

wherein:
G$_1$ and G$_6$ are hydrogen;
G$_2$ and G$_7$ are independently H, cyano, CF$_3$—, fluoro, —CO—G$_3$, or E$_3$SO$_2$—;
G$_3$ is straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms;
E$_1$ is phenylalkyl of 7 to 15 carbon atoms, phenyl, or said phenyl or said phenylalkyl substituted on the phenyl ring by 1 to 4 alkyl groups of 1 to 4 carbon atoms each;
E$_2$ and E$_9$ are independently straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; or E$_2$ is said alkyl of 1 to 24 carbon atoms or said alkenyl of 2 to 18 carbon atoms substituted by one or more —OH, —OCOE$_{11}$, —OE$_4$,—NCO, —NH$_2$, —NHCOE$_{11}$, —NHE$_4$ or —N(E$_4$)$_2$, or mixtures thereof, where E$_4$ is straight or branched chain alkyl of 1 to 24 carbon atoms; or said alkyl or said alkenyl interrupted by one or more —O—, —NH—, or —NE$_4$— groups or mixtures thereof and which can be unsubstituted or substituted by one or more —OH, —OE$_4$, or —NH$_2$ groups or mixtures thereof,
E$_{11}$ is hydrogen, straight or branched chain alkyl of 1 to 18 carbon atoms, straight or branched chain alkenyl of 2 to 18 carbon atoms, cycloalkyl of 5 to 12 carbon atoms, aryl of 6 to 14 carbon atoms or phenylalkyl of 7 to 15 carbon atoms;
E$_3$ is alkyl of 1 to 20 carbon atoms, hydroxyalkyl of 2 to 20 carbon atoms, alkenyl of 3 to 18 carbon atoms, cycloalkyl of 5 to 12 carbon atoms, phenylalkyl of 7 to 15 carbon atoms, aryl of 6 to 10 carbon atoms or said aryl substituted by one or two alkyls of 1 to 4 carbon atoms or 1,1,2,2-tetrahydroperfluoroalkyl where the perfluoroalkyl moiety is of 6 to 16 carbon atoms;
L is methylene; and
with the proviso that at least one of E$_1$, E$_2$ and E$_9$ contains a group —T$_1$—Si(OR$_2$)$_n$(R$_1$)$_{3-n}$, —T$_1$—X—CO—X—T$_2$—Si(OR$_2$)$_n$(R$_1$)$_{3-n}$, T$_1$—CO—X—T$_2$—Si(OR$_2$)$_n$(R$_1$)$_{3-n}$, —X—T$_1$—Si(OR$_2$)$_n$(R$_1$)$_{3-n}$ or —X—T$_1$—X—CO—X—T$_2$—Si(OR$_2$)$_n$(R$_1$)$_{3-n}$,
where, for E$_1$, E$_2$ and E$_9$, T$_1$ and T$_2$ are independently alkylene of 2 or 3 carbon atoms, and R$_1$ and R$_2$ are independently alkyl of 1 to 6 carbon atoms or phenyl, and n is 1, 2, or 3, and X is —O—, —NE$_4$— or —NH—; and
(b) at least one catalyst suitable to catalyze hydrolysis and condensation of the at least one functional additive of (a),
wherein the at least one organoalkoxysilane functional additive of (a) comprises:
at least one of the voltage stabilizer-based alkoxysilane compounds of Formula (1) of (i) and at least one of the HALS-based alkoxysilane of formula (XI) of (ii); and/or
at least one of the voltage stabilizer-based alkoxysilane compounds of Formula (1) of (i) and at least one of the UV absorber-based alkoxysilane compounds of formula (IA) or (IIA) of (iii); and/or
at least one of the HALS-based alkoxysilane of formula (XI) of (ii) and at least one of the UV absorber-based alkoxysilane compounds of formula (IA) or (IIA) of (iii), and
wherein the injected composition provides for both initial permeation of the at least one functional additive into the polymeric insulation, and extended retention of subsequent condensation products of the at least one functional additive in the cable insulation.

2. The method of claim 1, wherein the cable section has a stranded conductor surrounded by a conductor shield encased in a polymeric insulation jacket with an outer insulation shield, and having an interstitial void volume in the region of the conductor, and wherein injecting comprises injecting the dielectric enhancement fluid composition into the interstitial void volume, and/or into the space between the polymeric insulation jacket and the outer insulation shield.

3. The method of claim 1, wherein the dielectric enhancement fluid composition further comprises
(c) at least one water-reactive organosilane material selected from
(i) an organosilane monomer having at least two water-reactive groups,
(ii) the organosilane monomer (i) where at least one of the water-reactive groups is substituted with a condensable silanol group,
(iii) an oligomer of the above organosilane monomer (i), and/or
(iv) a co-oligomer of the above organosilane monomer (i) with a different organosilane monomer, and wherein the catalyst provides for covalent binding of the at least one functional additive of (a) to the at least one water-reactive material (c) upon hydrolysis and condensation thereof.

4. The method of claim 3, wherein the organosilane monomer of (i) has a diffusion coefficient at least about 15 times greater than the diffusion coefficient of a tetramer thereof, the diffusion coefficient being determined at the average operating temperature T of the at least one section of the in-service electrical cable.

5. The method of claim 3, wherein the dielectric enhancement fluid composition further comprises:
(d) a non-water-reactive organic material which has a diffusion coefficient of less than about $10^{-9}$ cm$^2$/sec and an equilibrium concentration of at least about 0.005 gm/cm$^3$ in said polymeric insulation, the diffusion coefficient and the equilibrium concentration being determined at the average operating temperature T; and/or (e) an organic compound having an equilibrium concentration in the polymeric insulation at 55° C. which is less than 2.25 times the equilibrium concentration at 22° C.

6. The method of claim 4, wherein the dielectric enhancement fluid composition further comprises:
(d) a non-water-reactive organic material which has a diffusion coefficient of less than about $10^{-9}$ cm$^2$/sec and an equilibrium concentration of at least about 0.005 gm/cm$^3$ in said polymeric insulation, the diffusion coefficient and the equilibrium concentration being determined at the average operating temperature T; and/or
(e) an organic compound having an equilibrium concentration in the polymeric insulation at 55° C. which is less than 2.25 times the equilibrium concentration at 22° C.

7. The method of claim 3, wherein the at least one water-reactive organosilane material is/are organoalkoxysilanes.

8. The method of claim 7, wherein the organoalkoxysilanes are selected from:
(3-methylphenyl)methyldimethoxysilane,
di(4-methylphenyl)dimethoxysilane,
dimethyldi-n-butoxysilane
(4-methylphenyl)methyldimethoxysilane,
3-cyanopropylmethyldimethoxysilane
3-cyanobutylmethyldimethoxysilane
phenethyltrimethoxysilane,
p-tolylethyl)methyldimethoxysilane,
(p-styrylethyl)trimethoxysilane,
phenylmethyldimethoxysilane
3-(2,4-dinitrophenylamino)propyltriethoxysilane, or
3-(triethoxysilylpropyl) p-nitrobenzamide.

9. The method of claim 8, wherein the organoalkoxysilanes are (p-tolylethyl)methyldimethoxysilane, 3-cyanopropylmethyldimethoxysilane, dimethyldi-n-butoxysilane, or 3-cyanobutylmethyldimethoxysilane.

10. The method of claim 4, wherein the at least one water-reactive organosilane material is/are organoalkoxysilanes.

11. The method of claim 10, wherein the organoalkoxysilanes are selected from:
(3-methylphenyl)methyldimethoxysilane,
di(4-methylphenyl)dimethoxysilane,
dimethyldi-n-butoxysilane
(4-methylphenyl)methyldimethoxysilane,
3-cyanopropylmethyldimethoxysilane
3-cyanobutylmethyldimethoxysilane
phenethyltrimethoxysilane,
p-tolylethyl)methyldimethoxysilane,
(p-styrylethyl)trimethoxysilane,
phenylmethyldimethoxysilane
3-(2,4-dinitrophenylamino)propyltriethoxysilane, or
3-(triethoxysilylpropyl) p-nitrobenzamide.

12. The method of claim 11, wherein the organoalkoxysilanes are (p-tolylethyl)methyldimethoxysilane, 3-cyanopropylmethyldimethoxysilane, dimethyldi-n-butoxysilane, or 3-cyanobutylmethyldimethoxysilane.

13. The method of claim 1, wherein the organoalkoxysilane functional additives are derived from at least one of the following stabilizing functionalities;
hydroxyphenyl benzotriazole chromophores,
N-Alkoxy 2,2,6,6-tetramethyl piperidine light stabilizers, and/or
ferrocene backbones.

14. The method of claim 1, wherein the composition further comprises an organoalkoxysilane functional additive derived from a hindered phenolic antioxidant backbone.

15. The method of claim 1, where the at least one organoalkoxysilane functional additive has a PE retention of at least 0.2%.

16. The method of claim 1, where the at least one organoalkoxysilane functional additive permeates into the cable insulation reaching at least 90% of saturation in less than 500 hours at 55° C.

17. The method of claim 1, where the at least one organoalkoxysilane functional additive has a diffusivity in PE greater than $5.0 \times 10^{-9}$ cm$^2$/s at 55° C. and a PE retention of at least 0.40 wt % at 5,000 hours at 55° C.

18. The method of claim 1, wherein the compound of formula (IA) is

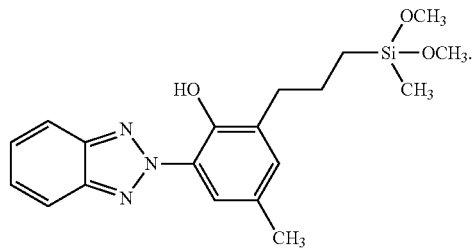 [SMILES: CO[Si](C)(CCCc1cc(C)cc(-n2nc3ccccc3n2)c1O)OC]

19. The method of claim 1, wherein the voltage stabilizer-based alkoxysilane compound of Formula 1 is an organoalkoxysilane compound selected from the group consisting of

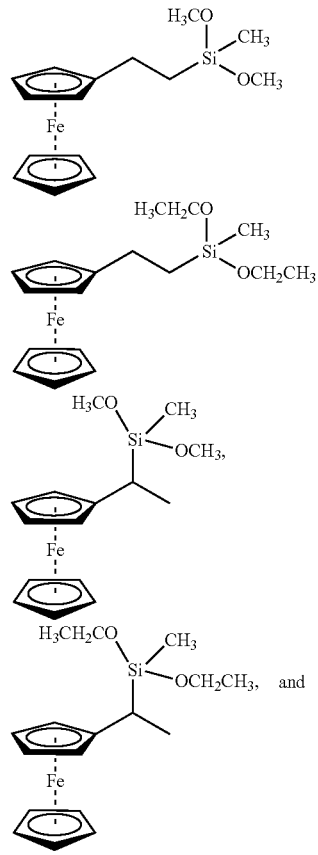

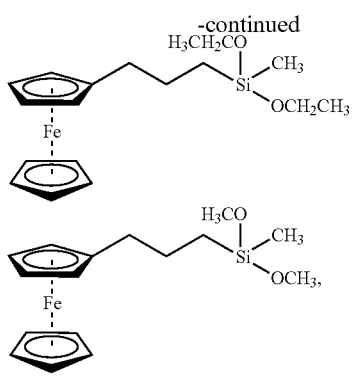
or a combination thereof.
* * * * *